US009855923B2

(12) United States Patent
Kim et al.

(10) Patent No.: US 9,855,923 B2
(45) Date of Patent: Jan. 2, 2018

(54) WIPER BLADE

(71) Applicants: ADM21 CO., LTD., Cheongyang-gun, Chungcheongnam-do (KR); In Kyu Kim, Ansan-si, Gyeonggi-do (KR)

(72) Inventors: In Kyu Kim, Ansan-si (KR); Kyung Su Kim, Chungcheongnam-do (KR); Kyung Jong Nam, Chungcheongnam-do (KR); Cheong Mo Yang, Chungcheongnam-do (KR); Jun Mo Lee, Chungcheongnam-do (KR)

(73) Assignee: THE KOREA DEVELOPMENT BANK, Seoul (KR)

( * ) Notice: Subject to any disclaimer, the term of this patent is extended or adjusted under 35 U.S.C. 154(b) by 390 days.

(21) Appl. No.: 14/619,445

(22) Filed: Feb. 11, 2015

(65) Prior Publication Data

US 2015/0251635 A1    Sep. 10, 2015

(30) Foreign Application Priority Data

Mar. 7, 2014    (KR) .................. 10-2014-0027327

(51) Int. Cl.
*B60S 1/40*    (2006.01)
*B60S 1/38*    (2006.01)

(52) U.S. Cl.
CPC .......... *B60S 1/3801* (2013.01); *B60S 1/3808* (2013.01); *B60S 1/4003* (2013.01); *B60S 1/4041* (2013.01); *B60S 1/4045* (2013.01); *B60S 1/3851* (2013.01); *B60S 1/3853* (2013.01); *B60S 1/3858* (2013.01); *B60S 1/407* (2013.01); *B60S 1/4048* (2013.01);

(Continued)

(58) Field of Classification Search
CPC .... B60S 1/3851; B60S 1/3849; B60S 1/3853; B60S 1/3858; B60S 1/4003; B60S 1/4038; B60S 1/4045; B60S 1/4048; B60S 1/4074; B60S 1/4087; B60S 2001/4054;

(Continued)

(56) References Cited

U.S. PATENT DOCUMENTS 6,343,401 B1    2/2002  Harashima
7,636,980 B2    12/2009  Nakano (Continued)

FOREIGN PATENT DOCUMENTS

CN    102317127 A    1/2012
CN    103129526 A    6/2013

(Continued)

*Primary Examiner* — Gary Graham
(74) *Attorney, Agent, or Firm* — Sughrue Mion, PLLC

(57) ABSTRACT

A wiper blade suitable to six types of wiper arms. A connector assembly of the wiper blade is detachably joined to a lever assembly and is detachably connected to wiper arms having first to sixth coupling units at a distal end respectively. An adaptor of the connector assembly is rotatably attached to the lever assembly. A slide cover of the connector assembly is slidably joined to the adaptor. A side lock cover of the connector assembly is detachably joined to the adaptor. The slide cover is moved to the adaptor in a first movement direction parallel to a longitudinal direction of the lever assembly to cover top contact surfaces of the first to third coupling units. The adaptor is fitted to the fourth coupling unit. The adaptor is connected to the fifth and sixth coupling units by a side pin passing through the side lock cover.

18 Claims, 43 Drawing Sheets

(52) U.S. Cl.
CPC ............ *B60S 1/4064* (2013.01); *B60S 1/4087* (2013.01); *B60S 2001/3813* (2013.01); *B60S 2001/4058* (2013.01)

(58) Field of Classification Search
CPC ........ B60S 2001/4058; B60S 200/4061; B60S 2001/4051
See application file for complete search history.

(56) References Cited

U.S. PATENT DOCUMENTS

| | | | |
|---|---|---|---|
| 8,429,786 | B2 | 4/2013 | Van Baelen et al. |
| 8,479,350 | B2 | 7/2013 | Kim et al. |
| 8,800,096 | B2 | 8/2014 | Kim et al. |
| 8,935,825 | B2 | 1/2015 | Song |
| 9,114,783 | B2 | 8/2015 | Depondt |
| 2003/0074762 | A1 | 4/2003 | De Block |
| 2004/0216260 | A1 | 11/2004 | Genet et al. |
| 2005/0005387 | A1 | 1/2005 | Kinoshita et al. |
| 2007/0067939 | A1* | 3/2007 | Huang ................. B60S 1/3848 15/250.32 |
| 2010/0205763 | A1* | 8/2010 | Ku .......................... B60S 1/387 15/250.32 |
| 2012/0279008 | A1 | 11/2012 | Depondt |
| 2012/0317740 | A1* | 12/2012 | Yang ..................... B60S 1/3801 15/250.32 |
| 2014/0115811 | A1 | 5/2014 | Kim et al. |
| 2014/0317875 | A1* | 10/2014 | Tolentino ................ B60S 1/387 15/250.32 |

FOREIGN PATENT DOCUMENTS

| | | |
|---|---|---|
| CN | 203391736 U | 1/2014 |
| FR | 2499921 A1 | 8/1982 |
| JP | 2013-507285 A | 3/2013 |
| KR | 2001-0030699 A | 4/2001 |
| KR | 10-2006-0051763 A | 5/2006 |
| KR | 10-2007-0096733 A | 10/2007 |
| KR | 10-0920169 B1 | 10/2009 |
| KR | 10-2010-0015734 A | 2/2010 |
| KR | 10-2010-0102877 A | 9/2010 |
| KR | 10-1036577 B1 | 5/2011 |
| KR | 10-1189722 * | 10/2012 |
| KR | 10-1335312 B1 | 12/2013 |
| KR | 10-2014-0000779 A | 1/2014 |

* cited by examiner

MD1 ←————————→ MD2

WIPER BLADE

CROSS-REFERENCE TO RELATED APPLICATIONS

This application claims priority from Korean Patent Application No. 10-2014-0027327 (filed on Mar. 7, 2014), the entire subject matter of which is incorporated herein by reference.

TECHNICAL FIELD

The present disclosure relates to a wiper blade with a spoiler integrated therein.

BACKGROUND

A wiper blade for wiping a surface of a windshield has a wiper rubber and a lever assembly. The wiper rubber contacts the windshield surface. The lever assembly holds and supports the wiper rubber along its longitudinal direction. The lever assembly of a conventional wiper blade includes one main lever and a plurality of yoke levers linked to the main lever. The main lever is connected to the wiper arm. The yoke lever is linked to the main lever or another yoke lever at its middle. The main lever and the yoke lever are hinge-connected by means of a pin or rivet which passes through the main lever and the yoke lever.

When a motor vehicle runs, wind or air stream impinging against the windshield applies a force to the wiper blade throughout the longitudinal direction of the wiper blade. The force caused by the wind or air stream acts to lift the wiper blade from the windshield surface. The faster the motor vehicle runs, the stronger such a lift force becomes. This weakens the contact between the wiper rubber and the windshield surface, thereby deteriorating wiping performance.

To address the deterioration in wiping performance caused by the lift of a wiper blade, it is known in the art to attach a spoiler to the wiper blade. The spoiler interacts with wind or air stream and thereby applies a force in a direction opposite to the lift of the wiper blade. By way of example, Korean Patent Application Publication No. 2001-0030699 proposes a wiper blade with a spoiler attached to a main lever. It is also known in the art to attach a cover, which covers the main lever or the yoke lever of the wiper blade and has the shape of a spoiler, to the wiper blade. By way of another example, Korean Patent Application Publication No. 2006-0051763 proposes a wiper blade with such a cover.

SUMMARY

The lower an overall height of the lever assembly supporting the wiper blade, the less air resistance the lever assembly could be subjected to. However, to reduce the height of the lever assembly of conventional wiper blade has limits due to a furcate configuration of its levers. The wiper blade with a spoiler attached requires that the spoiler be prepared separately. This may lead to the increase in manufacturing costs of the wiper blade and detachment of the spoiler. Further, the wiper blade with a cover covering the main lever or the yoke lever requires parts for joining the cover to the lever assembly. This may increase the number of the parts of the wiper blade, increasing manufacturing costs.

Further, in the lever assembly of a conventional wiper blade, the main lever and the yoke lever are connected by means of a connection element such as a pin or rivet. Use of such a connection element may increase the number of the parts of the wiper blade and easy assembly of the wiper blade cannot be achieved.

The wiper blade is connected to the wiper arm through detachable connection between a connection unit provided in the wiper blade and a coupling unit provided in a distal end of the wiper arm. Various types of wiper arms, the respective coupling units of which have the configuration different from one another, are used in the art, while the wiper blade employs one of variously-configured connection units, each of which is only adapted to the respective coupling units. Thus, wiper blade manufacturers must design and develop various connection units, each of which is only suitable for the respective coupling units of wiper arms. This may increase the number of the parts constituting the connections unit and cause difficulties in appropriate maintenance. Further, the users must choose the wiper blade that is only suitable for the coupling unit of the wiper arm equipped to their own cars, resulting in difficulty and inconvenience in choosing wiper blades.

The present disclosure is directed to solving the aforementioned problems of the prior art. The present disclosure provides a wiper blade wherein a lever assembly holding a wiper rubber has a low overall height and is integrated with a spoiler. Further, the present disclosure provides a wiper blade wherein the lever assembly can be assembled through simple manipulation. Further, the present disclosure provides a wiper blade which has the aforementioned characteristics and is connectable to at least six types of wiper arms.

Embodiments disclosed herein provide wiper blades that have a lever assembly with a spoiler integrated therein and are connectable to at least six types of wiper arms.

In one exemplary embodiment, the wiper blade comprises: a wiper rubber; a lever assembly holding the wiper rubber and comprising a plurality of levers, adjacent levers of which are rotatably connected; and a connector assembly detachably connected to a wiper arm which includes one of first to fourth coupling units at a distal end. The first coupling unit includes a receiving portion formed with a front contact surface, a rear contact surface and a top contact surface. The second coupling unit includes a receiving portion having a rotator that is rotatable and is formed with a front contact surface, a rear contact surface and a top contact surface. The third coupling unit includes a bar formed with a top contact surface and a bottom contact surface and an opening perforated in the bar. The fourth coupling unit includes a receiving portion having a pair of claws formed with a front contact surface, a rear contact surface and a top contact surface. The connector assembly includes: a bracket detachably joined to the lever assembly; an adaptor rotatably mounted to the bracket; and a slide cover slidably joined to the adaptor and being slidable in a first movement direction parallel to a longitudinal direction of the lever assembly and in a second movement direction opposite to the first movement direction in the longitudinal direction of the lever assembly. The adaptor includes an insertion portion, a first support surface, a rotator seat, a second support surface, an insertion protrusion and a pair of claw grooves. The insertion portion is rotatably joined to the bracket and is inserted to the receiving portions of the first, second and fourth coupling units. The first support surface is formed in the insertion portion and supports the front contact surface or the rear contact surface of the first coupling unit. The rotator seat is formed in the insertion portion in a direction orthogonal to the first and second movement directions. The rotator of the second coupling unit is fitted to the rotator seat by surface-to-surface contact. The second support surface is formed in the insertion portion and extends in the first and second movement directions. The second support surface supports the bottom contact surface of the third coupling unit. The insertion protrusion is formed on the second support surface and is inserted to the opening of the third coupling unit. The claw grooves are formed in a bottom edge of the insertion portion and extends in the first and second movement directions. Each of the claw grooves contacts the front or rear contact surface and the top contact surface of each claw of the fourth coupling unit. The slide cover is slidable between a fixation position where the slide cover is moved to the adaptor in the first movement direction to cover at least portions of the top contact surfaces of the first to third coupling units and a release position where the slide cover is moved from the adaptor in the second movement direction not to cover the top contact surfaces of the first to third coupling units.

In an embodiment, the adaptor includes a pair of guide grooves extending in the first and second movement directions and first and second snap holes located apart from each other in the first and second movement directions in each of the guide grooves. The slide cover includes a pair of slide claws that are inserted to the pair of guide grooves respectively and are slidable therein. The slide claws snap-engage the first snap holes, locking the slide cover to the fixation position. In this embodiment, the slide cover includes a hood extending in the first movement direction. When the slide cover is locked to the fixation position, the hood is positioned above the top contact surfaces of the first to third coupling units.

In an embodiment, the adaptor includes a latch, which is upwardly curvable and locks the rear contact surface of the fourth coupling unit, at a bottom edge of the insertion portion. In this embodiment, the adaptor includes a slit that is formed from an end of the insertion portion in the first movement direction towards the second movement direction. The latch extends from an end of the slit in the second movement direction towards the first movement direction. Further, the latch includes a pair of wedge protrusions protruding downwardly and the claw grooves extend in the second movement direction from surfaces of the wedge protrusions in the second movement direction. The surfaces of the wedge protrusions in the second movement direction lock the rear contact surface of the fourth coupling unit.

In an embodiment, the insertion portion includes: a pair of inner lateral walls; a top wall extending between top edges of the pair of inner lateral walls; a pair of outer lateral walls spaced apart from the pair of inner lateral walls respectively; and a pair of insertion slots extending between the pair of inner lateral walls and the pair of the outer lateral walls. The insertion portion is inserted to the receiving portion of the first coupling unit at the pair of inner lateral walls and is inserted to the receiving portion of the second coupling unit or the receiving portion of the fourth coupling unit at the pair of outer lateral walls. The first support surface comprises an end surface of each of the insertion slots in the first movement direction or an end surface of each of the insertion slots in the second movement direction. The rotator seat extends across the pair of inner lateral walls, the top wall and the pair of outer lateral walls. The second support surface comprises a top surface of the top wall.

In this embodiment, ends of the pair of inner lateral walls in the first movement direction and ends of the pair of outer lateral walls in the first movement direction form an end of the adaptor in the first movement direction. Ends of the pair of outer lateral walls in the second movement direction form an end of the adaptor in the second movement direction. The slide cover is slidable from the end of the adaptor in the second movement direction towards the first movement direction. Further, the rotator seat includes a front surface located in the second movement direction and a rear surface located in the first movement direction. The front surface of the rotator seat directly contacts the front contact surface of the rotator and the rear surface of the rotator seat directly contacts the rear contact surface of the rotator. Further, the bracket includes a pair of shaft protrusions protruding in the direction orthogonal to the first and second movement directions and the pair of inner lateral walls include bearing holes to which the shaft protrusions are fitted respectively. The shaft protrusions have a shape of a semi-circular arc when viewing the bracket from front. The third coupling unit further includes a curved tongue extending from a front end of the bar. In this embodiment, the second support surface includes a curved surface, on which the tongue is seated, at an end in the second movement direction.

The connector assembly of the wiper blade in accordance with embodiments is detachably connected to a wiper arm including a fifth coupling unit at a distal end. The fifth coupling unit includes: a side pin; and a clipping latch extending parallel to the side pin and having a clip at a free end. In an embodiment, the connector assembly further includes a side lock cover. The side lock cover includes: a fitting portion formed with a front contact surface, a rear contact surface and a top contact surface and being fitted to the rotator seat by surface-to-surface contact; and a bearing hole extending through the fitting portion in the direction orthogonal to the first and second movement directions. The side pin of the fifth coupling unit is inserted to the bearing hole. The slide cover covers at least a portion of the top contact surface of the fitting portion in the fixation position.

In this embodiment, the side lock cover includes a pair of lateral walls extending from the fitting portion. Inner surfaces of the pair of lateral walls of the side lock cover are positioned outside outer surfaces of the insertion portion. The clip of the clipping latch of the fifth coupling unit contacts an outer surface of one of the pair of lateral walls of the side lock cover.

The connector assembly of the wiper blade in accordance with embodiments is detachably connected to a wiper arm including a sixth coupling unit at a distal end. The sixth coupling unit includes: a side pin; and a clipping latch having a clip at a free end and having a length shorter than a length of the clipping latch of the fifth coupling unit. In an embodiment, the insertion portion of the adaptor includes a pair of insertion slots extending in the first and second movement directions. The side pin of the sixth coupling unit is inserted to the bearing hole and the clip of the clipping latch of the sixth coupling unit is inserted to one of the pair of insertion slots of the insertion portion of the adaptor.

In an embodiment, the lever assembly includes: a first lever located centrally in the lever assembly and having two first inclined surfaces that extend longitudinally and are spaced apart from each other; and a connector seat provided in the first lever between said two first inclined surfaces. The connector seat includes: a seat surface on which the bracket is seated; a stepped surface extending along a periphery of the seat surface and separating the seat surface from the first lever; an insertion slot provided at a longitudinal end of the seat surface; and a pair of snap protrusions located adjacent to the seat surface apart from the insertion slot and protruding in a direction orthogonal to a longitudinal direction of the seat surface. The bracket includes: a contact surface contacting the seat surface; a flange extending along a periphery of the contact surface contacting the seat surface, the flange fitting on the stepped surface; an insertion protrusion inserted to the insertion slot of the connector seat; and a pair of snap slots, which the pair of snap protrusions of the connector seat snap-engage respectively, being located above a bottom edge of the flange.

In an embodiment, the flange includes an ear portion formed by a portion of an edge of the flange. Said portion of an edge of the flange is opposite each of the snap slots and protrudes outwardly. The connector seat includes an auxiliary stepped surface between the stepped surface and a bottom edge of the first lever. The auxiliary stepped surface is continued from the stepped surface and is located below the snap protrusion.

In an embodiment, the lever assembly further includes: a pair of second levers rotatably connected to longitudinal outer ends of the first lever respectively and having a second inclined surface extending longitudinally; and a pair of third levers rotatably connected to longitudinal inner ends or longitudinal outer ends of the second levers respectively and having a third inclined surface extending longitudinally. The first lever and the second lever are rotatably connected to each other by fitting between a pair of fitting protrusions provided in one of the first and second levers and a pair of fitting holes provided in the other of the first and second levers. The second lever and the third lever are rotatably connected to each other by fitting between a pair of fitting protrusions provided in one of the second and third levers and a pair of fitting holes provided in the other of the second and third levers. In such an embodiment, the first lever has an end surface, which is inclined towards a longitudinal outer end of the third lever, at the longitudinal outer end thereof. Further, the second lever has a stepped surface, which is contactable to the end surface of the first lever and is inclined towards the longitudinal outer end of the third lever, and has an end surface, which is inclined towards the longitudinal outer end of the third lever, at the longitudinal outer end thereof. Further, the third lever has a stepped surface which is contactable to the end surface of the second lever and is inclined towards the longitudinal outer end of the third lever. The stepped surface of the third lever is inclined towards the longitudinal outer end of the third lever at an angle less than the stepped surface of the second lever.

In the wiper blades according to the embodiments, the levers with partial spoilers are adjoined linearly and form the lever assembly, providing the wiper blade that has a low overall height and an integrally-formed spoiler.

In the lever assembly of the wiper blades according to the embodiments, adjacent levers are hinge-connected to each other by fitting between fitting protrusions and fitting holes, providing a lever assembly of a wiper blade with the benefit of ease of assembly.

Further, the wiper blade according to the embodiments includes the connector assembly that is configured to be detachably connected to six types of wiper arms. Thus, the wiper blade is applicable to these six types of wiper arms. The connector assembly is connected to the wiper arm by means of slide action. Thus, the user can easily connect and separate the connector assembly to and from the wiper arm.

BRIEF DESCRIPTION OF THE DRAWINGS

Arrangements and embodiments may be described in detail with reference to the following drawings in which like reference numerals refer to like elements or components, wherein.

DETAILED DESCRIPTION

Figure 1:
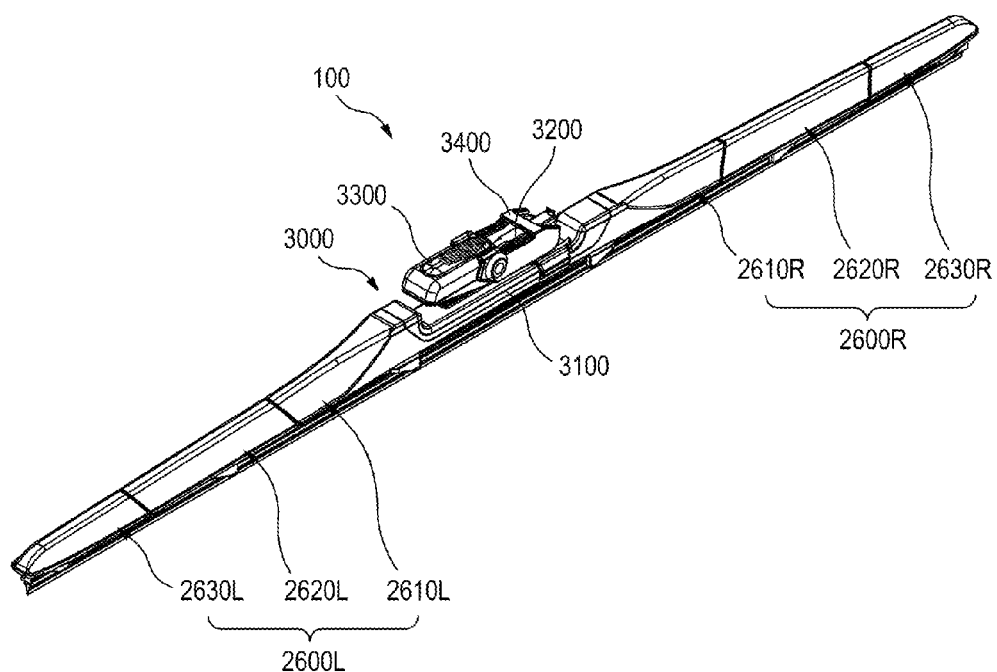
FIG. 1 is a perspective view showing a wiper blade in accordance with an embodiment.
Figure 2:
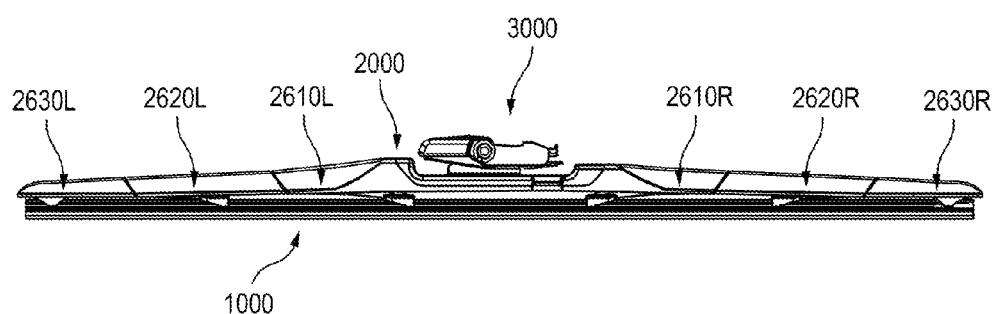
FIG. 2 is a front view of the wiper blade shown in FIG. 1.
Figure 3:
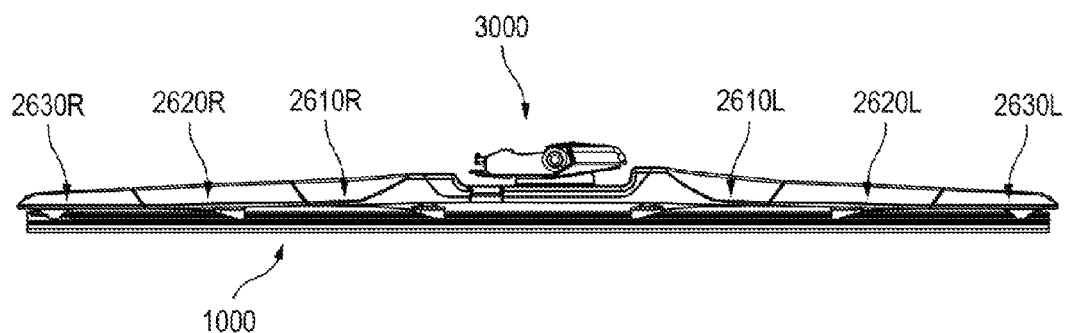
FIG. 3 is a rear view of the wiper blade shown in FIG. 1.
Figure 4:
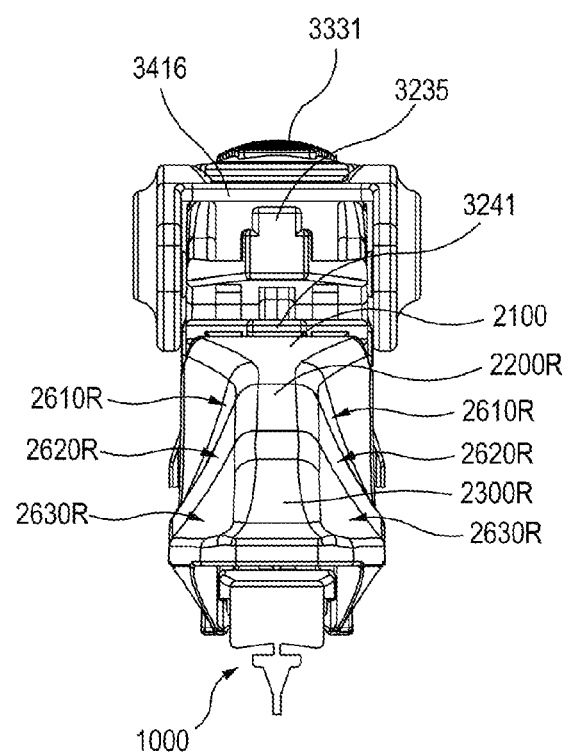
FIG. 4 is a right side view of the wiper blade shown in FIG. 1.
Figure 5:
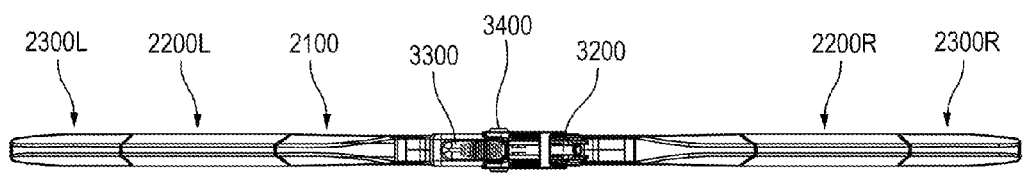
FIG. 5 is a top view of the wiper blade shown in FIG. 1.

Detailed descriptions are made as to embodiments of a wiper blade with reference to the accompanying drawings. The directional term "top," "upper," "upward" or the like as used herein is generally based on a direction, in which a lever assembly is disposed relative to a wiper rubber in the accompanying drawings, while the directional term "bottom," "lower," "downward" or the like generally refers to a direction opposite to the upper or upward direction. A wiper blade shown in the accompanying drawings may be otherwise oriented and the aforementioned directional terms may be interpreted accordingly. Further, as used herein, the term "longitudinal inner end" generally refers to an end that is closer to a center of a wiper blade in a longitudinal direction of an element, while the term "longitudinal outer end" refers to an end that is distant from the center of the wiper blade in the longitudinal direction of said element.

A wiper blade 100 according to an embodiment includes a wiper rubber assembly 1000, a lever assembly 2000 and a connector assembly 3000. The wiper rubber assembly 1000 includes a wiper rubber 1100 contacting the surface of a windshield. The lever assembly 2000 holds and supports the wiper rubber assembly. The connector assembly 3000 is detachably joined to the lever assembly 2000 and connects the lever assembly 2000 to a wiper arm.

The lever assembly 2000 includes a plurality of levers, which are adjoined linearly in a longitudinal direction of the wiper rubber 1100. Adjacent two levers are rotatably connected to each other by means of a hinge-connection portion, which directly hingedly interconnects the inner surface of one of the adjacent two levers and the outer surface of the other of the adjacent two levers. If the adjacent two levers are connected, then the outer surface of the other of said adjacent two levers is situated inside the inner surface of the one of said adjacent two levers and is thus hidden in the inside of the one of said adjacent two levers when viewed from outside. In one embodiment, the inner surface of the one of said adjacent two levers is the inner surface of a spoiler portion, while the outer surface of the other of said adjacent two levers is the outer surface of an arm portion formed in the lever. In one embodiment, said hinge-connection portion comprises a pair of fitting protrusions 2411, 2412 and a pair of fitting holes 2421, 2422 to which the fitting protrusions 2411, 2412 are fitted respectively. The fitting protrusion 2411, 2412 are provided in the one of said adjacent two levers, while the fitting holes 2421, 2422 are provided in the other of said adjacent two levers.

In embodiments, one of said adjacent two levers has an element configured to contact the other of said adjacent two levers in a width direction so that the other of said adjacent two levers hinge-joined to the one of said adjacent two levers can be retained without shake. In one embodiment, said element comprises a pair of contact surfaces, which are oppositely located inside the one of said adjacent two levers.

The wiper blades according to embodiments include a spoiler 2600L, 2600R that produces a reaction force preventing the lift of the wiper blade, which wind or air stream may cause. The spoiler extends along the longitudinal direction of the lever assembly 2000 and is integrated in the lever assembly 2000. The spoiler 2600L, 2600R reacts to wind or air stream impinging against the wiper blade 100 during the running of a motor vehicle and produces a reaction force preventing the wiper blade 100 from being lifted. Such a reaction force is produced by interaction between wind or air stream and a cross-sectional contour shape of the lever assembly 2000 with the spoiler 2600L, 2600R. In one embodiment, a partial spoiler, which becomes a part of the spoiler, is integrated in one or more levers among the plurality of levers of the lever assembly 2000. The partial spoilers of each lever are adjoined linearly, thereby forming the spoiler 2600L, 2600R of the wiper blade 100. The partial spoiler is defined by at least one or a pair of inclined surfaces that extend in the longitudinal direction of the lever and are inclined inwardly of the lever in the width direction of the lever. The inclined surface forms a portion or the entirety of a lateral surface of the lever. In an example where the lever has one inclined surface, the lateral surface of the lever, which is opposite the inclined surface, may be a vertical surface. In another example where the lever has a pair of inclined surfaces, the pair of inclined surfaces may be the portion or the entirety of the both lateral surfaces of the lever. The inclined surface may include a flat surface, a concave or convex curved surface, etc., when viewing the lever from a side or cross-section. That is, in an example where the lever has one inclined surface, the cross-sectional contour shape of the spoiler 2600L, 2600R comprises a straight line, a concave curved line or a convex curved line. In another example where the lever has a pair of inclined surfaces, the cross-sectional contour shape of the spoiler 2600L, 2600R comprises a pair of straight lines, a pair of concave curved lines or a pair of convex curved lines, which are symmetrical in the width direction of the lever assembly 2000. Further, when viewing the lever from the side or cross-section, the inclined surfaces may be at least partially symmetrical in the width direction of the lever. One of the pair of the inclined surfaces may have a width greater than that of the other. Further, the width of the inclined surface may be constant or diminish towards a longitudinal outer end of the lever assembly.

Two or more levers of the lever assembly 2000 have a spoiler portion, in which the inclined surface is formed, and an arm portion, which linearly extends oppositely from the spoiler portion. A finger, which is an element for grasping the wiper rubber, is provided at a distal end of the arm portion. When adjacent levers are joined, the arm portion of one of the adjacent levers is hidden within the spoiler portion of the other of the adjacent levers.

In one embodiment, the lever assembly 2000 comprises a first lever 2100 centrally located in the lever assembly, and a pair of second levers rotatably connected to longitudinal outer ends of the first lever respectively. The second lever has a finger grasping the wiper rubber at a longitudinal outer end or has fingers grasping the wiper rubber at longitudinal both ends. By way of another example of the lever assembly, the lever assembly 2000 comprises the following: a first lever 2100 centrally located in the lever assembly; a pair of second levers rotatably connected to longitudinal outer ends of the first lever respectively and having the finger at a longitudinal outer end; and a pair of third levers rotatably connected to the longitudinal inner ends of the second levers respectively and having fingers at longitudinal both ends. By way of yet another example of the lever assembly, the lever assembly 2000 comprises the following: a first lever 2100 centrally located in the lever assembly; a pair of second levers rotatably connected to longitudinal outer ends of the first lever respectively and having the finger at a longitudinal inner end; and a pair of third levers rotatably connected to the longitudinal outer ends of the second levers respectively and having fingers at longitudinal both ends. By way of still another example of the lever assembly, the lever assembly 2000 comprises the following: a first lever 2100 centrally located in the lever assembly; a pair of second levers rotatably connected to longitudinal outer ends of the first lever respectively and having the finger at a longitudinal inner end; a pair of third levers rotatably connected to longitudinal outer ends of the second levers respectively and having the finger at a longitudinal inner end; and a pair of fourth levers rotatably connected to the longitudinal outer ends of the third levers respectively and having fingers at longitudinal both ends.

In the foregoing examples of the lever assembly, the first lever 2100 has two, longitudinally-extending inclined surfaces, which define a partial spoiler and are spaced apart, in one lateral surface. Alternatively, the first lever 2100 has a pair of inclined surfaces in both lateral surfaces at a longitudinal end portion and another pair of inclined surfaces in both lateral surfaces at an opposite longitudinal end portion. In the foregoing examples of the lever assembly, each of the second to fourth levers has one inclined surface in one lateral surface thereof or a pair of inclined surfaces in both lateral surfaces thereof.

The lever assembly 2000 of the wiper blade according to embodiments includes a connector seat 2500, which is configured such that a base part of the connector assembly 3000 is seated on and fixed to the connector seat. In one embodiment, the connector seat 2500 is provided in the first lever 2100. The connector seat 2500 includes a seat surface 2510 on which the bracket 3100 is seated. The bracket 3100 includes a contact surface 3121, 3122, 3123 that is formed complementarily to the seat surface. In one embodiment, the seat surface 2510 of the connector seat has an elongated U shape, which is concave towards a bottom of the first lever 2100 when viewing the first lever 2100 from front. Thus, the connector seat 2500 can be positioned low in the first lever 2100 and the wiper blade 100 can have a total height that is low. Further, in one embodiment, the seat surface 2510 of the connector seat is positioned within the first lever 2100 when viewing the first lever 2100 from the top.

In one embodiment, the connector seat 2500 includes a stepped surface 2520 that is formed along a periphery of the seat surface 2510 and thus separates the connector seat 2500 from the first lever 2100. Further, the bracket 3100 includes a flange 3130 that is formed along a periphery of the contact surface 3121, 3122, 3123 of the bracket. The flange 3130 is formed complementarily to the stepped surface so as to fit on the stepped surface. Since the bracket 3100 is seated on the connector seat 2500 through engagement between the stepped surface and the flange, the bracket 3100 can be positioned to the connector seat 2500 with ease and accuracy.

The bracket 3100 can be positioned to the connector seat 2500 in such a way that one end of the bracket 3100 is inserted to one end of the connector seat 2500 corresponding to the one end of the bracket. In one embodiment, the connector seat 2500 includes an insertion slot 2531 at its one end and the bracket 3100 includes an insertion protrusion 3141, which is inserted to the insertion slot 2531. Further, after the one end of the bracket is inserted to the connector seat 2500, the bracket 3100 is rotated towards the connector seat 2500. Then, the bracket 3100 is fixed to the connector seat 2500 through snap engagement between the opposite end of the bracket 3100 or the portion of the bracket adjacent to the opposite end and the corresponding opposite end of the connector seat 2500 or the portion of the connector seat adjacent to the corresponding opposite end. In one embodiment, the connector seat 2500 includes a snap protrusion 2532, which protrudes in a width direction, at the vicinity of the opposite end and the bracket 3100 includes a snap slot 3142 which the snap protrusion 2532 snap-engages. Further, in one embodiment, a distance between longitudinal inner ends of the stepped surface 2520 of the connector seat is less than a distance between a tip end of the insertion protrusion and an edge of the flange located opposite the insertion protrusion. Thus, the bracket 3100 can be positioned to the connector seat in such a way of only inserting the insertion protrusion to the insertion slot. Further, in one embodiment, the bracket 3100 includes an ear portion 3134. A portion of the flange 3130, which corresponds to the snap slot, protrudes outwardly, thus forming the ear portion 3134. The ear portion defines the seat position of the bracket 3100 relative to the connector seat 2500 and therefore may be used for easy detachment of the bracket 3100.

The connector assembly 3000 of the wiper blade according to embodiments is suitable for at least six types of wiper arms 200, 300, 400, 500, 600, 700, which include differently configured coupling units at respective distal ends. The coupling units of said six types of wiper arms and the connector assembly 3000 are detachably connected through fixation in the front and rear directions, fixation in a vertical direction vertical to the front and rear directions, and fixation in a horizontal direction orthogonal to the front and rear directions and vertical to the vertical direction. The connector assembly 3000 includes: an adaptor 3200 rotatably attached to the lever assembly 2000; a slide cover 3300 slidably coupled to the adaptor; and a side lock cover 3400 detachably coupled to the adaptor 3200. The side lock cover 3400 is fixed to the adaptor in the front and rear directions, the vertical direction and the horizontal direction. If the slide cover 3300 is moved to the adaptor 3200 and thus covers top contact surfaces of the first to third coupling units, the first to third coupling units and the adaptor 3200 are fixed in the vertical direction. If portions of the fifth coupling unit and the sixth coupling unit pass through the side lock cover 3400 in the horizontal direction, the adaptor 3200 is fixed to the fifth coupling unit and the sixth coupling unit in the front and rear directions and the vertical direction. If the adaptor 3200 is inserted to the fourth coupling unit in the front and rear directions and is then fitted to a portion of the fourth coupling unit, the adaptor and the fourth coupling unit is fixed in the front and rear directions, the vertical direction and the horizontal direction. The slide movement of the slide cover 3300 relative to the adaptor 3200 allows the user to easily carry out the fixation and separation between the connector assembly 3000 and the coupling units.

Referring to FIGS. 1 to 42, a wiper blade 100 according to an embodiment includes a wiper rubber assembly 1000, a lever assembly 2000 and a connector assembly 3000. The wiper rubber assembly 1000 includes a wiper rubber. The lever assembly 2000 holds and supports the wiper rubber assembly 1000. The connector assembly 3000 is detachably joined to the lever assembly 2000 and is used for connection to wiper arms.

The wiper rubber assembly 1000 includes a wiper strip or wiper rubber 1100, which is placed on the surface of a windshield of a motor vehicle, and spring rails 1200, which are fitted to the wiper rubber 1100 and impart rigidity to the wiper rubber 1100.

Figure 6:
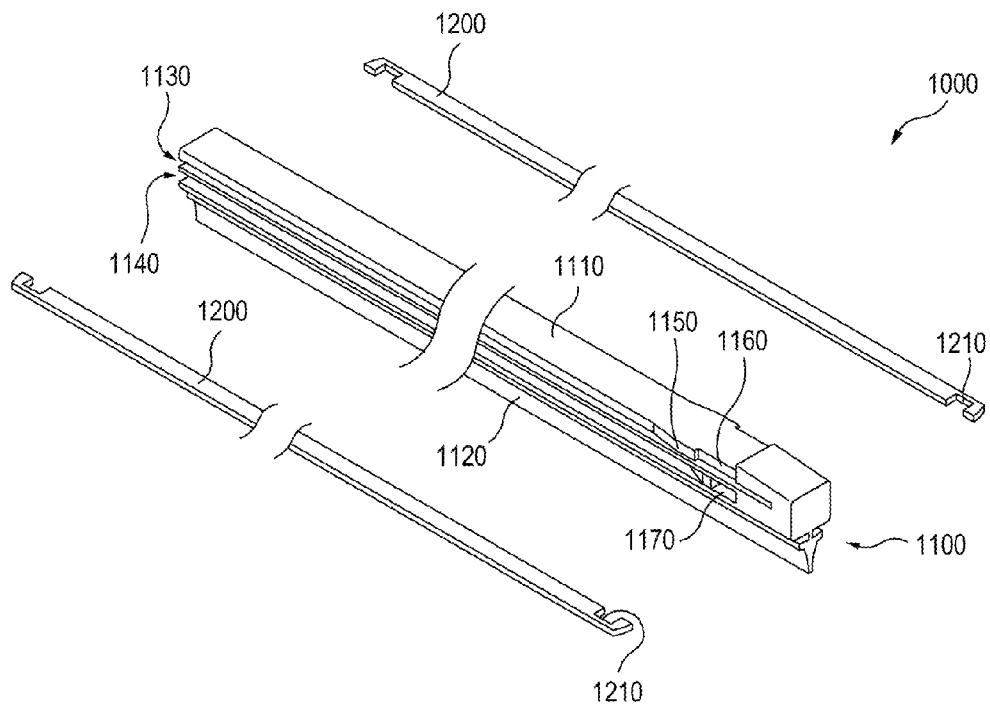
FIG. 6 is a perspective view showing a wiper rubber and spring rails constituting a wiper rubber assembly of the wiper blade according to an embodiment.
Figure 7:
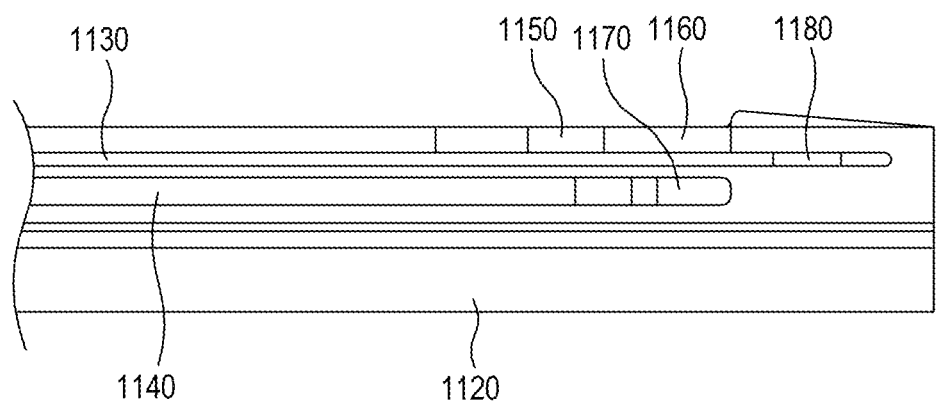
FIG. 7 is a fragmental front view of the wiper rubber shown in FIG. 6.
Figure 8:
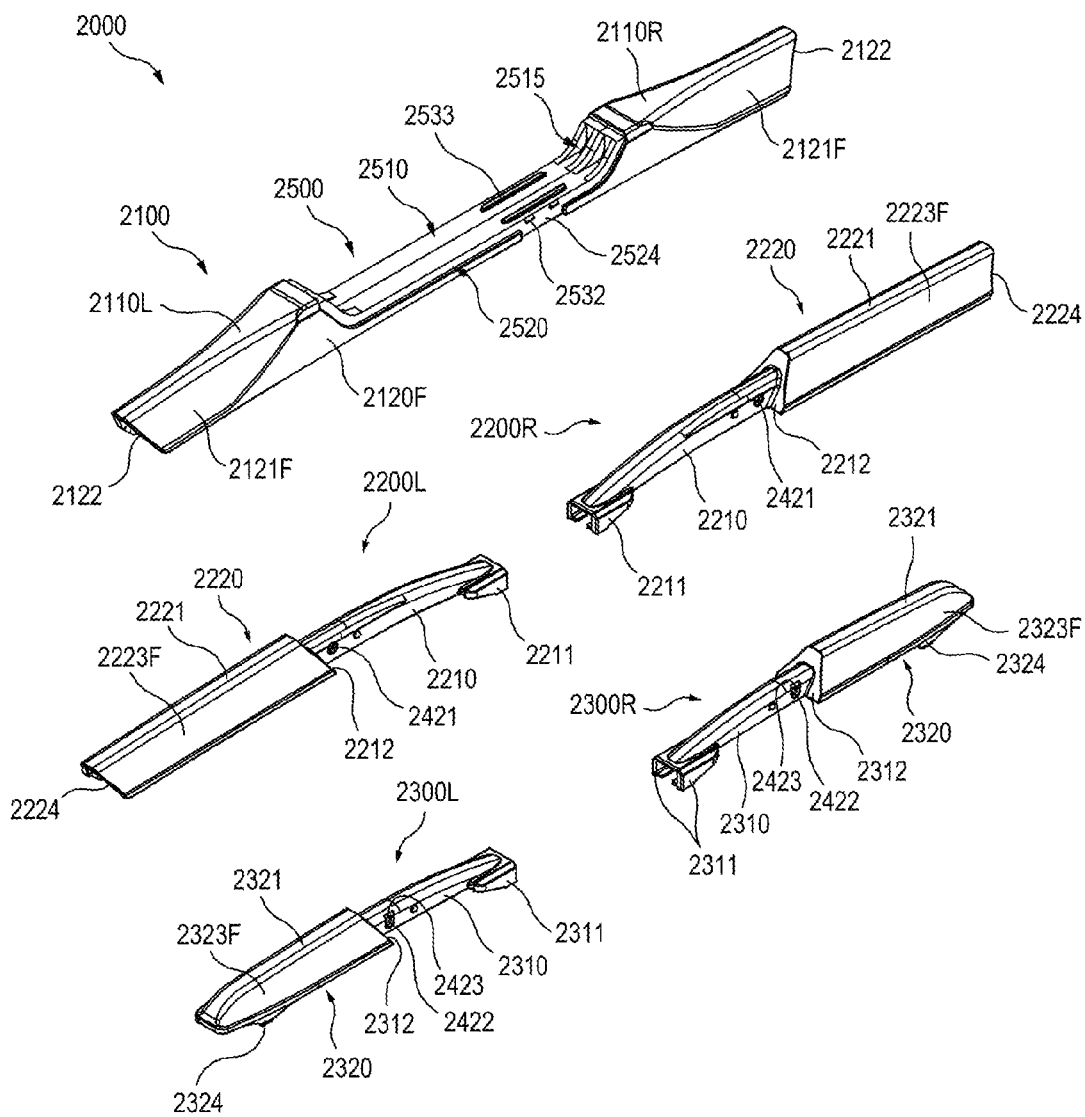
FIG. 8 is an exploded perspective view of a lever assembly of the wiper blade according to an embodiment.
Figure 9:
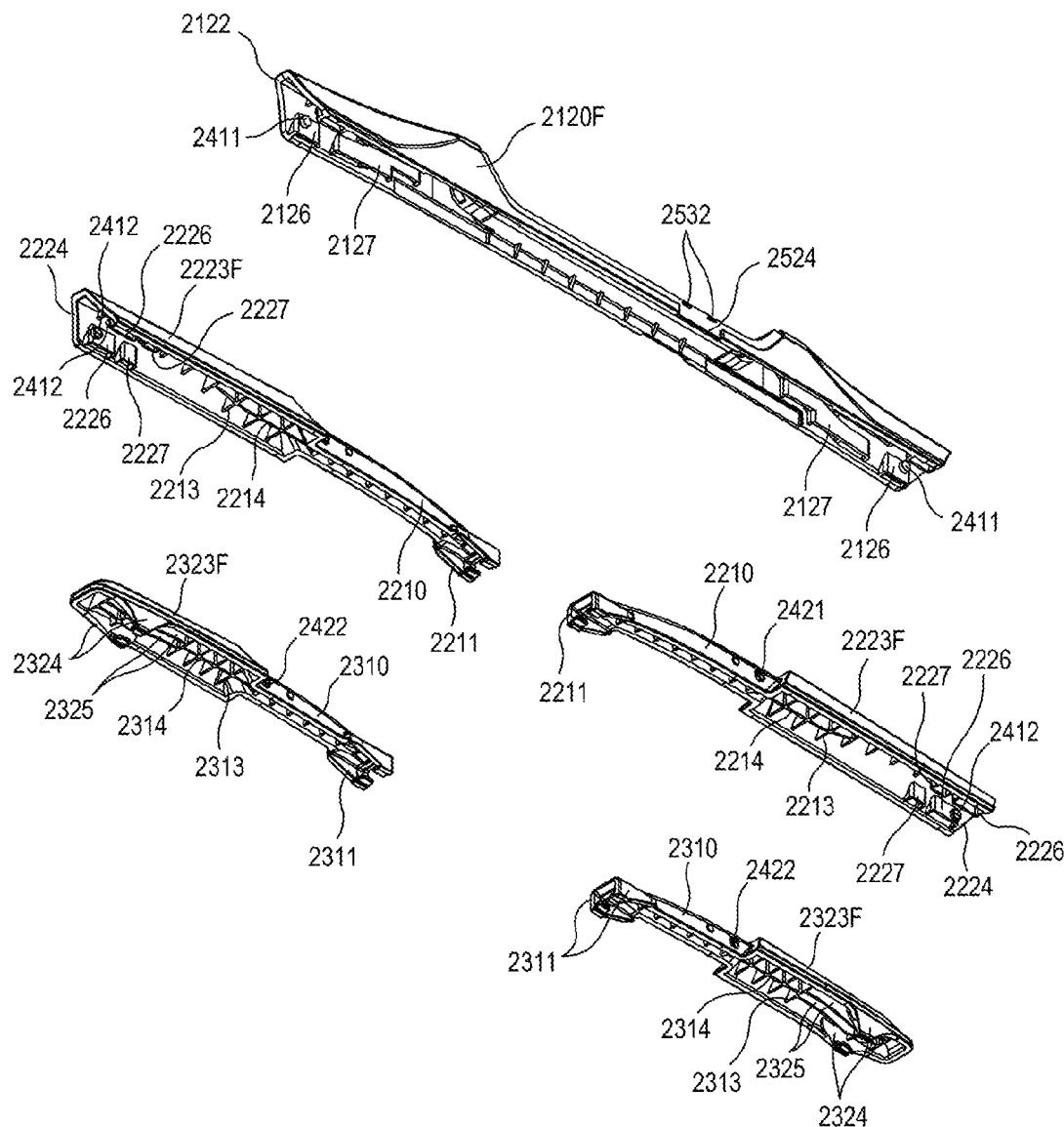
FIG. 9 is a lower perspective view of the lever assembly shown in FIG. 8.
Figure 10:
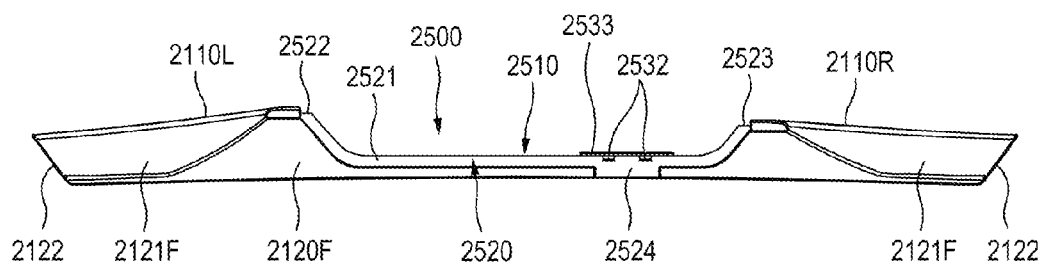
FIG. 10 is a front view of a first lever of the lever assembly shown in FIG. 8.
Figure 11:
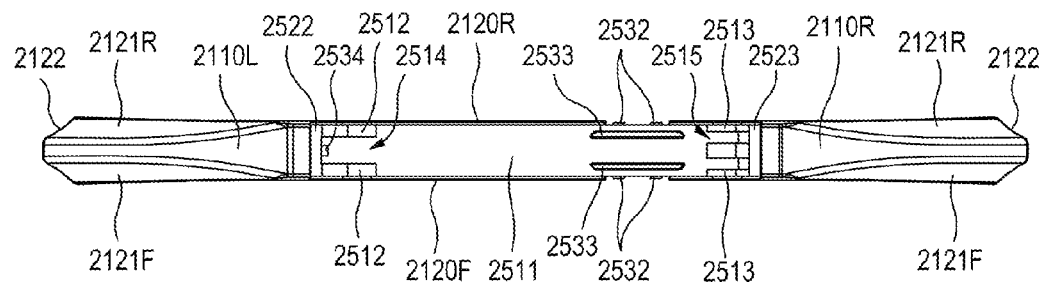
FIG. 11 is a top view of the first lever of the lever assembly shown in FIG. 8.
Figure 12:
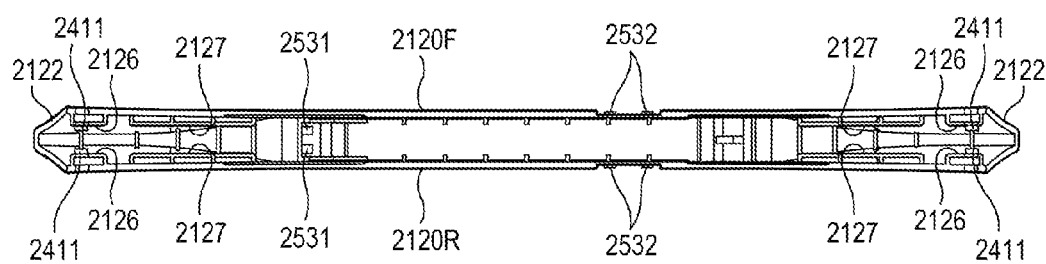
FIG. 12 is a bottom view of the first lever of the lever assembly shown in FIG. 8.
Figure 13:
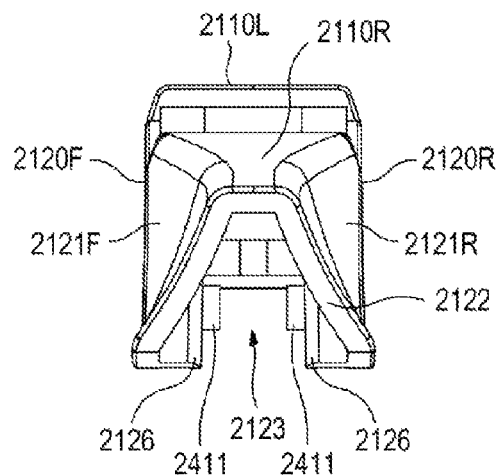
FIG. 13 is a right side view of the first lever of the lever assembly shown in FIG. 8.
Figure 14:
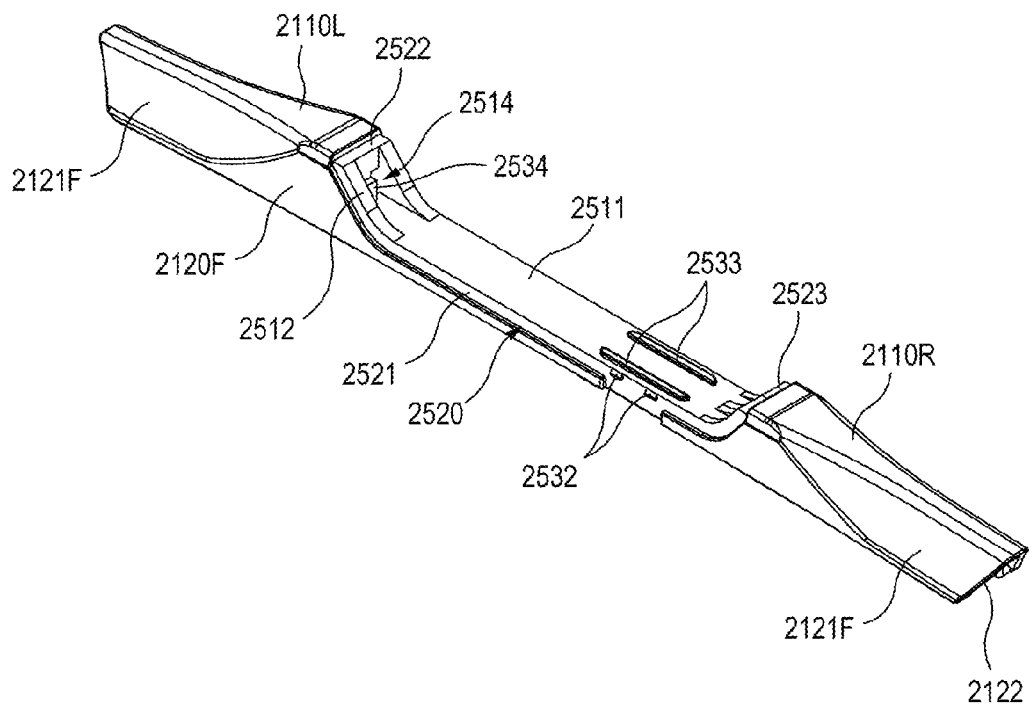
FIG. 14 is a perspective view of the first lever of the lever assembly shown in FIG. 8.
Figure 15:
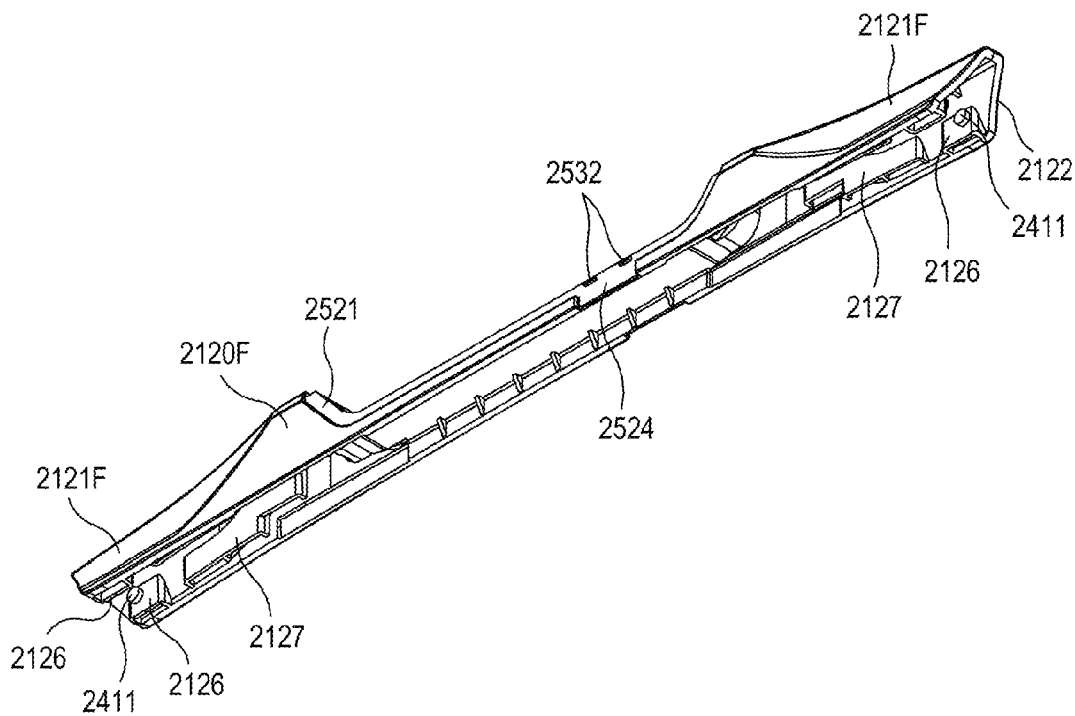
FIG. 15 is a lower perspective view of the first lever of the lever assembly shown in FIG. 8.
Figure 16:
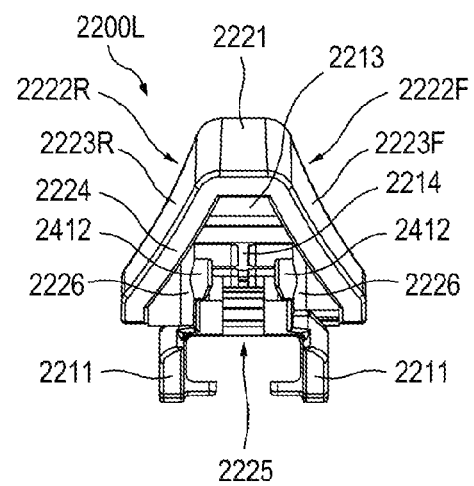
FIG. 16 is a left side view of a second lever of the lever assembly shown in FIG. 8.
Figure 17:
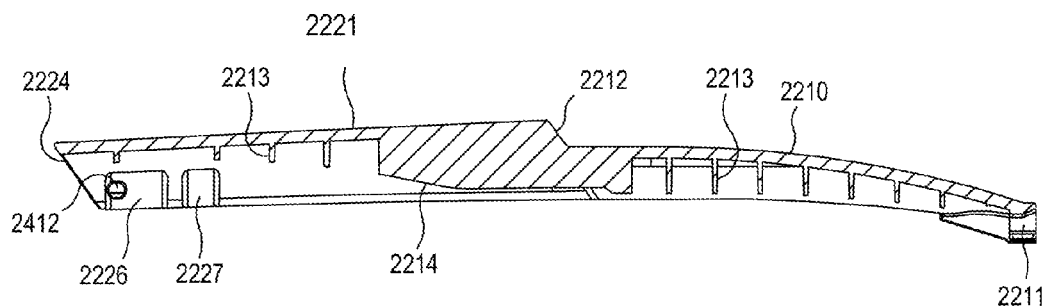
FIG. 17 is a longitudinal sectional view of a second lever of the lever assembly shown in FIG. 8.
Figure 18:
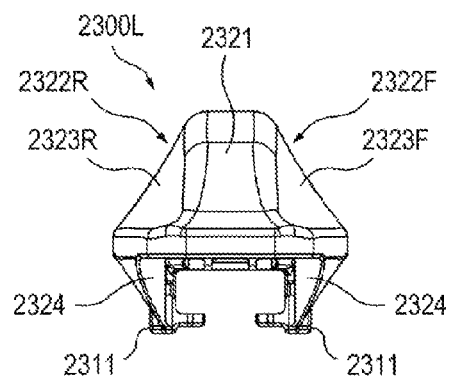
FIG. 18 is a left side view of a third lever of the lever assembly shown in FIG. 8.
Figure 19:
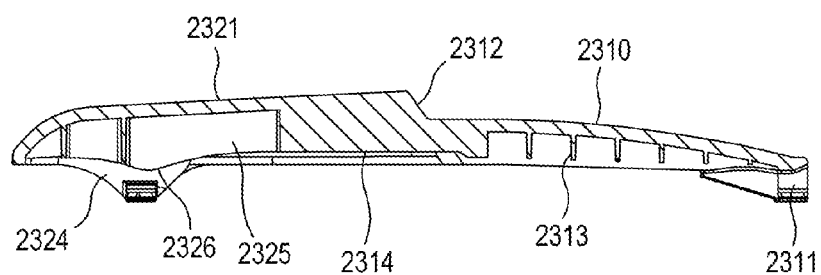
FIG. 19 is a longitudinal sectional view of the third lever of the lever assembly shown in FIG. 8.

The wiper rubber 1100 is made from a rubber or plastic material having elasticity. Referring to FIGS. 6 and 7, the wiper rubber 1100 has an elongated body portion 1110 and a wiper lip 1120 longitudinally extending under the body portion 1110 and contacting the windshield surface. Further, the wiper rubber 1100 has, at either side of the body portion 1110, two rows of grooves 1130, 1140 that extend in the longitudinal direction of the wiper rubber. A first groove 1130 extends along the body portion 1110 immediately below a top surface of the body portion 1110. A second groove 1140 extends along the body portion 1110 below the first groove 1130. The spring rails 1200 are inserted to the first grooves 1130 respectively. Fingers provided in the levers of the lever assembly 2000 are inserted to the second grooves 1140. In the vicinity of one end of the wiper rubber 1100, stoppers 1150 protrude between the top surface of the body portion 1110 and the first grooves 1130 and recesses 1160 are defined in edges of the top surface of the body portion 1110 due to the stoppers 1150. Further, insertion holes 1170, to which the tip ends of the outermost fingers among the fingers provided in the levers of the lever assembly 2000 are fitted, are formed below the recesses 1160 in the second grooves 1140 in the vicinity of one end of the second groove 1140. When the wiper rubber assembly 1000 and the lever assembly 2000 are assembled together, the tip ends of the outermost fingers are fitted to the insertion holes 1170 and the tip ends of other fingers are inserted to the second grooves 1140. Thus, the wiper rubber assembly 1000 is held by the lever assembly 2000.

The spring rails 1200 (referred to as a "vertebra" in the art) are fitted to the first grooves 1130 of the wiper rubber 1100 respectively. The spring rails 1200 distribute the pressure, which a wiper arm applies along the lever assembly 2000, along the longitudinal direction of the wiper rubber 1100. The spring rails 1200 are made from a metallic material and have a shape of a thin elongated bar. The spring rail 1200 has a notch 1210 at either end and the first groove 1130 has a protrusion 1180 corresponding to the notch 1210 therein. Some embodiments may include the spring rails 1200 that are inlaid or embedded to the body portion 1110 of the wiper rubber 1100 in the longitudinal direction.

The lever assembly 2000 holds the wiper rubber assembly 1000 (i.e., the wiper rubber 1100 with the spring rails 1200 fitted thereto) and supports the wiper rubber assembly 1000 with respect to the wiper arm. The wiper arm is connected to a rotating shaft of a wiper motor at its base end and is oscillated through the operation of the wiper motor. The wiper blade 100 is detachably attached to the distal end of the wiper arm via the connector assembly 3000, which is detachably mounted to the lever assembly 2000, and is thus connected to the wiper arm. The wiper blade 100 wipes the surface of the windshield while sliding on the surface of the windshield through oscillation motions of the wiper arm.

In this embodiment, the lever assembly 2000 includes the following: a first lever 2100 located centrally in the longitudinal direction; a pair of second levers 2200L, 2200R connected to the longitudinal outer ends of the first lever 2100 respectively; and a pair of third levers 2300L, 2300R connected to the second levers 2200L, 2200R respectively. The connector assembly 3000 for connection to the wiper arm is detachably joined to the first lever 2100. The first to third levers are formed in a linear shape and are adjoined linearly along the longitudinal direction of the wiper rubber 1100. The first to third levers have an elongated hollow shape and may be made by pressing a metallic sheet or injection-molding a plastic material. Adjacent two levers are rotatably connected to each other such that opposing end surfaces of said two levers face to each other with little gap therebetween.

When viewing the lever assembly 2000 from the top, a width of the lever assembly 2000 increases from the middle of the first lever 2100 towards the longitudinal outer ends of the first lever 2100. Further, when viewing the lever assembly 2000 from the front, the width of the lever assembly 2000 is constant in some section of the second levers 2200L, 2200R and the third levers 2300L, 2300R and decreases towards the longitudinal outer ends of the third levers 2300L, 2300R. When viewing the lever assembly 2000 from the top, front and rear halves of the lever assembly 2000 are symmetrical about a central axis of the longitudinal direction of the lever assembly. When viewing the lever assembly 2000 from the front, left and right halves of the lever assembly 2000 are symmetrical about a longitudinal center of the lever assembly except a top wall of the first lever 2100.

The lever assembly 2000 of the wiper blade 100 according to this embodiment includes a pair of spoilers 2600L, 2600R, which are integrated with the lever assembly. In this embodiment, as shown in FIGS. 4, 13, 16 and 18, the cross-sectional contour shape of the spoiler 2600L, 2600R includes a pair of concave curved lines that are symmetrical in the width direction of the lever assembly 2000. Each spoiler 2600L, 2600R comprises partial spoilers located in the first lever 2100, the second levers 2200L, 2200R and the third levers 2300L, 2300R. The partial spoilers of each lever are adjoined linearly one after another, thereby defining the spoiler 2600L, 2600R of the wiper blade 100. In the disclosure below discussing the wiper blade 100 according to the embodiment, a partial spoiler integrated in the first lever 2100 to become a part of the spoiler 2600L, 2600R is referred to as a first partial spoiler 2610L, 2610R, a partial spoiler integrated in the second lever 2200L, 2200R to become another part of the spoiler 2600L, 2600R is referred to as a second partial spoiler 2620L, 2620R, and a partial spoiler integrated in the third lever 2300L, 2300R to become yet another part of the spoiler 2600L, 2600R is referred to as a third partial spoiler 2630L, 2630R.

Referring to FIGS. 8 to 15, the first lever 2100 has a top wall 2110L, 2110R and a pair of lateral walls 2120F, 2120R. Further, a connector seat 2500 for seating the connector assembly 3000 is disposed in the middle of the first lever 2100. When viewing the first lever 2100 from the front, a bottom edge of the first lever 2100 is linear or upwardly convex with a slight curvature. Further, when viewing the first lever 2100 from the front, the height of the lateral wall 2120F, 2120R decreases from longitudinal ends of the connector seat 2500 towards the longitudinal outer ends of the first lever 2100. The end of the connector seat 2500 adjacent to the top wall 2110L is higher than the opposite end of the connector seat 2500 adjacent to the top wall 2110R. Further, when viewing the first lever 2100 from the top or the bottom, the midway width of the first lever 2100 is narrower than the width of the longitudinal outer ends. In another example of the first lever 2100, the height of the end of the connector seat 2500 adjacent to the top wall 2110L and the height of the opposite end of the connector seat 2500 adjacent to the top wall 2110R are the same. Further, the midway width the first lever 2100 is the same as or broader than the width of the longitudinal outer ends.

The first lever 2100 has a pair of first inclined surfaces 2121F, 2121R in the left lateral walls and the right lateral walls. The first inclined surfaces 2121F, 2121R extend from the vicinity of the longitudinal end of the connector seat 2500 up to the longitudinal outer end of the first lever 2100 and are inclined inwardly of the first lever 2100 in the width direction of the first lever 2100. Thus, when viewing the first lever 2100 from the side, the lateral walls of the first lever 2100 have an inverted V-shaped cross-section. The first partial spoiler 2610L, 2610R is integrated in the first lever 2100 through the first inclined surfaces 2121F, 2121R. The width of the top wall 2110L, 2110R becomes sharply narrow from the connector seat 2500 and is then constant. The first inclined surfaces 2121F, 2121R are concave in harmony with such a width of the top wall 2110L, 2110R. Thus, the cross-sectional contour shape of the first partial spoiler 2610L, 2610R, which the first inclined surfaces 2121F, 2121R define, includes a pair of concave curved lines that are symmetrical in the width direction of the first lever 2100.

The first lever 2100 has an arm receiving portion 2123 that receives a portion of the second lever 2200L, 2200R and hides the same therein. The arm receiving portion 2123 is defined by a space between the first inclined surfaces 2121F, 2121R. An end surface 2122 is formed at either longitudinal outer end of the first lever 2100. When viewing the first lever 2100 from the front, the end surface 2122 is inclined at an acute angle with respect to the top edge of the first lever and at an obtuse angle with respect to the bottom edge of the first lever, i.e., towards the longitudinal outer end of the lever assembly 2000 (towards a longitudinal outer end of the third lever 2300L, 2300R).

The connector seat 2500 is integrally provided in the first lever 2100 between the pair of the first inclined surfaces 2121F, 2121R located left in the first lever 2100 and the pair of the first inclined surfaces 2121F, 2121R located right in the first lever 2100. The connector seat 2500 is configured such that a bracket 3100 constituting the base of the connector assembly is seated on the connector seat and is fixed to the connector seat. The connector seat 2500 includes a seat surface 2510, on which the bracket 3100 is seated. Further, the connector seat 2500 includes a stepped surface 2520 separating the seat surface 2510 from the first lever 2100. The stepped surface 2520 is formed along the periphery of the seat surface 2510. Thus, due to the stepped surface 2520, the seat surface 2510 is located lower than the top walls 2110L, 2110R of the first lever and more inward than the lateral walls 2120F, 2120R of the first lever. Accordingly, the bracket 3100 of the connector assembly 3000 is coupled to the first lever 2100 in such a way that the bracket 3100 is seated on the seat surface 2510 and is positioned and retained by the stepped surface 2520.

In this embodiment, the seat surface 2510 of the connector seat is so shaped that the seat surface is sunken from the top wall 2110L, 2110R towards the lateral wall 2120F, 2120R at a certain depth. When viewing the first lever 2100 from the front, the seat surface 2510 has an elongated U shape. The stepped surface 2520 extends along the periphery of the seat surface 2510. Thus, the seat surface 2510 is separated from the top wall 2110L, 2110R and the lateral walls 2120F, 2120R via the stepped surface 2520.

The seat surface 2510 comprises a longitudinally-extending flat surface 2511 and first and second inclined surfaces 2512, 2513 extending from longitudinal ends of the flat surface 2511 respectively. The flat surface 2511 is located lower than the top edge of the first lever 2100 (the top wall 2110L 2110R). The first inclined surface 2512 and the second inclined surface 2513 are inclined at the same angle towards the longitudinal outer end of the first lever 2100 relative to the flat surface 2511.

The stepped surface 2520 comprises: a lateral stepped surface 2521, which extends alongside the flat surface 2511 and the first and second inclined surfaces 2512, 2513 and adjoins lateral edges of the flat surface 2511 and the first and second inclined surfaces 2512, 2513; and a first top stepped surface 2522 and a second top stepped surface 2523, which extends alongside top ends of the first and second inclined surfaces 2512, 2513 and adjoin the top ends of the first and second inclined surfaces 2512, 2513 respectively. When viewing the first lever 2100 from the front, the lateral stepped surface 2521 has an elongated U shape. The first and second top stepped surfaces 2522, 2523 are located at a certain depth below apex points of the top walls 2100L, 2110R of the first lever and the lateral stepped surface 2521 is located at a certain depth more inward than the lateral walls 2120F, 2120R of the first lever. Further, the connector seat 2500 includes an auxiliary stepped surface 2524 continued to the stepped surface 2520. The auxiliary stepped surface 2524 is formed adjacent to the second inclined surface 2513 between the lateral stepped surface 2521 and the bottom edge of the lateral wall 2120F, 2120R. Thus, the lateral wall 2120F, 2120R has a reduced thickness at the auxiliary stepped surface 2524.

The connector seat 2500 has recesses in the first and second inclined surfaces 2512, 2513 of the seat surface. Portions of the bracket are inserted to the recesses. The recesses are approximately L-shaped when viewing the first lever 2100 from the front. A first recess 2514, which is concave towards the longitudinal outer end of the first lever 2100, is formed in the first inclined surface 2512 and a pair of second recesses 2515, which are concave towards the longitudinal outer end of the first lever 2100, are formed in the second inclined surface 2513.

The connector seat 2500 includes a pair of insertion slots 2531 in the first recess 2514, which is located at the longitudinal outer end of the seat surface 2510. Insertion protrusions provided in the bracket 3100 are fitted to the insertion slots 2531. As to the stepped surface 2520, the first top stepped surface 2522 adjacent to the insertion slots 2531 is higher than the second top stepped surface 2523 located opposite the insertion slots 2531. Further, the connector seat 2500 includes a pair of snap protrusions 2532 at lateral edges of the flat surface 2511 of the seat surface. In this embodiment, the connector seat 2500 includes two pairs of snap protrusions 2532 and each snap protrusion in each pair is located in each lateral edge of the flat surface 2511. The snap protrusions 2532 are apart from the insertion slots 2531 and are located on the lateral stepped surface 2521 adjacent to the flat surface 2511. The snap protrusions 2532 are located above the auxiliary stepped surface 2524 and protrude in the width direction orthogonal to the longitudinal direction of the seat surface 2510. The snap protrusions 2532 snap-engage corresponding snap slots of the bracket 3100 of the connector assembly 3000, thereby fixing the connector assembly 3000 to the connector seat 2500. Further, the connector seat 2500 includes a pair of positioning ridges 2533 protruding on the flat surface 2511 of the seat surface. The positioning ridges 2533 are formed parallel to the auxiliary stepped surface 2524 and are fitted to positioning slots of the bracket 3100 of the connector assembly 3000. Further, the connector seat 2500 includes an insertion protrusion 2534 protruding between the pair of insertion slots 2531. The insertion protrusion 2534 is inserted into between the insertion protrusions of the bracket 3100 of the connector assembly 3000.

The second levers 2200L, 2200R are rotatably connected to the first lever 2100 respectively and holds the wiper rubber assembly 1000. Descriptions are made as to the second lever 2200L with reference to FIGS. 8, 9, 16 and 17.

The second lever 2200L, 2200R includes an arm portion 2210 and a spoiler portion 2220. When the first lever 2100 and the second lever 2200L, 2200R are assembled together, the arm portion 2210 is situated in the arm receiving portion 2123 of the first lever 2100. The spoiler portion 2220 extends from a longitudinal outer end of the arm portion 2210 towards the longitudinal outer end of the lever assembly 2000. The arm portion 2210 has an inverted U-shaped cross-section and the spoiler portion 2220 has an inverted V-shaped cross-section. Bottom edges of the arm portion 2210 and the spoiler portion 2220 form an approximately straight line or a concave curved line with slight curvature.

A stepped surface 2212, which is opposite the end surface 2122 of the first lever 2100, is formed at the boundary of the arm portion 2210 and the spoiler portion 2220. The stepped surface 2212 is inclined towards the longitudinal outer end of the lever assembly 2000 (the longitudinal outer end of the third lever 2300L, 2300R) at the same angle as the inclination angle of the end surface 2122 of the first lever 2100 or at an angle less than that. Further, the second lever 2200L, 2200R has an end surface 2224 at the longitudinal outer end thereof, i.e., the longitudinal outer end of the spoiler portion 2220. The end surface 2224 of the second lever 2200L, 2200R is inclined towards the longitudinal outer end of the lever assembly 2000 (the longitudinal outer end of the third lever 2300L, 2300R) at the same angle as the inclination angle of the end surface 2122 of the first lever or at an angle less than that.

Each second lever 2200L, 2200R has, at the longitudinal outer end of the arm portion 2210, a pair of fingers 2211 for grasping the wiper rubber assembly 1000. When viewing the second lever 2200L, 2200R from the side, the finger 2211 has an L shape. When assembling the second lever 2200L, 2200R and the wiper rubber assembly 1000, the tip ends of the fingers 2211 are inserted to the second grooves 1140 of the wiper rubber 1100 along the second grooves 1140. When the fingers 2211 are fitted to the wiper rubber 1100, the spring rail 1200 and a portion of the wiper rubber 1100 adjacent thereto are sandwiched between the fingers 2211 and the under surface of the arm portion 2210 located above the fingers 2211.

The spoiler portion 2220 has a top wall 2221 and a pair of lateral walls 2222F, 2222R. The spoiler portion 2220 has a pair of second inclined surfaces 2223F, 2223R in the lateral walls thereof. The second inclined surface 2223F, 2223R extends from the stepped surface 2212 up to the longitudinal outer end of the spoiler portion 2220 (i.e., up to the end surface 2224) and is inclined inwardly of the spoiler portion 2220 in the width direction of the spoiler portion 2220. The second partial spoiler 2620L, 2620R is integrated in the spoiler portion 2220 through the second inclined surfaces 2223F, 2223R. The width of the top wall 2221 is constant from the longitudinal inner end (the stepped surface 2212) to the longitudinal outer end (the end surface 2224). The cross-sectional contour shape of the second partial spoiler 2620L, 2620R, which the second inclined surfaces 2223F, 2223R define, includes a pair of concave curved lines that are symmetrical in the width direction of the spoiler portion 2220 (in the width direction of the second lever 2200L, 2200R).

The spoiler portion 2220 has an arm receiving portion 2225 that receives a portion of the third lever 2300L, 2300R and hides the same therein. The arm receiving portion 2225 is defined by a space between the second inclined surfaces 2223F, 2223R. The second lever 2200L, 2200R has a plurality of transverse ribs 2213 and a longitudinal rib 2214 therein. The transverse ribs 2213 are oriented in the width direction. The longitudinal rib 2214 is oriented in the longitudinal direction and intersects the transverse ribs 2213. The transverse ribs 2213 and the longitudinal rib 2214 are located in the arm portion 2210 as well as the spoiler portion 2220. Further, the transverse ribs 2213 and the longitudinal rib 2214 protrude such that they do not interfere with a portion of the third lever 2300L, 2300R.

The first lever 2100 and the second lever 2200L, 2200R are rotatably connected to each other through hinge-connection between the inside of the lateral walls 2120F, 2120R of the first lever and the outside of the arm portion 2210 of the second lever. When the first lever 2100 and the second lever 2200L, 2200R are connected, the arm portion 2210 of the second lever is situated in the arm receiving portion 2123 of the lateral walls 2120F, 2120R of the first lever 2100 and is thus hidden within the first lever 2100 when viewed from outside. In this embodiment, the hinge-connection portion configured to rotatably interconnect the first lever 2100 and the second levers 2200L, 2200R comprises: a pair of fitting protrusions 2411 disposed in the arm receiving portion 2123 of the first lever 2100; and a pair of fitting holes 2421, which are disposed in the arm portion 2210 of the second lever 2200L, 2200R, and to which the fitting protrusions 2411 are fitted respectively.

The first lever 2100 has, at the left and right thereof, two pairs of contact surfaces 2126, 2127 so that the second lever 2200L, 2200R hinge-joined to the first lever can be retained relative to the first lever 2100 without shake. The contact surfaces 2126, 2127 can contact the arm portion 2210 of the second lever in the width direction. The contact surfaces 2126, 2127 of each pair are located at the bottom edges of the inner surfaces of the lateral walls 2120F, 2120R. The contact surfaces 2126, 2127 of each pair are opposite each other and are raised inwardly of the first lever 2100. The fitting protrusion 2411 protrude from the contact surface 2126 inwardly of the first lever 2100 in the width direction of the first lever 2100. When the first lever 2100 and the second lever 2200L, 2200R are connected to each other, the arm portion 2210 is inserted into between the contact surfaces 2126, 2127 of each pair. Spacing between the contact surfaces 2126, 2127 of each pair is almost equal to or somewhat greater than the width of the arm portion 2210.

The fitting holes 2421 may be perforated through the lateral portions of the arm portion 2210 or be formed at a predetermined depth in the width direction of the second lever 2200L, 2200R. The fitting holes 2421 are located apart from the stepped surface 2212 of the second lever by the spacing between the end surface 2122 of the first lever and the fitting protrusion 2411.

The third levers 2300L, 2300R are rotatably connected to the second levers 2200L, 2200R respectively and hold the wiper rubber assembly 1000. Descriptions are made as to the third lever 2300L with reference to FIGS. 8, 9, 18 and 19. The third lever 2300L, 2300R includes an arm portion 2310 and a spoiler portion 2320. When the second lever 2200L, 2200R and the third lever 2300L, 2300R are assembled together, the arm portion 2310 is situated in the arm receiving portion 2225 of the second lever. The spoiler portion 2320 extends from a longitudinal outer end of the arm portion 2310 towards the longitudinal outer end of the lever assembly 2000. The arm portion 2310 has an inverted U-shaped cross-section and the spoiler portion 2320 has an inverted V-shaped cross-section. Bottom edges of the arm portion 2310 and the spoiler portion 2320 form an approximately straight line.

A stepped surface 2312, which is opposite the end surface 2224 of the second lever 2200L, 2200R, is formed at the boundary of the arm portion 2310 and the spoiler portion 2320. The stepped surface 2312 is inclined towards the longitudinal outer end of the lever assembly 2000 (the longitudinal outer end of the third lever 2300L, 2300R) at the same angle as the inclination angle of the end surface 2224 of the second lever or at an angle less than that.

Each third lever 2300L, 2300R has two pairs of fingers 2324, 2311 for grasping the wiper rubber assembly 1000. Longitudinal inner fingers 2311 are formed at a longitudinal inner end of the arm portion 2310. The fingers 2311 have the same configuration as the fingers 2211 of the second lever. Longitudinal outer fingers 2324 are formed at a bottom edge of the spoiler portion 2320 in the vicinity of a longitudinal outer end thereof. The fingers 2324 extend from the bottom edge of the spoiler portion 2320 in an L shape. When assembling the third lever 2300L, 2300R and the wiper rubber assembly 1000, the tip ends of the fingers 2311, 2324 are inserted to the second grooves 1140 of the wiper rubber 1100. A pair of longitudinally extending ribs 2325 are formed in the inside of the spoiler portion 2320 in which the fingers 2324 are provided. The portions of the ribs 2325, which are located above the tip ends of the fingers 2324 protrude downwardly to form a pressing portion 2326. When the lever assembly 2000 and the wiper rubber assembly 1000 are assembled together, the pressing portion 2326 presses the top surface of the body portion 1110 of the wiper rubber 1100 downwardly (towards the tip ends of the fingers 2324) or is placed on the top surface of the body portion 1110 of the wiper rubber 1100 with little gap. Thus, the fingers 2324 firmly clamp the wiper rubber 1100 by the pressing portion 2326.

The spoiler portion 2320 has a top wall 2321 and a pair of lateral walls 2322F, 2322R. The spoiler portion 2320 has a pair of third inclined surfaces 2323F, 2323R in the lateral walls thereof. The third inclined surface 2323F, 2323R extends from the stepped surface 2312 up to the longitudinal outer end of the spoiler portion 2320 and is inclined inwardly of the spoiler portion 2320 in the width direction of the spoiler portion 2320. The third partial spoiler 2630L, 2630R is integrated in the spoiler portion 2320 through the third inclined surfaces 2323F, 2323R. The width of the top wall 2321 is constant from the longitudinal inner end (the stepped surface 2312) up to the longitudinal outer end. The cross-sectional contour shape of the third partial spoiler 2630L, 2630R, which the third inclined surfaces 2323F, 2323R define, includes a pair of concave curved lines that are symmetrical in the width direction of the spoiler portion 2320 (in the width direction of the third lever 2300L, 2300R). Further, the height of the third inclined surfaces 2323F, 2323R decreases towards the longitudinal outer end of the third lever 2300L, 2300R. Further, the third inclined surfaces 2323F, 2323R may be curved with the same curvature as that of the second inclined surfaces 2223F, 2223R of the second lever 2200L, 2200R, or curved with a curvature varying therefrom. In this embodiment, the third inclined surfaces 2323F, 2323R of the third lever 2300L, 2300R are curved with the curvature greater than that of the second inclined surfaces 2223F, 2223R at the end surface 2224 of the second lever. Further, bottom edges of the third inclined surfaces 2323F, 2323R approach each other at the longitudinal outer end of the third lever 2300L, 2300R, thus forming a round outer end of the lever assembly 2000 together with the top wall 2310.

The third lever 2300L, 2300R has a plurality of transverse ribs 2313 and a longitudinal rib 2314 therein. The transverse ribs 2313 are oriented in the width direction. The longitudinal rib 2314 is oriented in the longitudinal direction and intersects the transverse ribs 2313. The transverse ribs 2313 and the longitudinal rib 2314 are located in the arm portion 2310 as well as the spoiler portion 2320.

The second lever 2200L, 2200R and the third lever 2300L, 2300R are rotatably connected to each other through hinge-connection between the inside of the lateral walls 2222F, 2222R of the second lever and the outside of the arm portion 2310 of the third lever. When the second lever 2200L, 2200R and the third lever 2300L, 2300R are connected, the arm portion 2310 of the third lever is situated in the arm receiving portion 2225, which is located in the lateral walls 2222F, 2222R of the second lever 2200L, 2200R, and is thus hidden within the second lever 2200L, 2200R when viewed from outside. In this embodiment, the hinge-connection portion configured to rotatably interconnect the second lever 2200L, 2200R and the third lever 2300L, 2300R comprises: a pair of fitting protrusions 2412 disposed in the arm receiving portion 2225 of the spoiler portion 2220 of the second lever; and a pair of fitting holes 2422, which are disposed in the arm portion 2310 of the third lever, and to which the fitting protrusions 2412 are fitted respectively.

The second lever 2200L, 2200R has two pairs of contact surfaces 2226, 2227 so that the third lever 2300L, 2300R hinge-joined to the second lever can be retained relative to the second lever 2200L, 2200R without shake. The contact surfaces 2226, 2227 can contact the arm portion 2310 of the third lever in the width direction. The contact surfaces 2226, 2227 of each pair are located opposite each other in the inner surface of the spoiler portion 2220 of the second lever and are raised inwardly of the second lever. The fitting protrusion 2412 protrude from the contact surface 2226 inwardly of the second lever in the width direction of the second lever. The fitting protrusions 2412 have a beveled surface at a lower portion of a tip end thereof to facilitate fitting to the fitting holes 2422. When the second 2200L, 2200R and the third lever 2300L, 2300R are connected to each other, the arm portion 2310 of the third lever is inserted or fitted into between the contact surfaces 2226, 2227 of each pair. Spacing between the contact surfaces 2226, 2227 of each pair is almost equal to or somewhat greater than the width of the arm portion 2310 of the third lever.

The fitting holes 2422 may be perforated through the lateral portions of the arm portion 2310 or be formed at a predetermined depth in the width direction of the third lever 2300L, 2300R. The fitting holes 2422 are apart from the stepped surface 2312 of the third lever by the spacing between the end surface 2224 of the second lever and the fitting protrusion 2412. Guide grooves 2423 for guiding the insertion of the fitting protrusions 2412 are formed from a top surface of the arm portion 2310 of the third lever to the fitting holes 2422 respectively.

Figure 20:
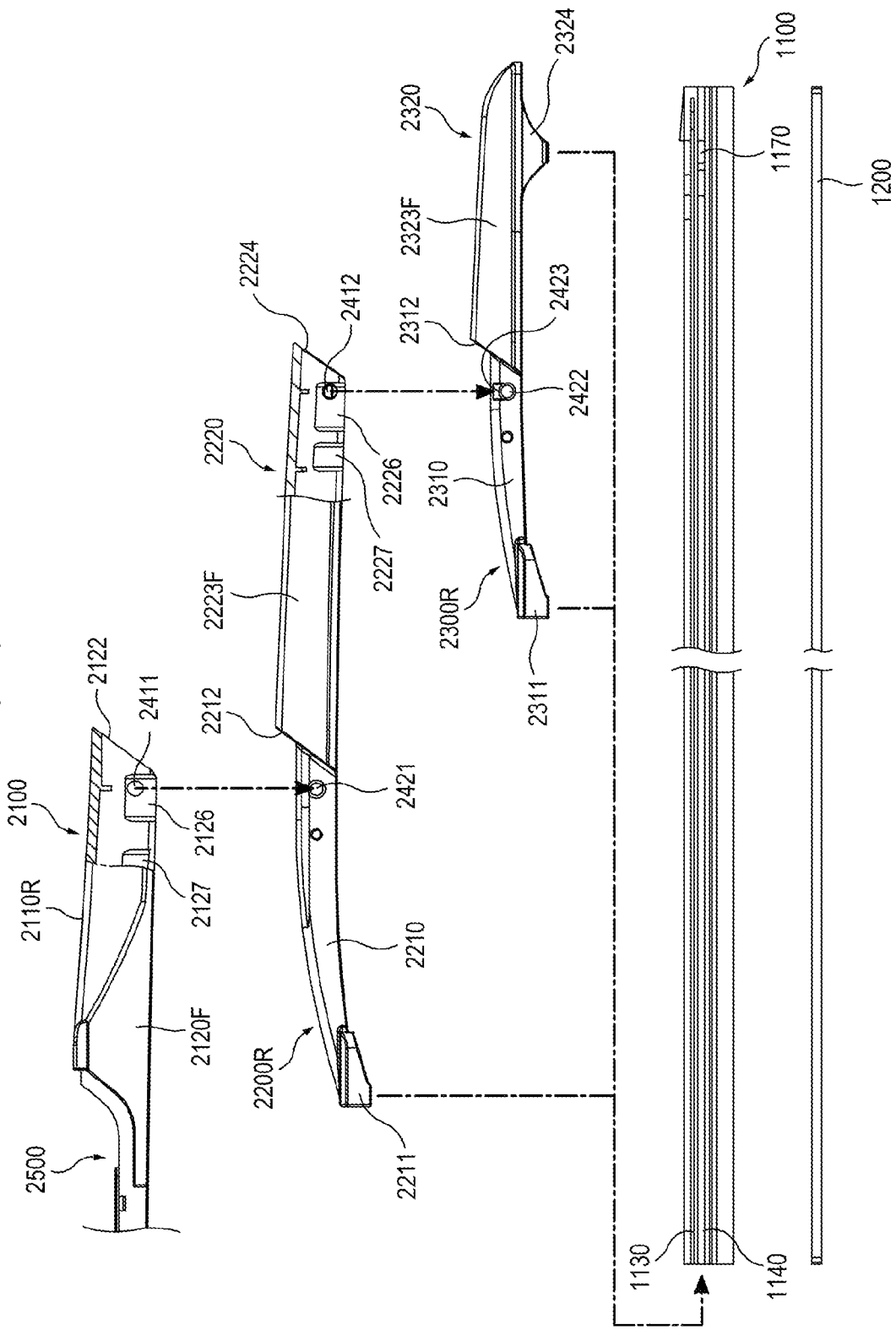
FIG. 20 shows an assembly example of the lever assembly.
Figure 21:
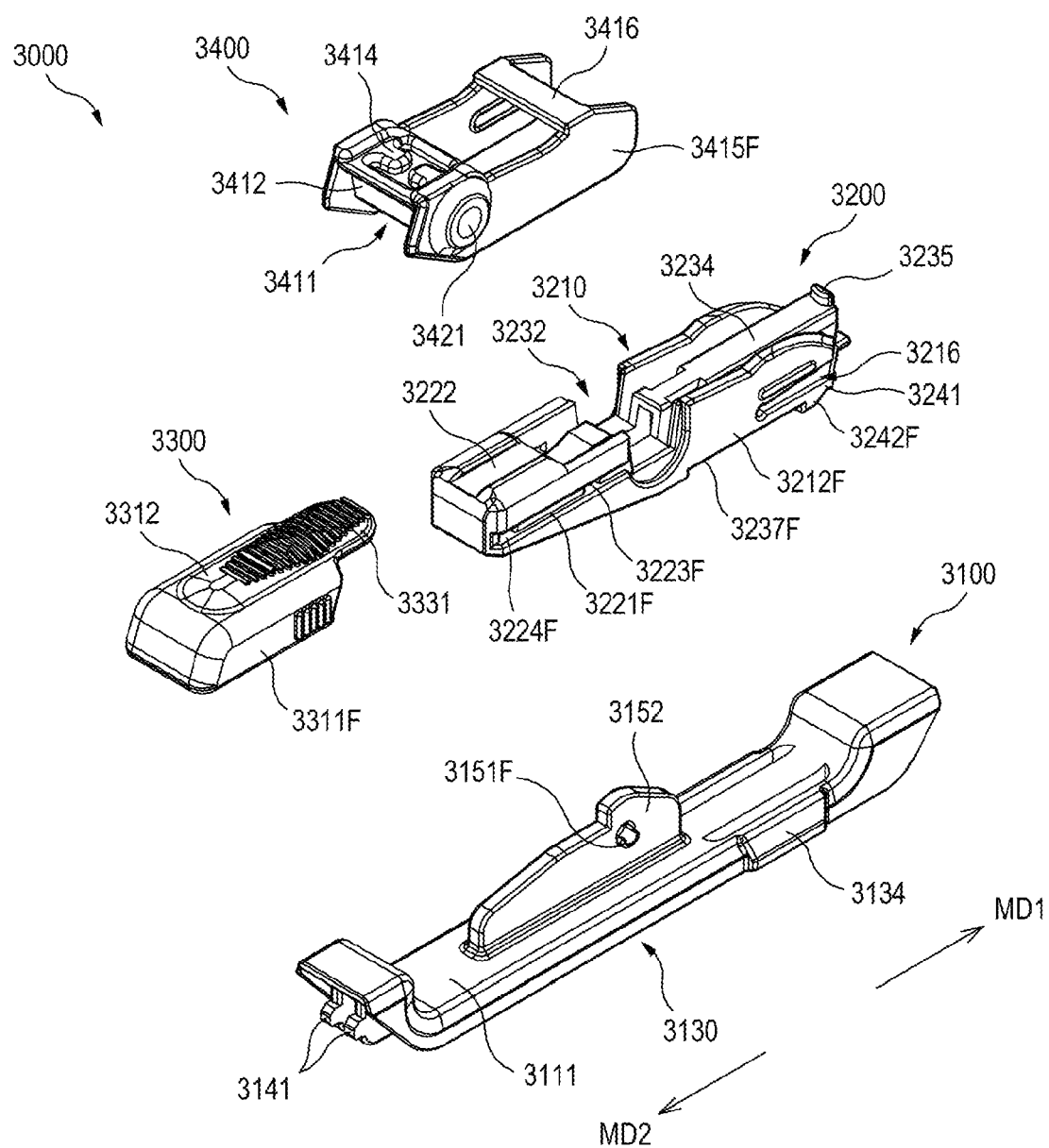
FIG. 21 is an exploded perspective view of a connector assembly of the wiper blade according to an embodiment.
Figure 22:
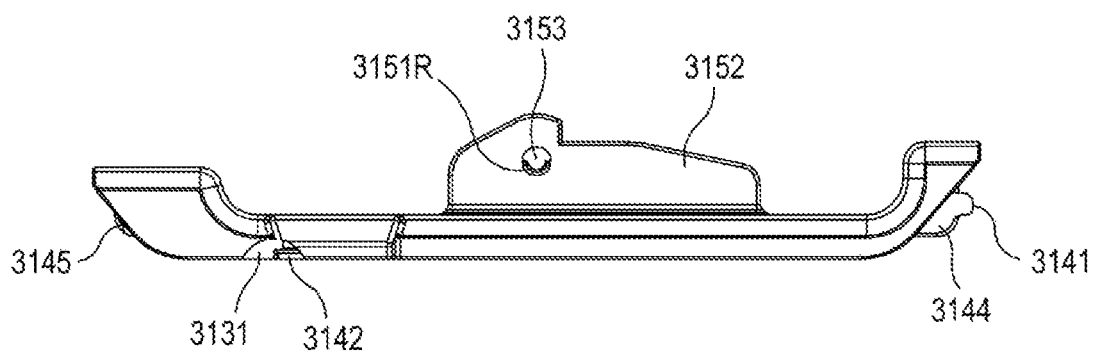
FIG. 22 is a rear view of a bracket of the connector assembly shown in FIG. 21.
Figure 23:
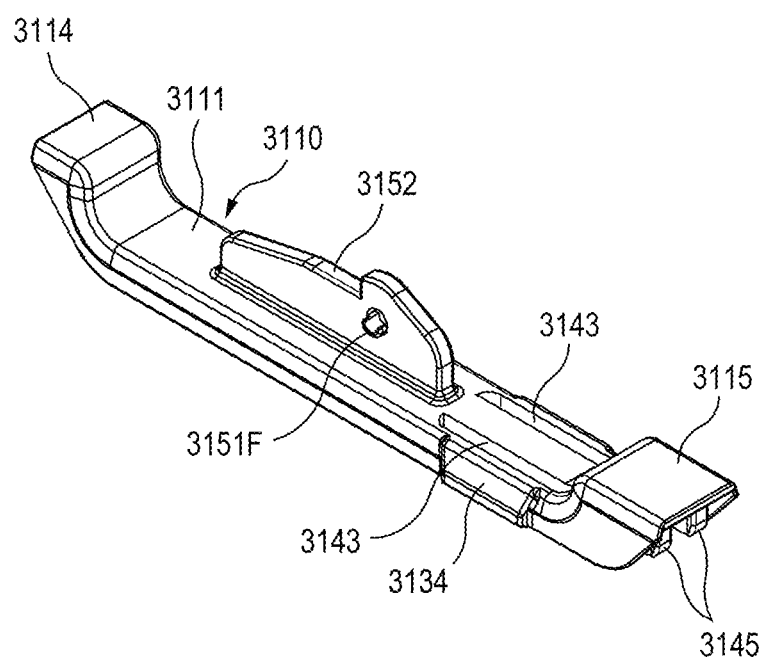
FIG. 23 is a perspective view of the bracket of the connector assembly shown in FIG. 21.
Figure 24:
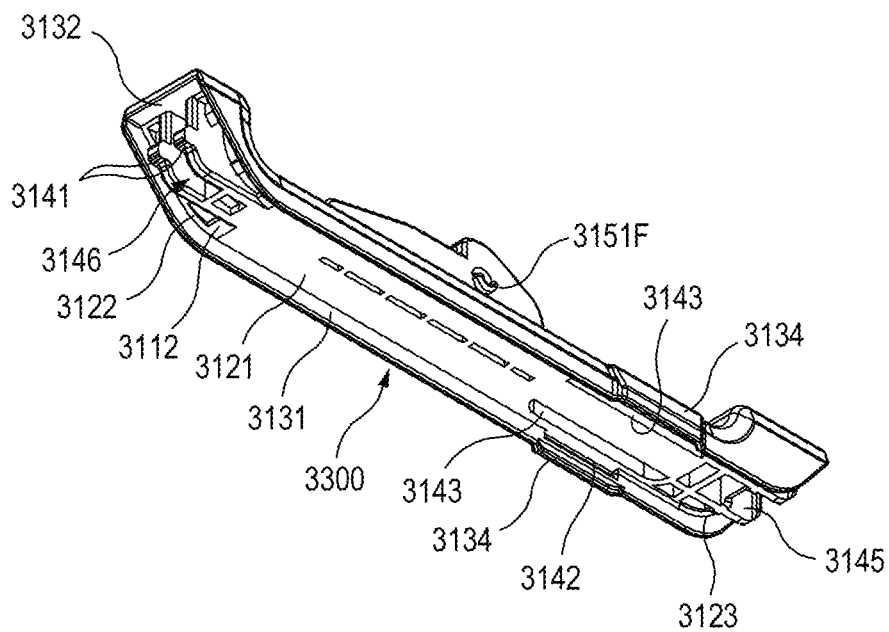
FIG. 24 is a lower perspective view of the bracket of the connector assembly shown in FIG. 21.
Figure 25:
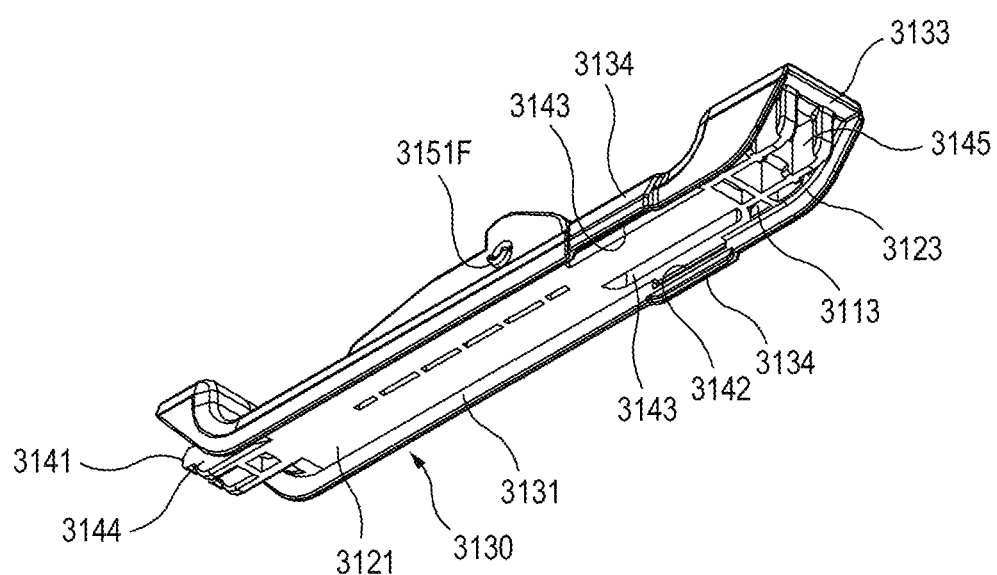
FIG. 25 is a lower perspective view of the bracket of the connector assembly shown in FIG. 21.

Descriptions are made as to an assembly example of the lever assembly 2000 and an assembly example of the wiper rubber assembly 1000 and the lever assembly 2000 with reference to FIG. 20.

The end surface 2122 located at the longitudinal outer end of first lever 2100 and the stepped surface 2212 of the second lever 2200L, 2200R are approached to each other and one of the first and second levers is pressed towards the other of the first and second levers. Then, the fitting protrusions 2411 of the first lever 2100 enter the fitting holes 2421 of the arm portion 2210 of the second lever 2200R while pressing or pinching an upper portion of the arm portion 2210. Subsequently, the fitting protrusions 2411 are fitted to the fitting holes 2421 through snap-engagement manner, thereby hinge-joining the first lever 2100 and the second lever 2200R to each other. If the first lever 2100 and the second lever 2200R are connected to each other, a portion of the arm portion 2210 of the second lever adjacent to the fitting hole 2421 and another portion located further inward than said portion are sandwiched between the contact surfaces 2126 as well as between the contact surfaces 2127. The second lever 2200R and the third lever 2300R are connected to each other in the above-described manner. That is, the end surface 2224 of the second lever 2200R and the stepped surface 2312 of the third lever 2300R are approached to each other and one of the second and third levers is pressed towards the other of the second and third levers. Then, the fitting protrusions 2412 of the second lever 2200R are fitted to the fitting holes 2422 of the arm portion 2310 of the third lever 2300R through snap-engagement manner, thereby hinge-joining the second lever 2200R and the third lever 2300R to each other. Hinge-connection between the first lever 2100 and the second lever 2200L and hinge-connection between the second lever 2200L and the third lever 2300L are made in the same manner as the above-described manner.

By fitting the fingers 2324, 2311 of the third levers 2300L, 2300R and the fingers 2211 of the second levers 2200L, 2200R to the second groove 1140 of the wiper rubber 1100, the wiper rubber assembly 1000 and the lever assembly 2000 are assembled together. For example, the fingers 2324, 2311 of the third lever 2300R, the fingers 2211 of the second lever 2200R, the fingers 2211 of the second lever 2200L and the fingers 2311, 2324 of the third lever 2300L are inserted to the second grooves 1140 of the wiper rubber one after another while sliding the wiper rubber assembly 1000 along the lever assembly 2000. If the tip ends of the fingers 2324 of the third lever 2300R are fitted to the insertion holes 1170, then the wiper rubber assembly 1000 is fixed to the lever assembly 2000.

Referring again to FIGS. 1 to 3 showing the assembled wiper blade 100, the lever assembly 2000 holds and supports the wiper rubber assembly 1000 at six pressure points by means of the fingers 2324, 2311 and the fingers 2211. Further, the first lever 2100, the second levers 2200L, 2200R and the third levers 2300L, 2300R are arranged linearly along the longitudinal direction of the wiper rubber 1100 and are at the same height on the wiper rubber 1100. Further, in the assembled wiper blade 100, the first inclined surfaces 2121F, 2121R of the first lever, the second inclined surfaces 2223F, 2223R of the second lever and the third inclined surfaces 2323F, 2323R of the third lever are adjoined linearly one after another, thereby defining the spoiler 2600L, 2600R, which has the cross-sectional contour shape varying along the longitudinal direction of the lever assembly 2000 and has a decreasing height dimension. The end surface 2122 of the first lever 2100, the stepped surface 2122 and the end surface 2224 of the second lever 2200L, 2200R and the stepped surface 2312 of the third lever 2300L, 2300R are inclined towards the longitudinal outer end of the lever assembly 2000 at an acute angle relative to the top and bottom edges of the lever assembly 2000. Further, the end surface 2122 of the first lever 2100 and the stepped surface 2212 of the second lever 2200L, 2200R have a slight play therebetween and the end surface 2224 of the second lever 2200L, 2200R and the stepped surface 2312 of the third lever 2300L, 2300R have a slight play therebetween. The second lever 2200L, 2200R and the third lever 2300L, 2300R can rotate upwardly relative to the first lever 2100 to a little extent. In contrast, when a downward load acts on the wiper blade 100, the lever assembly 2000 can bring the wiper rubber assembly 1000 into strong contact with the windshield. Further, the stepped surface 2212 of the second lever is inclined at an angle less than the end surface 2122 of the first lever, and the stepped surface 2312 of the third lever is inclined at an angle less than the end surface 2224 of the second lever. Accordingly, when a downward load acts on the wiper blade 100, the lever assembly 2000 can transmit the pressing force, which is applied from the wiper arm, to the wiper rubber assembly 1000 at almost the same magnitude without decreasing towards the both ends of the wiper rubber assembly 1000.

In some embodiments, the fitting protrusions 2411, 2412 constituting the hinge-connection portion may be disposed in the arm portion 2210 of the second lever and the arm portion 2310 of the third lever and the fitting holes 2421, 2422 may be disposed in the arm receiving portion 2123 of the first lever and the arm receiving portion 2225 of the second lever. Further, wiper blades according to other embodiments may be configured to hold the wiper rubber assembly 1000 at four, eight or more pressure points by means of the above-described hinge-connection portion. For example, when the wiper rubber assembly 1000 is held at four pressure points, the lever assembly of the wiper blade 100 may comprise the first lever 2100 and a pair of the third levers 2300L, 2300R connected to the first lever by means of the above-described hinge-connection portion. Further, when the wiper rubber assembly 1000 is held at eight pressure points, the lever assembly of the wiper blade 100 may include an additional lever, which is shaped and configured similarly to the second lever 2200L, 2200R, between the first lever 2100 and the second lever 2200L, 2200R or between the second lever 2200L, 2200R and the third lever 2300L, 2300R.

The wiper blade 100 according to the embodiment that includes the above-described wiper rubber assembly 1000 and lever assembly 2000 is connected to at least six types of wiper arms via the connector assembly 3000. Said six types of wiper arms include different coupling units at respective distal ends. Herein, the six types of wiper arms are referred to as first to sixth wiper arms respectively, and the coupling units provided in their distal ends are referred to as first to sixth coupling units respectively. The connector assembly 3000 includes: an adaptor which contacts the first to fourth coupling units; a slide cover which is slidably coupled to the adaptor; and a side lock cover which is detachably coupled to the adaptor and contacts the fifth and sixth coupling units. The adaptor of the connector assembly 3000 and the first to sixth coupling units are connected through the fixation in front and rear directions FRD, the fixation in a vertical direction VD vertical to the front and rear directions FRD and the fixation in a horizontal direction HD orthogonal to the front and rear directions FRD and vertical to the vertical direction VD. The front and rear directions FRD are parallel to the longitudinal direction of the lever assembly 2000. The slide cover slides to the adaptor, accomplishing the fixation in the vertical direction between the adaptor and the first to third coupling units. The side lock cover is coupled to the adaptor, participating in the connection to the fifth and sixth coupling units.

Figure 43:
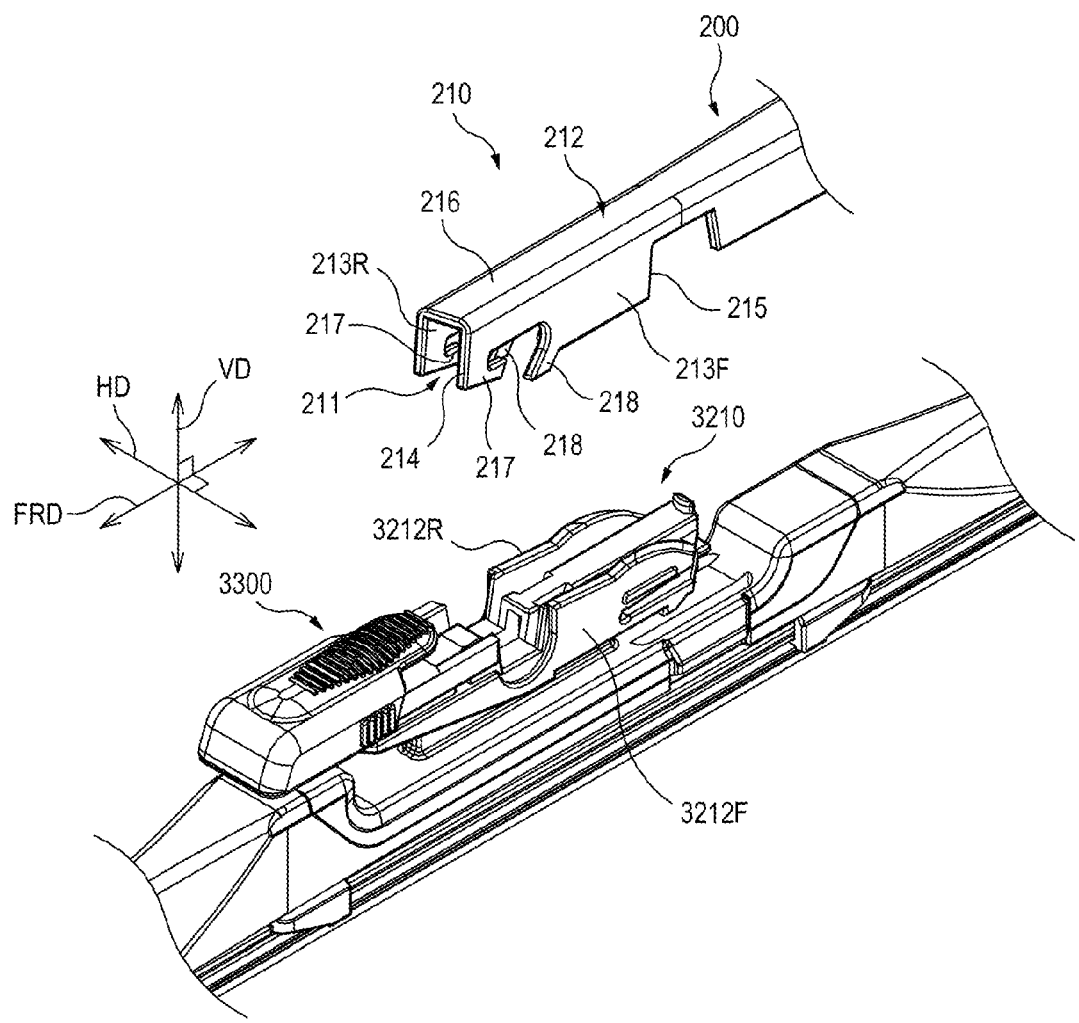
FIG. 43 is a perspective view showing the wiper blade according to an embodiment and a first wiper arm.

Referring to FIG. 43, the first wiper arm 200, to which the wiper blade 100 according to the embodiment is connected, includes the first coupling unit 210 at its distal end. The first coupling unit 210 includes a receiving portion 211 that receives a portion of the adaptor of the connector assembly 3000. The receiving portion 211 is defined by a top plate 212 and a pair of lateral plates 213F, 213R extending vertically from both lateral edges of the top plate 212. The receiving portion 211 of the first coupling unit 210 is formed with a front contact surface 214 and a rear contact surface 215, which are used for the fixation in the front and rear directions FRD, and a top contact surface 216, which is used for the fixation in the vertical direction VD. The front contact surface 214 and the rear contact surface 215 are apart from each other in the front and rear directions FRD. The front contact surface 214 of the first coupling unit 210 comprises front surfaces of the lateral plates 213F, 213R and the rear contact surface 215 of the first coupling unit comprises rear surfaces of the lateral plates 213F, 213R. The top contact surface 216 of the first coupling unit 210 comprises a top surface of the top plate 212. Further, the first coupling unit 210 has a front hook 217, which extends from a front end of each lateral plate 213F, 213R, and a rear hook 218, which is spaced apart from the front hook 217.

Figure 47:
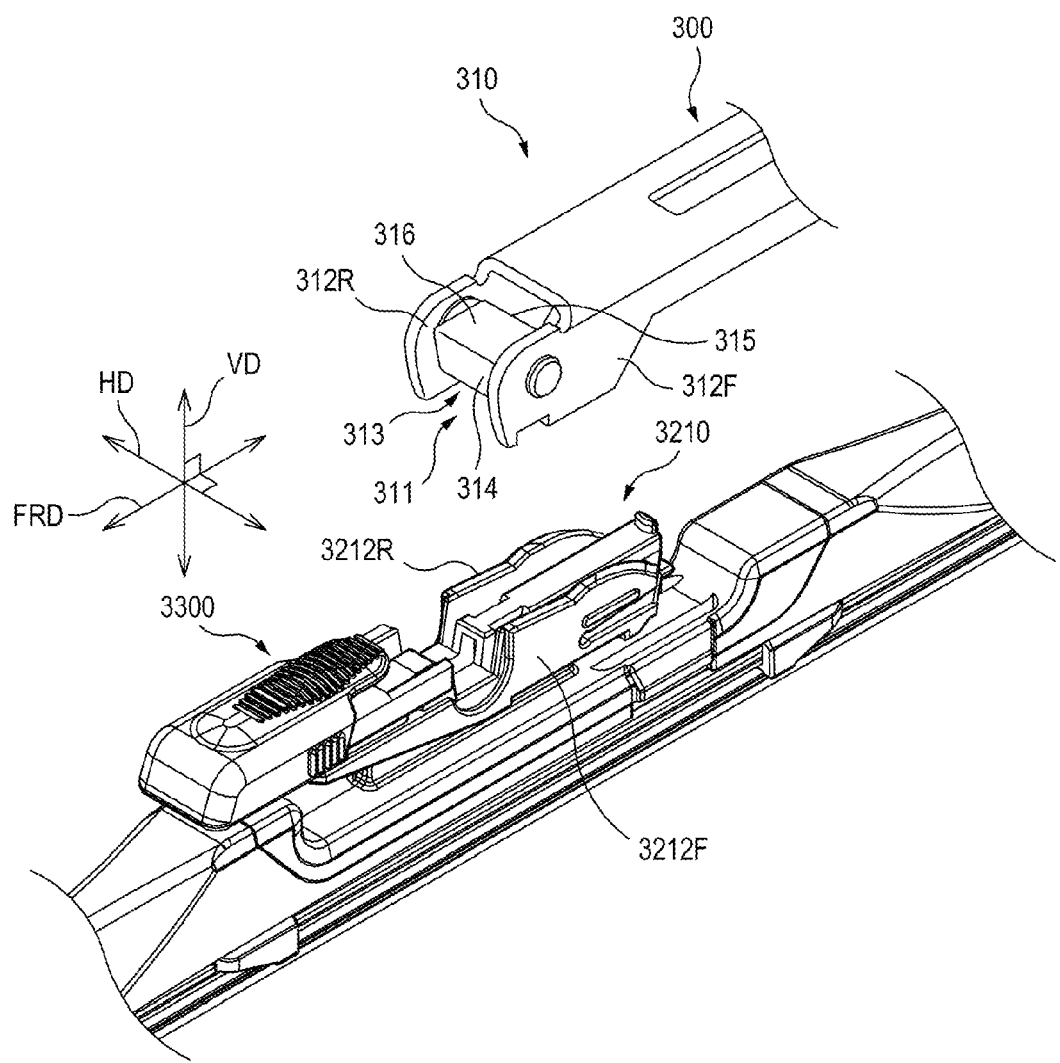
FIG. 47 is a perspective view showing the wiper blade according to an embodiment and a second wiper arm.

Referring to FIG. 47, the second wiper arm 300, to which the wiper blade 100 according to the embodiment is connected, includes the second coupling unit 310 at its distal end. The second coupling unit 310 includes a receiving portion 311 that receives a portion of the adaptor of the connector assembly 3000. The receiving portion 311 is defined by a pair of lateral plates 312F, 312R. The receiving portion 311 has a rotator 313 that is joined to the lateral plates 312F, 312R through a pin joint at front end portions of the lateral plates 312F, 312R and is therefore rotatable. The front end portions of the lateral plates 312F, 312R are apart from each other and thus a top surface of the rotator 313 is exposed between the front end portions of the lateral plates 312F, 312R. The cross-sectional shape of the rotator 313 is a rectangle and the longitudinal-sectional shape of the rotator is an isosceles trapezoid. The rotator 313 of the second coupling unit 310 is formed with a front contact surface 314 and a rear contact surface 315, which are used for the fixation in the front and rear directions FRD, and a top contact surface 216 which is used for the fixation in the vertical direction VD. The front contact surface 314 and the rear contact surface 315 are apart from each other in the front and rear directions FRD and comprise front and rear surfaces of the rotator 313 respectively. The top contact surface 316 comprises the top surface of the rotator 313.

Figure 51:
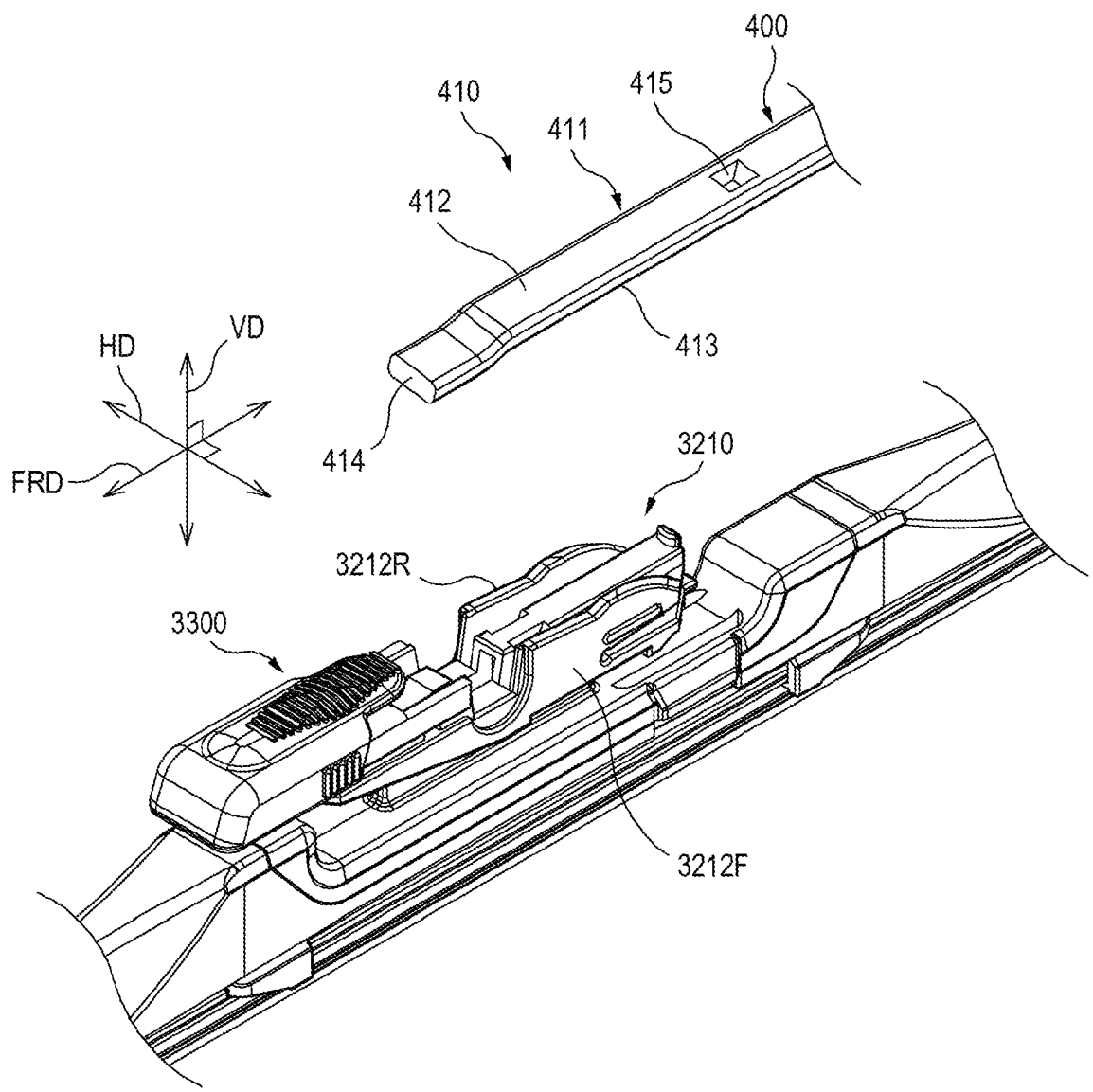
FIG. 51 is a perspective view showing the wiper blade according to an embodiment and a third wiper arm.

Referring to FIG. 51, the third wiper arm 400, to which the wiper blade 100 according to the embodiment is connected, includes the third coupling unit 410 at its distal end. The third coupling unit 410 includes a bar 411, which is seated on a portion of the adaptor of the connector assembly 3000, and an opening 415 perforated in the bar 411 in the vertical direction VD. The bar 411 of the third coupling unit 410 is formed with a top contact surface 412 and a bottom contact surface 413 which are used for the fixation in the vertical direction VD and are apart from each other in the vertical direction VD. The top contact surface 413 comprises a top surface of the bar 411 and the bottom contact surface 413 comprises a bottom surface of the bar 411. Front and rear contact surface, which participate in the fixation of the third coupling unit 410 in the front and rear directions FRD, are front and rear surfaces of the opening 415 respectively. Further, the bar 411 of the third coupling unit 410 includes a curved tongue 414 extending frontward from a front end of the bar 411.

Figure 55:
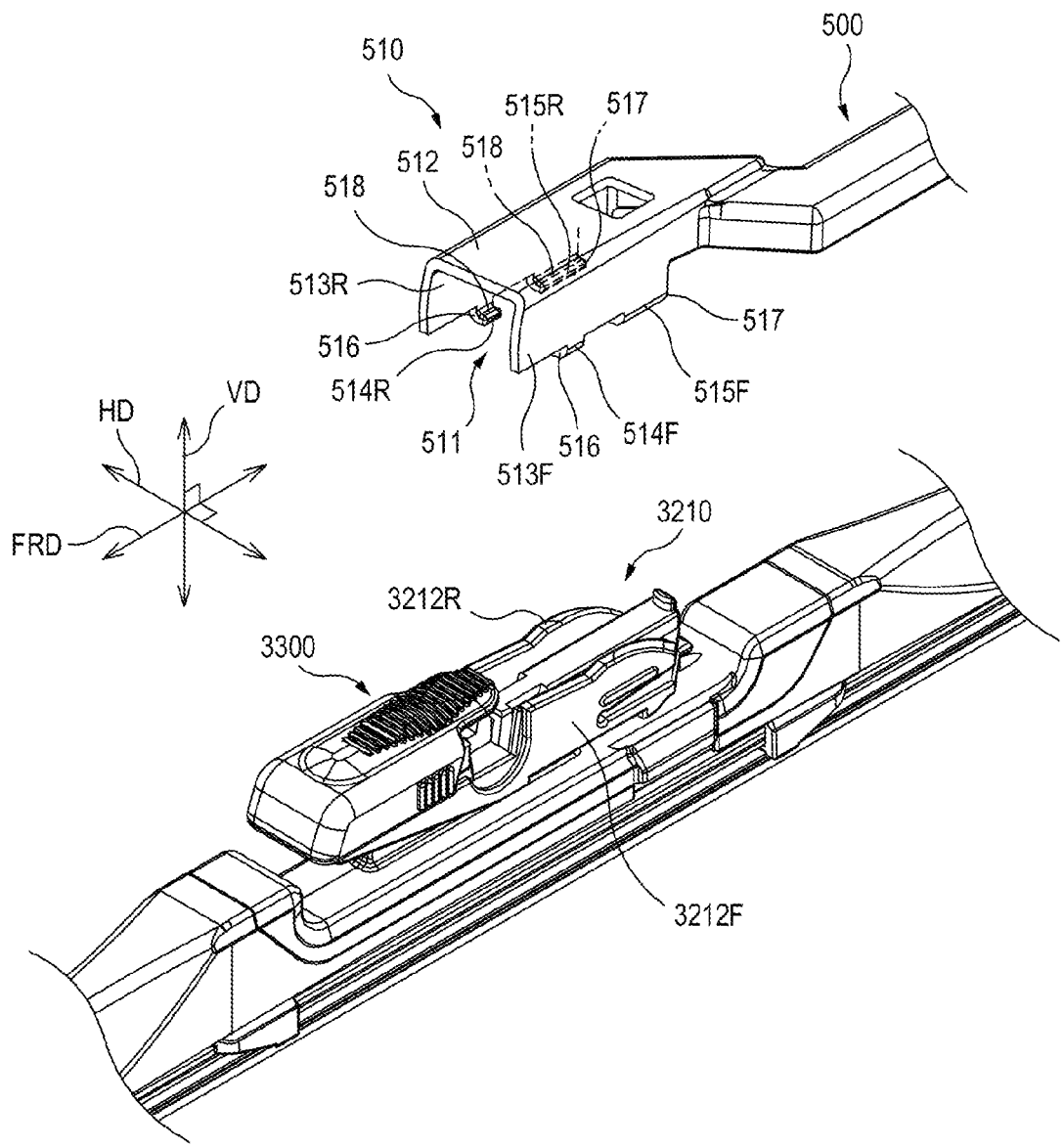
FIG. 55 is a perspective view showing the wiper blade according to an embodiment and a fourth wiper arm.

Referring to FIG. 55, the fourth wiper arm 500, to which the wiper blade 100 according to the embodiment is connected, includes the fourth coupling unit 510 at its distal end. The fourth coupling unit 510 includes a receiving portion 511 that receives a portion of the adaptor of the connector assembly 3000. The receiving portion 511 is defined by a top plate 512 and a pair of lateral plates 513F, 513R extending vertically from both lateral edges of the top plate 512. The receiving portion 511 of the fourth coupling unit 510, which is shown in FIG. 55, has a pair of front claws 514F, 514R and a pair of rear claws 515F, 515R, both of which protrude laterally inwardly from bottom edges of the lateral plates 513F, 513R. The fourth coupling unit 510 according to another example has a single, laterally inwardly protruding claw at the bottom edge of each lateral wall 513F, 513R and thus includes a pair of claws. The front and rear claws 514F, 514R, 515F, 515R of the fourth coupling unit 510 are formed with a front contact surface 516 and a rear contact surface 517, which are used for the fixation in the front and rear directions FRD, and a top contact surface 518 which is used for the fixation in the vertical direction VD. The front contact surface 516 comprises front surfaces of the front claws 514F, 514R and the rear contact surface 517 comprises rear surfaces of the rear claws 515F, 515R. The top contact surface 518 comprises top surfaces of the front claws 514F, 514R and top surfaces of the rear claws 515F, 515R.

Figure 58:
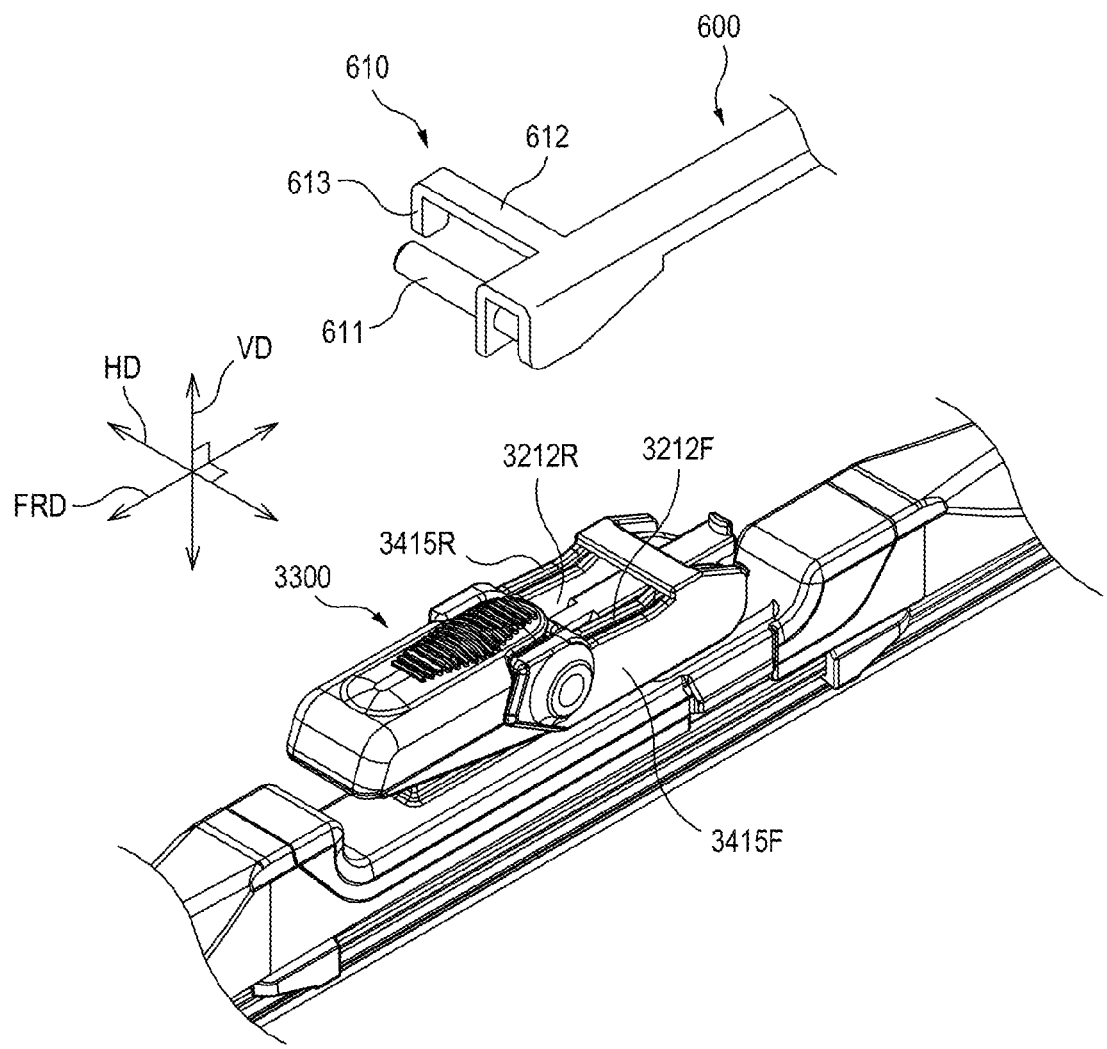
FIG. 58 is a perspective view showing the wiper blade according to an embodiment and a fifth wiper arm.
Figure 61:
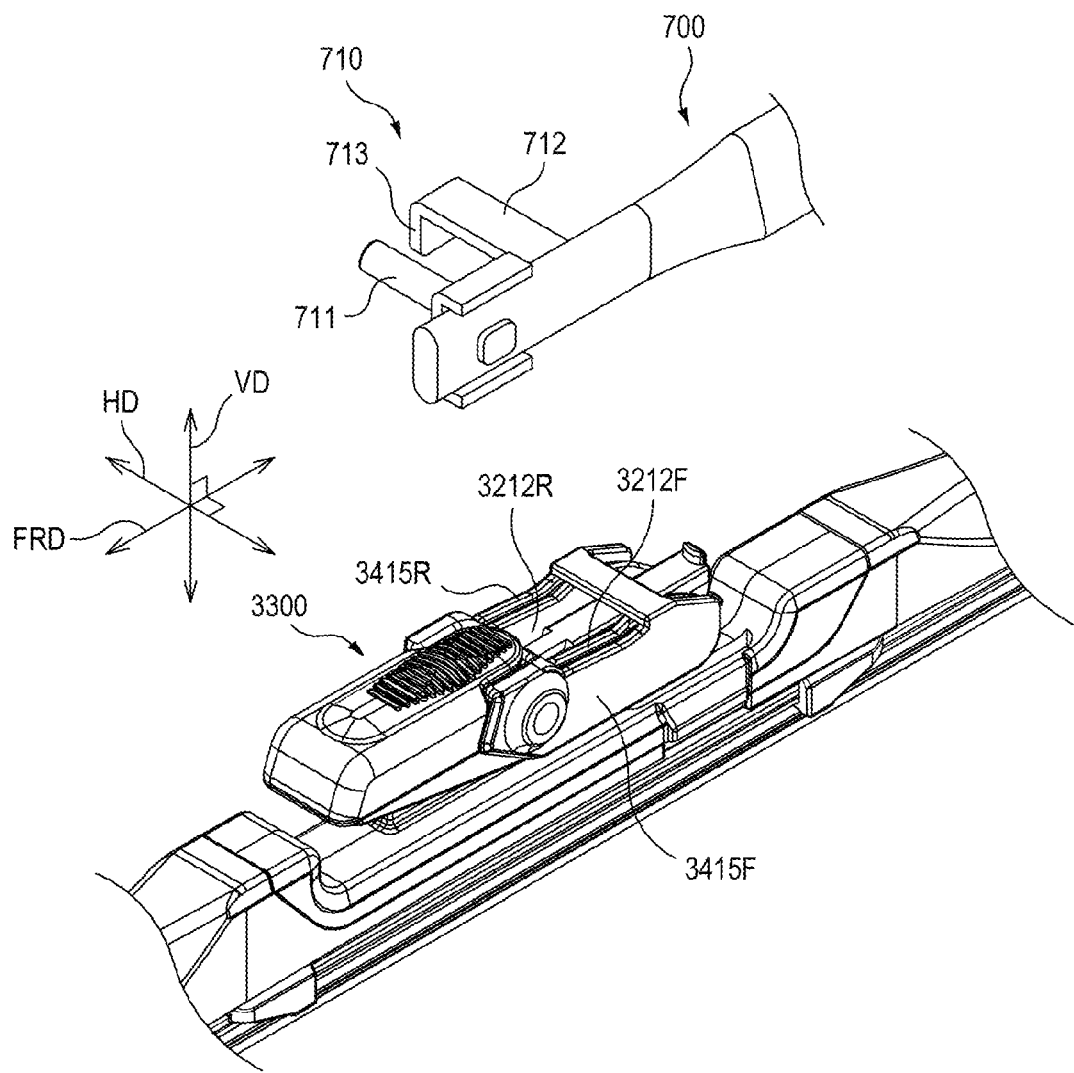
FIG. 61 is a perspective view showing the wiper blade according to an embodiment and a sixth wiper arm.

Referring to FIGS. 58 and 61, the fifth wiper arm 600, to which the wiper blade 100 according to the embodiment is connected, includes the fifth coupling unit 610 at its distal end. Further, the sixth wiper arm 700, to which the wiper blade 100 according to the embodiment is connected, includes the sixth coupling unit 710 at its distal end. The fifth coupling unit 610 includes a side pin 611, which extends in the horizontal direction HD orthogonal to the front and rear directions FRD of the fifth wiper arm 600, and a clipping latch 612, which extends parallel to the side pin 611 adjacent to the side pin 611. The clipping latch 612 has a clip 613, which is bent in an L shape, at its free end. The sixth coupling unit 710 includes a side pin 711, which extends in the horizontal direction HD orthogonal to the front and rear directions FRD of the sixth wiper arm 700, and a clipping latch 712, which extends parallel to the side pin 711 adjacent to the side pin 711. The clipping latch 712 has a clip 713, which is bent in an L shape, at its free end. The length of the clipping latch 712 of the sixth coupling unit 710 (the distance between the fixed end and the free end of the clipping latch 712) is shorter than the length of the clipping latch 612 of the fifth coupling unit 610.

Descriptions are made as to the connector assembly 3000 and the parts constituting the connector assembly with reference to FIGS. 1 to 5 and 21 to 42.

The connector assembly 3000 is configured to connect the lever assembly 2000, which holds the wiper rubber assembly 1000, to the above-described first to sixth coupling units 210, 310, 410, 510, 610, 710. In this embodiment, the connector assembly 3000 includes the following: a bracket 3100 detachably fixed to the connector seat 2500 which is provided in the first lever 2100 of the lever assembly 2000; an adaptor 3200 rotatably mounted to a shaft part provided in the bracket 3100; a slide cover 3300 slidably coupled to the adaptor 3200 in the longitudinal direction of the connector assembly 3000 or the lever assembly 2000; and a side lock cover 3400 detachably coupled to the adaptor 3200. The adaptor 3200 supports the first to sixth coupling units 210, 310, 410, 510, 610, 710. The slide cover 3300 is slidable with respect to the adaptor 3200 in the longitudinal direction of the lever assembly 2000. Specifically, the slide cover 3300 slides with respect to the adaptor 3200 such that the slide cover 3300 moves to the adaptor 3200 in a first movement direction MD1 to cover the top contact surfaces 216, 316, 412 of the first to third coupling units 210, 310, 410 and the slide cover 3300 retracts from the adaptor 3200 in a second movement direction MD2 not to cover the top contact surfaces 216, 316, 412 of the first to third coupling units 210, 310, 410. The first movement direction MD1 and the second movement direction MD2 are opposite to each other (i.e., forming 180° therebetween) and are parallel to the longitudinal direction of the lever assembly 2000. The adaptor 3200 is inserted to the receiving portion 511 of the fourth coupling unit 510 in the first movement direction MD1 and then the adaptor 3200 and the fourth coupling unit 510 are fixed to each other. The adaptor 3200 and the fifth and sixth coupling units 610, 710 are fixed to each other by coupling the side lock cover 3400 to the adaptor 3200 and coupling the side lock cover 3400 to the fifth and sixth coupling units 610, 710.

The bracket 3100 serves as a base of the connector assembly 3000 and supports the adaptor 3200 and the slide cover 3300. The bracket 3100 is coupled to the connector seat 2500 of the first lever 2100 in such a manner that a longitudinal end of the bracket 3100 is inserted to the longitudinal end of the connector seat 2500, and then the bracket is rotated about its longitudinal end and thereafter a longitudinal opposite end of the bracket or a portion of the bracket adjacent to the longitudinal opposite end of the bracket snap-engages the longitudinal opposite end of the connector seat 2500 or a portion of the connector seat adjacent to the longitudinal opposite end of the connector seat.

The bracket 3100 includes a base plate 3110 that is seated on the seat surface 2510 of the connector seat 2500. The base plate 3110 has a flat portion 3111, which extends longitudinally, and a first inclined portion 3112 and a second inclined portion 3113, which are inclined at respective longitudinal outer ends of the flat portion 3111 with respect to the flat portion 3111. Further, the base plate 3110 has a first bent portion 3114, which extends from the longitudinal end of the flat portion 3111 in an L shape, and a second bent portion 3115, which extends in an L shape from the longitudinal opposite end of the flat portion 3111 located opposite the longitudinal end. Thus, when viewing the bracket 3100 from the front, the base plate 3110 has a shape of an elongated U. Since the flat portion 3111 is located lower than the first and second bent portions 3114, 3115, the adaptor 3200 and the slide cover 3300 can be located at a low height. The top surface of the first bent portion 3114 is higher than the top surface of the second bent portion 3115 relative to the flat portion 3111.

The bracket 3100 includes a contact surface 3121, 3122, 3123, which is formed complementarily to the seat surface 2510 of the connector seat 2500 and contacts the seat surface 2510. In this embodiment, said contact surface comprises a flat surface 3121, which forms the under surface of the flat portion 3111 of the base plate 3110, and inclined surfaces 3122, 3123, which forms the outer surfaces of the first and second inclined portions 3112, 3113. The flat surface 3121 of said contact surface directly contacts the flat surface 2511 of the seat surface 2510 of the connector seat 2500 and the inclined surfaces 3122, 3123 of said contact surface can contact the first and second inclined surfaces 2512, 2513 of the seat surface 2510 respectively. Further, the bracket 3100 includes a flange 3130, which is formed complementarily to the stepped surface 2520 of the connector seat and is formed along a periphery of the contact surface 3121, 3122, 3123. When the bracket 3100 is coupled to the connector seat 2500, the flange 3130 fits on the stepped surface 2520 or contacts a portion or the entirety of the stepped surface 2520. In this embodiment, the flange 3130 has the following: a lateral flange 3131 fitting on the lateral stepped surface 2521 of the stepped surface; a first top flange 3132 fitting on the first top stepped surface 2522 of the stepped surface; and a second top flange 3133 fitting on the second top stepped surface 2523 of the stepped surface. The lateral flange 3131 is formed along both lateral edges of the flat surface 3121 and both lateral edges of the inclined surfaces 3122, 3123 and protrudes to the extent of the protrusion height of the lateral stepped surface 2521. The first top flange 3132 is formed along the longitudinal outer end of the first bent portion 3114 and the second top flange 3133 is formed along the longitudinal outer end of the second bent portion 3115. The first and second top flanges 3132, 3133 protrude to the extent of the protruding distance of the first and second top stepped surfaces 2522, 2523.

The bracket 3100 is coupled to the connector seat 2500 of the lever assembly 2000 through insertion and then rotation. The bracket 3100 includes insertion protrusions 3141, which are inserted to the insertion slots 2531 of the connector seat 2500, and snap slots 3142 which the snap protrusions 2532 of the connector seat 2500 snap-engage. Further, the bracket 3100 includes positioning slots 3143 for positioning relative to the connector seat 2500.

The base plate 3110 has a first insertion portion 3144, which is inserted to the first recess 2514 of the connector seat, and a second insertion portion 3145, which is inserted to the second recess 2515 of the connector seat. The first insertion portion 3144 is formed in a shape of a pair of fins, which protrude from the first bent portion 3114 beyond the first inclined portion 3112. The insertion protrusions 3141 are formed at tip ends of the first insertion portion 3144 and have a semi-circular shape when viewing the bracket 3100 from the front. An insertion slot 3146, to which the insertion protrusion 2534 of the connector seat are inserted, is formed between said fins constituting the first insertion portion 3144. The second insertion portion 3145 is formed in a shape of a pair of fins, which protrude from the second bent portion 3115 beyond the second inclined portion 3113.

The snap slots 3142 are formed on the surface of the lateral flange 3131 below the flat surface 3121 of the contact surface of the base plate 3110. The length of each snap slot 3142 is longer than the distance between the snap protrusions 2532 located in a lateral edge of the connector seat 2500. Portions of the lateral flange 3131 below each snap slot 3142 (a portion of an edge of the lateral flange 3131 located opposite the snap slot 3142) protrude outwardly and thereby the flange 3130 includes a pair of ear portions 3134. The ear portions 3134 of the flange are formed in the position corresponding to the auxiliary stepped surfaces 2524 of the stepped surface 2520 of the connector seat. Accordingly, if the bracket 3100 is rotated to the connector seat 2500, the snap protrusions 2532 pass the ear portion 3134 and then snap-engage the snap slots 3142. The positioning slots 3143 are perforated in the flat portion 3111 of the base plate 3110. If the bracket 3100 is rotated to the connector seat 2500, the positioning ridges 2533 of the connector seat are inserted or fitted to the positioning slots 3143 of the bracket 3100.

Figure 26:
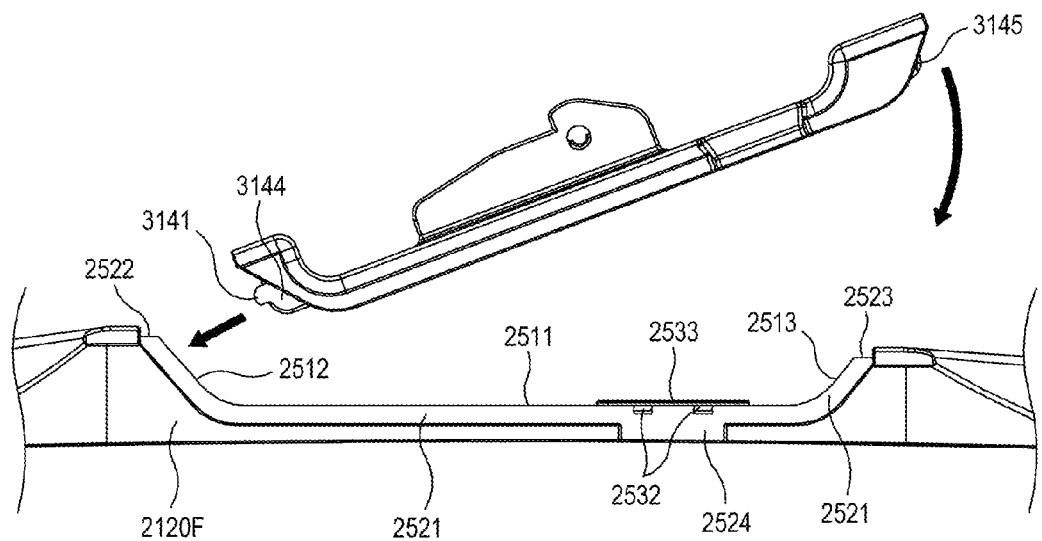
FIG. 26 shows an assembly example between a connector seat of the lever assembly and the bracket of the connector assembly.
Figure 27:
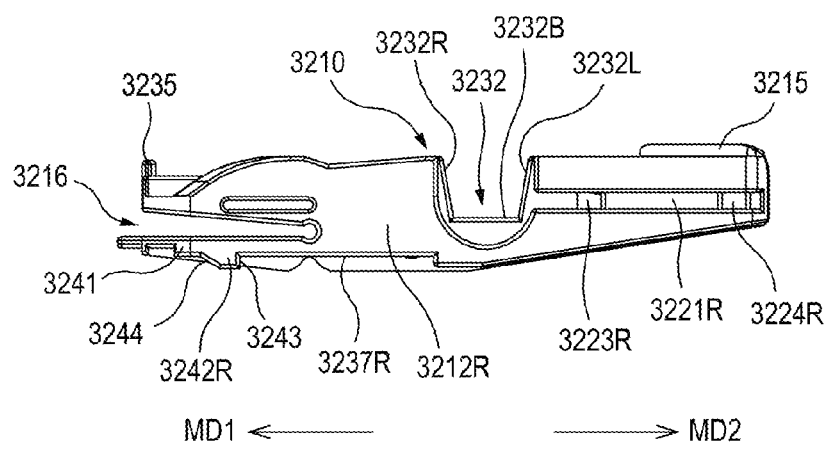
FIG. 27 is a rear view of an adaptor of the connector assembly shown in FIG. 21.
Figure 28:
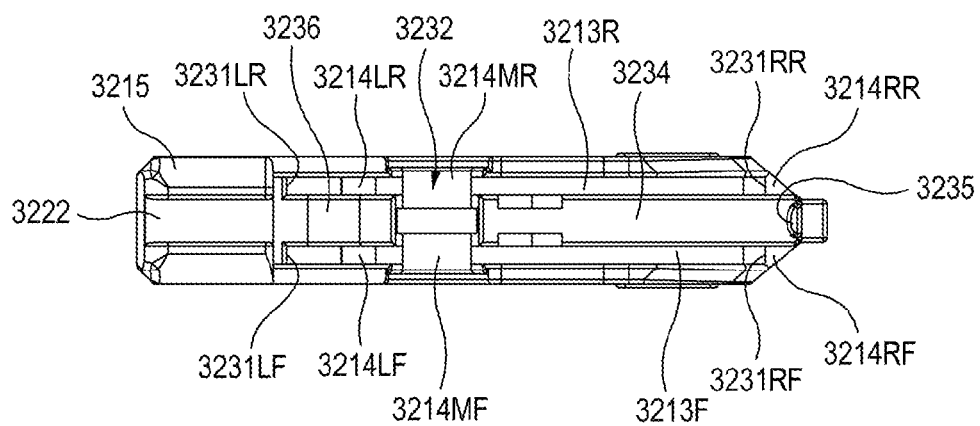
FIG. 28 is a top view of the adaptor of the connector assembly shown in FIG. 21.
Figure 29:
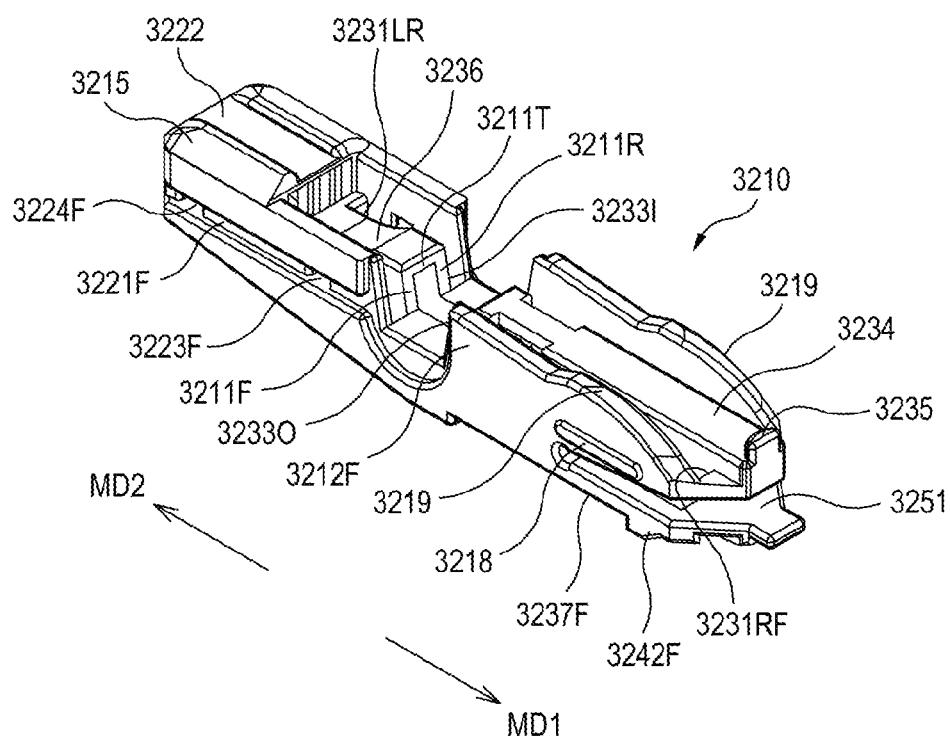
FIG. 29 is a perspective view of an adaptor of the connector assembly shown in FIG. 21.
Figure 30:
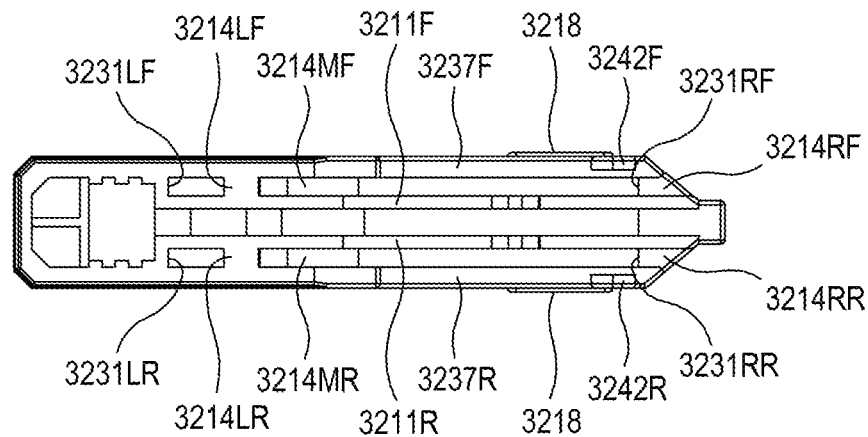
FIG. 30 is a bottom view of the adaptor of the connector assembly shown in FIG. 21.
Figure 31:
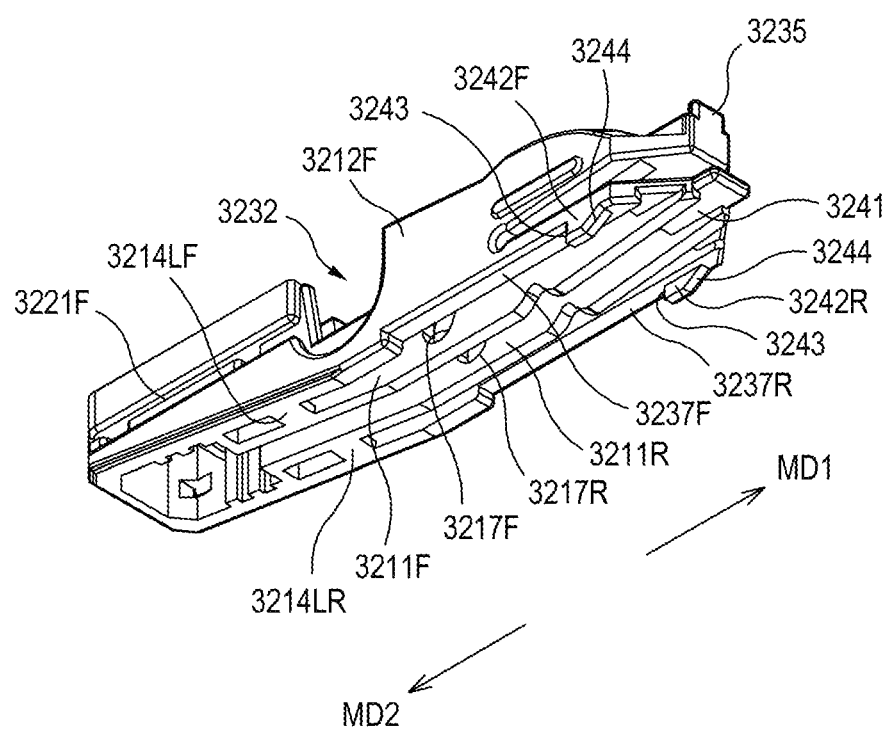
FIG. 31 is a lower perspective view of the adaptor of the connector assembly shown in FIG. 21.
Figure 32:
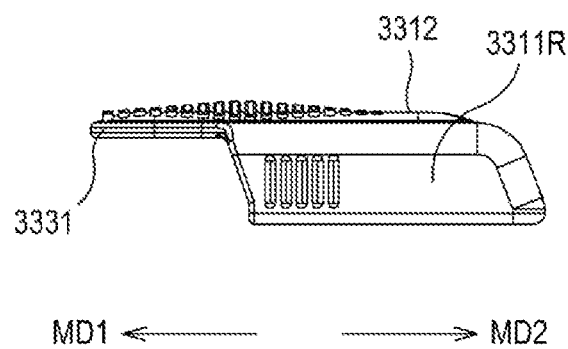
FIG. 32 is a rear view of a slide cover of the connector assembly shown in FIG. 21.
Figure 33:
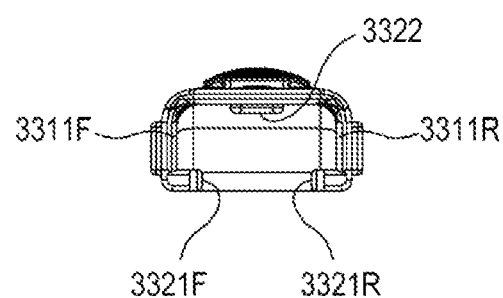
FIG. 33 is a right side view of the slide cover of the connector assembly shown in FIG. 21.
Figure 34:
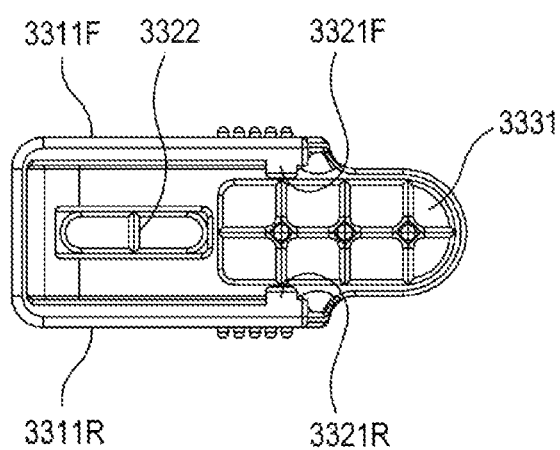
FIG. 34 is a bottom view of the slide cover of the connector assembly shown in FIG. 21.
Figure 35:
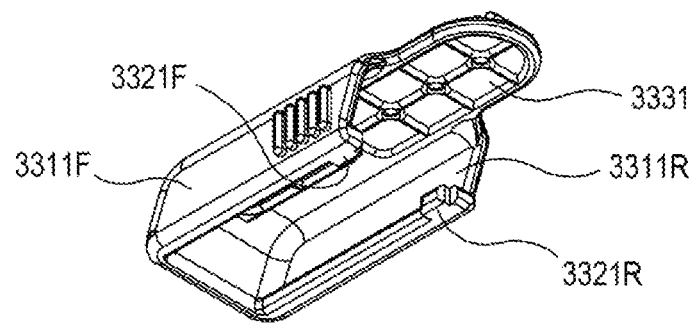
FIG. 35 is a lower perspective view of the slide cover of the connector assembly shown in FIG. 21.
Figure 36:
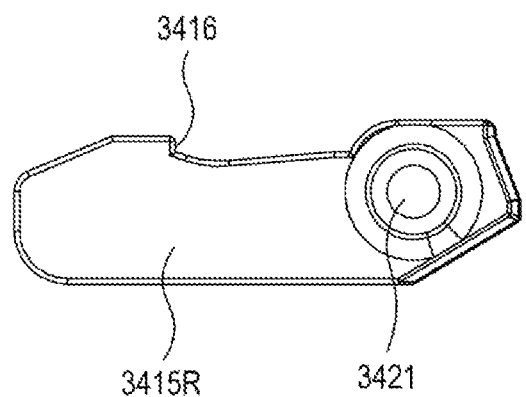
FIG. 36 is a rear view of a side lock cover of the connector assembly shown in FIG. 21.
Figure 37:
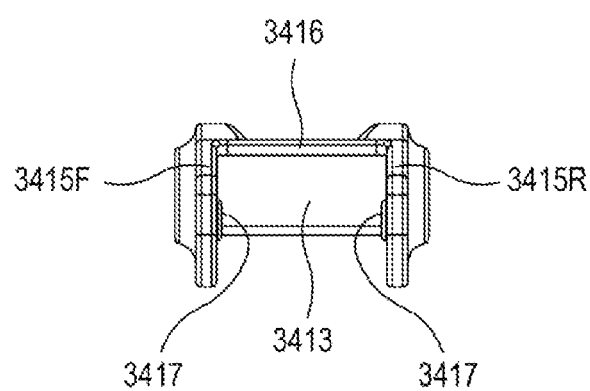
FIG. 37 is a right side view of the side lock cover of the connector assembly shown in FIG. 21.
Figure 38:
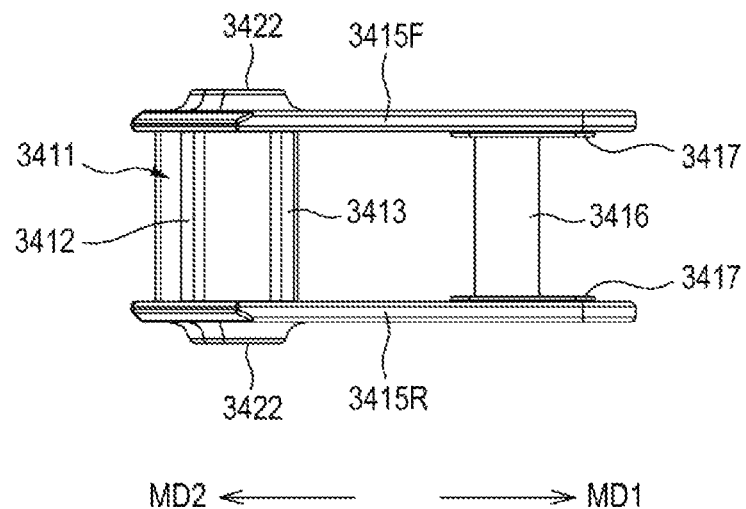
FIG. 38 is a bottom view of the side lock cover of the connector assembly shown in FIG. 21.
Figure 39:
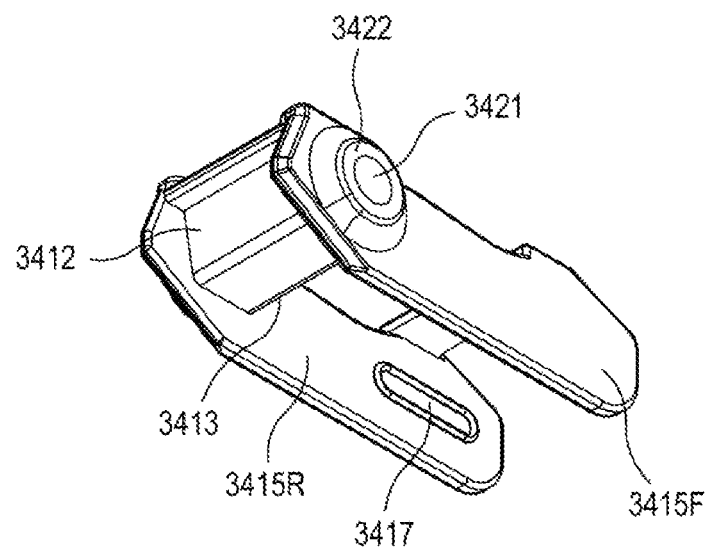
FIG. 39 is a lower perspective view of the side lock cover of the connector assembly shown in FIG. 21.

As shown in FIG. 26, when the bracket 3100 is coupled to the connector seat 2500, first, the one end of the bracket 3100, at which the insertion protrusions 3141 are located, is tilted lower than the opposite end of the bracket and then the insertion protrusions 3141 of the bracket are inserted to the insertion slots 2531 of the connector seat. When the first insertion portion 3144 located at the first bent portion 3114 contacts the wall surface of the first recess 2514 of the connector seat, the insertion is completed. If the insertion is completed, the insertion protrusions 3141 of the bracket are inserted in the insertion slots 2531 of the connector seat and the insertion protrusion 2534 of the connector seat is inserted to the insertion slot 3146 of the bracket. Thereafter, the bracket 3100 is rotated towards the connector seat 2500 about the insertion protrusions 3141. As the bracket 3100 is rotated, the snap protrusions 2532 snap-engage the snap slots 3142, the positioning ridges 2533 are inserted to the positioning slots 3143 and the second insertion portion 3145 is fitted to the second recess 2515. If the bracket 3100 is coupled to the connector seat 2500, the flange 3130 of the bracket 3100 fits on the stepped surface 2520 of the connector seat and the ear portions 3134 of the flange 3130 are positioned immediately above the auxiliary stepped surfaces 2524. The user can identify the coupling position of the bracket 3100 relative to the connector seat 2500 by matching the ear portion 3134 of the flange 3130 with the auxiliary stepped surface 2524 of the connector seat 2500. Further, if the bracket 3100 is coupled to the connector seat 2500, the ear portions 3134 protrude outwardly of the bracket 3100 above the auxiliary stepped surfaces 2524. Accordingly, when separating the bracket 3100 from the connector seat 2500, the ear portion 3134 can serve as a part that the user can push with his finger, or any tool can be inserted between the ear portion 3134 and the auxiliary stepped surface 2524. Further, in the connector seat 2500 and the connector assembly 3000, the distance between the longitudinal inner end of the first top stepped surface 2522 and the longitudinal inner end of the second top stepped surface 2523 is shorter than the distance between the tip end of the insertion protrusion 3141 and the longitudinal outer end of the second top flange 3133, which is located opposite the insertion protrusion 3141. Furthermore, the longitudinal inner end of the first top stepped surface 2522 of the stepped surface 2520 is higher than the longitudinal inner end of the second top stepped surface 2523 relative to the bottom edge of the first lever 2100. Thus, if the second insertion portion 3145 of the bracket 3100 is inserted to the second recess 2515 and the second top flange 3133 is brought into contact with the second top stepped surface 2523, then the bracket 3100 is not coupled to the connector seat 2500. Accordingly, the user or worker can readily identify the accurate coupling position of the bracket 3100 relative to the connector seat 2500.

The bracket 3100 includes a shaft part to which the adaptor 3200 is rotatably coupled. Said shaft part is provided in a support wall 3152, which extends vertically from the flat portion 3111 of the base plate. In this embodiment, the shaft part comprises shaft protrusions 3151F, 3151R. The shaft protrusions 3151F, 3151R are formed along a lower periphery of a through hole 3153 that passes through the support wall 3152. The shaft protrusions 3151F, 3151R protrude in a direction orthogonal to the first and second movement directions MD1, MD2 and have a semi-circular shape when the bracket 3100 is viewed from the front.

The adaptor 3200 includes an insertion portion 3210. The insertion portion 3210 is configured to be rotatably mounted to the bracket 3100 and to be inserted to the receiving portion 211, 311, 511 of the first, second and fourth coupling units. The insertion portion 3210 includes a pair of inner lateral walls 3211F, 3211R and a top wall 3211T therein. The inner lateral walls 3211F, 3211R extend in the first and second movement directions MD1, MD2. The top wall 3211T extends between top edges of the inner lateral walls 3211F, 3211R. Further, the insertion portion 3210 includes a pair of outer lateral walls 3212F, 3212R that are spaced apart from the inner lateral walls 3211F, 3211R respectively in the direction orthogonal to the first and second movement directions MD1, MD2. Thus, a pair of insertion slots 3213F, 3213R are defined between the inner lateral walls 3211F, 3211R and the outer lateral walls 3212F, 3212R. First spacers 3214LF, 3214LR, which interconnect the inner lateral walls 3211F, 3211R and the outer lateral walls 3212F, 3212R, are formed in the vicinity of ends of the insertion slots 3213F, 3213R in the second movement direction MD2. Second spacers 3214RF, 3214RR, which interconnect the inner lateral walls 3211F, 3211R and the outer lateral walls 3212F, 3212R, are formed at ends of the insertion slots 3213F, 3213R in the first movement direction MD1. Third spacers 3214MF, 3214MR are formed in the middle of the insertion slots 3213F, 3213R. The first spacers 3214LF, 3214LR are located at bottom edges of the outer lateral walls 3212F, 3212R. The second spacers 3214RF, 3214RR form an end of the insertion portion 3210 in the first movement direction MD1. The third spacers 3214MF, 3214MR form a bottom of a rotator seat, which will be described below. The top wall 3211T is formed lower than top edges of the outer lateral walls 3212F, 3212R. Each of the outer lateral walls 3212F, 3212R has a curved portion 3219, which is upwardly convex in the shape of a circular arc, at the top edge of the end in the first movement direction MD1. A snap ridge 3218 protrudes on either outer surface of the outer lateral walls 3212F, 3212R in the vicinity of the end in the first movement direction MD1. The snap ridge 3218 is located below the curved portion 3219 and snap-engages a snap ridge which is provided in a lateral wall of the side lock cover 3400. The insertion portion 3210 is inserted to the receiving portion 211 of the first coupling unit at its inner lateral walls 3211F, 3211R. Further, the insertion portion 3210 is inserted to the receiving portion 311 of the second coupling unit and the receiving portion 511 of the fourth coupling unit at its outer lateral walls 3212F, 3212R.

The shaft protrusions 3151F, 3151F of the bracket and a portion of the support wall 3152 of the bracket are inserted into between the inner lateral walls 3211F, 3211R. A bearing hole 3217F, 3217R, to which each shaft protrusion 3151F, 3151R of the bracket is fitted, is perforated in each of the inner lateral walls 3211F, 3211R. The bearing hole 3217F, 3217R is located apart from the rotator seat in the first movement direction MD1. Thus, the adaptor 3200 is rotatably joined to the bracket 3100 by the inner lateral walls 3211F, 3211R coupled to the shaft protrusions 3151F, 3151R. The length of the inner lateral wall 3211F, 3211R is shorter than that of the outer lateral wall 3212F, 3212R. The inner lateral wall 3211F, 3211R extends in the second movement direction MD2 from the end of the outer lateral wall 3212F, 3212R in the first movement direction MD1. Both the ends of the inner lateral walls 3211F, 3211R in the first movement direction MD1 and the ends of the outer lateral walls 3212F, 3212R in the first movement direction MD1 form the end of the adaptor 3200 or the insertion portion 3210 in the first movement direction MD1, while the ends of the outer lateral walls 3212F, 3212R in the second movement direction MD2 form the end of the adaptor 3200 in the second movement direction MD2. The adaptor 3200 has a bridge portion 3215, which interconnects the top edges of the outer lateral walls 3212F, 3212R, between the ends of the outer lateral walls 3212F, 3212R in the second movement direction MD2 and the ends of the inner lateral walls 3211F, 3211R in the second movement direction MD2. The slide cover 3300 is slidable in the first movement direction MD1 from the end of the adaptor 3200 in the second movement direction MD2.

The adaptor 3200 is configured to allow the slide movement of the slide cover 3300 and to limit the slide movement of the slide cover 3300. In this embodiment, the slide cover 3300 is shaped so as to cover the outer lateral walls 3212F, 3212R of the adaptor 3200. The slide cover 3300 is slidably movable to the adaptor 3200 in the first movement direction MD1 parallel to the longitudinal direction of the lever assembly 2000 or the connector assembly 3000. Further, the slide cover 3300 is slidably movable from the adaptor 3200 in the second movement direction MD2 opposite to the first movement direction MD1 by 180°.

To guide the slide movement of the slide cover 3300, the adaptor 3200 includes a pair of guide grooves 3221F, 3221R. The guide groove 3221F, 3221R is inwardly concave from the outer surface of each outer lateral wall 3212F, 3212R and extends in the longitudinal direction of the adaptor 3200 (in the first movement direction MD1) from the end of the outer lateral wall 3212F, 3212R in the second movement direction MD2. A slide claw of the slide cover 3300 is inserted to the guide groove 3221F, 3221R. Further, the adaptor 3200 has a ridge groove 3222, which extends from an end of the bridge portion 3215 in the second movement direction MD2 to an end of the bridge portion in the first movement direction MD1, in the middle of the bridge portion 3215. A ridge of the slide cover 3300 is positioned in the ridge groove 3222.

To limit the slide movement of the slide cover 3300, the adaptor 3200 includes a pair of first snap holes 3223F, 3223R and a pair of second snap holes 3224F, 3224R. The first snap holes 3223F, 3223R and the second snap holes 3224F, 3224R are located in the guide grooves 3221F, 3221R and are spaced apart in the first and second movement directions MD1, MD2. That is, the first snap hole 3223F and the second snap hole 3224F are disposed in the guide groove 3221F, and the first snap hole 3223R and the second snap hole 3224R are disposed in the guide groove 3221R. The snap claws of the slide cover 3300 snap-engage the first snap holes 3223F, 3223R and the second snap holes 3224F, 3224R. The first snap holes 3223F, 3223R are located in the vicinity of ends of the guide grooves 3221F, 3221R in the first movement direction MD1. If the slide claws snap-engage the first snap holes 3223F, 3223R, then the slide cover 3300 is locked to the slide cover 3300 while being positioned to cover portions of the top contact surfaces 216, 316, 412 of the first to third coupling units. In this embodiment, the position where the slide cover 3300 is locked to the adaptor 3200 through snap-engagement between its slide claws and the first snap holes 3223F, 3223R is referred to as a fixation position of the slide cover 3300. As the slide cover 3300 is retracted from the fixation position in the adaptor 3200 in the second movement direction MD2, the slide cover 3300 does not cover the top contact surfaces 216, 316, 412 of the first to third coupling units. In this embodiment, the position where the slide cover 3300 is moved towards the second movement direction MD2 and thus does not cover the top contact surfaces 216, 316, 412 of the first to third coupling units is referred to as a release position of the slide cover 3300. The release position is any position between a maximum movement position of the slide cover 3300 in the second movement direction MD2 and a position where an end of the slide cover 3300 in the first movement direction MD1 is apart from the top contact surfaces 216, 316, 412 of the first to third coupling units.

For the fixation of the first coupling unit 210 in the front and rear directions FRD, the adaptor 3200 includes a first support surface 3231LF, 3231LR, 3231RF, 3231RR that supports the front contact surface 214 or the rear contact surface 215 of the first coupling unit. The first support surface 3231LF, 3231LR, 3231RF, 3231RR comprises first front support surfaces 3231LF, 3231LR, which are located in the second movement direction MD2, and first rear support surfaces 3231RF, 3231RR, which are located in the first movement direction MD1. When the adaptor 3200 is connected to the first coupling unit 210, the first front support surfaces 3231LF, 3231LR located in the second movement direction MD2 come into contact with the front contact surface 214 of the receiving portion 211 of the first coupling unit, while the first rear contact surfaces 3231RF, 3231RR located in the first movement direction MD1 come into contact with the rear contact surface 215. The first front support surfaces 3231LF, 3231LR comprise the end surfaces of the insertion slots 3213F, 3213R in the second movement direction MD2. The first rear support surfaces 3231RF, 3231RR comprise the end surfaces of the insertion slots 3213F, 3213R in the first movement direction MD1. That is, the first rear support surfaces 3231RF, 3231RR are formed in the surfaces of the second spacers 3214RF, 3214RR which are directed towards the second movement direction MD2.

For the fixation of the second coupling unit 310 in the front and rear directions FRD, the adaptor 3200 includes a rotator seat 3232 to which the rotator 313 of the second coupling unit is fitted by surface-to-surface contact. When viewing the adaptor 3200 from the front, the rotator seat 3232 is shaped (i.e., the shape of an isosceles trapezoid) such that the rotator 313 of the second coupling unit is seated on and fitted to the rotator seat. The rotator seat 3232 is located in the vicinity of the ends of the inner lateral walls 3211F, 3211R in the second movement direction MD2. Recesses 3233O, which are provided in the outer lateral walls 3212F, 3212R and have the shape of an isosceles trapezoid, and recesses 3233I, which are provided in the inner lateral walls 3211F, 3211R and have the shape of an isosceles trapezoid, form the rotator seat 3232. The rotator seat 3232 extends across the inner lateral walls 3211F, 3211R, the top wall 3211T and the outer lateral walls 3212F, 3212R. That is, the rotator seat 3232 is oriented in the direction orthogonal to the first and second movement directions MD1, MD2. A front surface 3232L of the rotator seat 3232 located in the second movement direction MD2 directly contacts the front contact surface 314 formed in the rotator 313, and a rear surface 3232R located in the first movement direction MD1 directly contacts the rear contact surface 315 formed in the rotator 313. A bottom surface 3232B of the rotator seat 3232 may or may not directly contact the bottom surface of the rotator 313. The bottom surface 3232B of the rotator seat 3232 is top surfaces of the third spacers 3214MF, 3214MR. The front surface 3232L and the rear surface 3232R of the rotator seat comprises a pair of surfaces, which are provided in the recess 3233O of the outer lateral wall and are opposite to each other in the first and second movement directions MD1, MD2, or a pair of surfaces, which are provided in the recess 3233I of the inner lateral wall and are opposite to each other in the first and second movement directions MD1, MD2.

For the fixation of the third coupling unit 410 in the vertical direction VD, the adaptor 3200 includes a second support surface 3234 that supports the bottom contact surface 413 of the bar 411 of the third coupling unit. The second support surface 3234 comprises the top surface of the top wall 3211T. For the fixation of the third coupling unit in the front and rear directions FRD, the adaptor 3200 includes an insertion protrusion 3235 that is inserted to the opening 415 of the third coupling unit. The insertion protrusion 3235 protrudes upwardly on an end of the top wall 3211T in the first movement direction MD1. If the insertion protrusion 3235 is inserted to the opening 415 of the third coupling unit 410, surfaces of the insertion protrusion 3235 in the first and second movement directions MD1, MD2 can contact the front and rear surfaces of the opening 415. Thus, the adaptor 3200 and the third coupling unit 410 can be fixed in the front and rear directions FRD. The second support surface 3234 of the adaptor 3200 has a curved surface 3236, on which the tongue 414 extending from the bar 411 of the third coupling unit is seated, at its end in the second movement direction MD2.

For the fixation of the fourth coupling unit 510 in the front and rear directions FRD and the vertical direction VD, the adaptor 3200 includes claw grooves 3237F, 3237R, which the front and rear claws 514F, 514R, 515F, 515R of the fourth coupling unit snap-engage. The claw grooves 3237F, 3237R are spaced apart from the rotator seat 3232 in the first movement direction MD1 and are formed at the bottom edges of the outer lateral walls 3212F, 3212R of the insertion portion. The length of the claw groove 3237F, 3237R is equal to or slightly longer than the distance between the front contact surface 516 and the rear contact surface 517 of the fourth coupling unit. When the adaptor 3200 and the fourth coupling unit 510 are connected, surfaces of the claw grooves 3237F, 3237R in the second movement direction MD2 can contact the front contact surface 516 of the fourth coupling unit and surfaces of the claw grooves in the first movement direction MD1 can contact the rear contact surface 517 of the fourth coupling unit. Further, top surfaces of the claw grooves 3237F, 3237R contact the top contact surface 518 of the fourth coupling unit.

Since the claw grooves 3237F, 3237R are located apart from the center of the adaptor 3200 in the first movement direction MD1, the adaptor 3200 is connected to the fourth coupling unit 510 in such a way that the adaptor is inserted to the receiving portion 511 of the fourth coupling unit in the first movement direction MD1. Further, if the adaptor 3200 is inserted to the receiving portion 511 of the fourth coupling unit, the front and rear claws 514F, 514R, 515F, 515R of the fourth coupling unit are fitted to the claw grooves 3237F, 3237R and the end portion of the adaptor 3200 in the first movement direction MD1 elastically locks rear end surfaces of the rear claws 515F, 515R of the fourth coupling unit 510 (i.e., the rear contact surface 517 of the fourth coupling unit). The insertion portion 3210 of the adaptor 3200 includes a slit 3216 that is formed from the end in the first movement direction MD1 towards the second movement direction MD2. The slit 3216 is pierced in the insertion portion 3210 in a width direction. The slit 3216 extends from the end of the insertion portion 3210 in the first movement direction MD1 to the approximate middle of the claw groove 3237F, 3237R. A portion of the insertion portion 3210, which is located under the slit 3216, is capable of curving upwardly and downwardly due to the slit 3216, thus forming a latch 3241 for locking the rear contact surface 517 of the fourth coupling unit.

The latch 3241 is capable of curving upwardly due to the slit 3216. The latch 3241 extends from an end of the slit 3216 in the second movement direction MD2 towards the first movement direction MD1. The latch 3241 includes a pair of wedge protrusions 3242F, 3242R, which protrude downwardly, at its bottom surface. The wedge protrusions 3242F, 3242R adjoin ends of the claw grooves 3237F, 3237R in the first movement direction MD1. That is, surfaces 3243 of the wedge protrusions 3242F, 3242R in the second movement direction MD2 form surfaces of the claw grooves 3237F, 3237R in the first movement direction MD1. Further, the claw grooves 3237F, 3237R extend from the surfaces 3243 of the wedge protrusions 3242F, 3242R in the second movement direction MD2 towards the second movement direction MD2. Surfaces 3244 of the wedge protrusions 3242F, 3242R in the first movement direction MD1 are inclined upwardly. The wedge protrusions 3242F, 3242R contact corners of the front claws 514F, 514R, which are located between the front contact surface 516 and the top contact surface 518 of the fourth coupling unit, at the surfaces 3244 in the first movement direction MD1. When the insertion portion 3210 of the adaptor is inserted to the receiving portion 511 of the fourth coupling unit, the front claws 514F, 514R apply an upward force to the wedge protrusions 3242F, 3242R due to the inclination of the surfaces 3244 of the wedge protrusions, thereby curving the latch 321 upwardly. As the insertion portion 3210 of the adaptor is inserted to the receiving portion 511 of the fourth coupling unit, the front claws 514F, 514R pass the wedge protrusions 3242F, 3242R and the rear claws 515F, 515R pass the wedge protrusions 3242F, 3242R. Then, the latch 3214 reverts downwardly and the surfaces 3243 of the wedge protrusions 3242F, 3242R in the second movement direction MD2 come into contact with the rear contact surface 517 of the fourth coupling unit. Thus, the latch 3241 locks the rear contact surface 517 of the fourth coupling unit.

The slide cover 3300 is joined to the adaptor 3200 so as to be slidable in the first movement direction MD1 and the second movement direction MD2. In this embodiment, the slide cover 3300 is shaped so as to cover the bridge portion 3215 of the adaptor 3200 and portions of the outer lateral walls 3212F, 3212R of the adaptor located in the second movement direction MD2. The slide cover 3300 is located outside the bridge portion 3215 and the outer lateral walls 3212F, 3212R of the adaptor. The slide cover 3300 is slidable between the fixation position where the slide cover 3300 is moved to the adaptor 3200 in the first movement direction MD1 to cover at least portions of the top contact surfaces 216, 316, 412 of the first to third coupling units 210, 310, 410 and the release position where the slide cover 3300 is moved from the adaptor 3200 in the second movement direction MD2 not to cover the top contact surfaces 216, 316, 412 of the first to third coupling units 210, 310, 410.

The slide cover 3300 has a pair of lateral walls 3311F, 3311R, which face toward the outer lateral walls 3212F, 3212R of the adaptor respectively, and a top wall 3312, which extends between top edges of the lateral walls 3311F, 3311R. Therefore, the slide cover 3300 has the shape of an inverted U shape when viewing the slide cover 3300 from the side. The slide cover 3300 includes a pair of, laterally inwardly protruding slide claws 3321F, 3321R at ends of the lateral walls 3311F, 3311R in the first movement direction MD1. The slide claws 3321F, 3321R are inserted to the guide grooves 3221F, 3221R of the adaptor respectively and are slidable therein. Further, the slide cover 3300 has a guide ridge 3322, which extends in the first and second movement directions MD1, MD2, on an under surface of the top wall 3312. The guide ridge 3322 is positioned in the ridge groove 3222 formed in the bridge portion 3215. The slide cover 3300 is slidable with respect to the adaptor 3200 in the first and second movement directions MD1, MD2 in the state where the slide claws 3321F, 3321R are inserted to the guide grooves 3221F, 3221R of the adaptor and the guide ridge 3322 is received in the ridge groove 3222 of the adaptor. In the slide movement of the slide cover 3300, if the slide claws 3321F, 3321R snap-engage the first snap holes 3223F, 3223R of the guide grooves 3221F, 3221R, then the slide cover 3300 is locked to the adaptor 3200 in the fixation position. Further, if the slide claws 3321F, 3321R snap-engage the second snap holes 3224F, 3224R of the guide grooves 3221F, 3221R, then the slide cover 3300 is maintained to the adaptor 3200 in the release position.

The slide cover 3300 includes a hood 3331 that extends in the first movement direction MD1 from an edge of the top wall 3312 in the first movement direction MD1. When the slide cover 3300 is locked in the fixation position, the hood 3331 is positioned above the top contact surfaces 216, 316, 412 of the first to third coupling units 210, 310, 410. The top contact surfaces 216, 316, 412 of the first to third coupling units 210, 310, 410 are caught by the hood 3331 in the fixation position of the slide cover 3300, achieving the fixation in the vertical direction VD between the connector assembly 3000 and the first to third coupling units 210, 310, 410.

The connector assembly 3000 includes the side lock cover 3400 for connection to the fifth coupling unit 610 and the sixth coupling unit 710. The side lock cover 3400 is detachably joined to the insertion portion 3210 of the adaptor 3200. The side lock cover 3400 and the adaptor 3200 are fixed through fixation in the front and rear directions FRD, fixation in the vertical direction VD and fixation in the horizontal direction HD.

The side lock cover 3400 includes a fitting portion 3411 that is fitted to the rotator seat 3232 provided in the insertion portion 3210 of the adaptor by surface-to-surface contact. The fitting portion 3411 is so shaped as to be complementary to the shape of the rotator seat 3232. That is, the longitudinal sectional shape of the fitting portion 3411 is an isosceles trapezoid and the length of the fitting portion 3411 in the direction orthogonal to the first and second movement directions MD1, MD2 is approximately equal to the length of the rotator seat 3232 in the direction orthogonal to the first and second movement directions MD1, MD2. The fitting portion 3411 is formed with a front contact surface 3412 and a rear contact surface 3413, which are used for the fixation of the side lock cover 3400 in the front and rear directions FRD, and a top contact surface 3414 which is used for the fixation of the side lock cover 3400 in the vertical direction VD. A front surface of the fitting portion 3411 forms the front contact surface 3412 and a rear surface of the fitting portion 3411 forms the rear contact surface 3413. A top surface of the fitting portion 3411 forms the top contact surface 3414.

If the fitting portion 3411 of the side lock cover 3400 is fitted to the rotator seat 3232 of the adaptor, the front contact surface 3412 directly contacts the surface 3232L of the rotator seat 3232 in the second movement direction MD2 and the rear contact surface 3413 directly contacts the surface 3232R of the rotator seat 3232 in the first movement direction MD1. Thus, the side lock cover 3400 is fixed to the insertion portion 3210 of the adaptor in the front and rear directions FRD. A bottom surface of the fitting portion 3411 may or may not directly contact the bottom surface 3232B of the rotator seat. The fixation of the side lock cover 3400 in the vertical direction VD is achieved through the slide cover 3300. If the slide cover 3300 is moved to the adaptor 3200 in the first movement direction MD1 and is locked in the fixation position, the slide cover 3300 covers a portion of the top contact surface 3414 of the fitting portion 3411 of the side lock cover 3400. Specifically, the hood 3331 of the slide cover 3300 is positioned above the top contact surface 3414 of the fitting portion 3411 in the fixation position. Thus, when the slide cover 3300 is locked in the fixation position, the fixation in the vertical direction VD is achieved between the insertion portion 3210 of the adaptor and the side lock cover 3400.

The side lock cover 3400 includes a pair of lateral walls 3415F, 3415R, which extend from the fitting portion 3411 in the first movement direction MD1, and a bridge 3416 interconnecting the lateral walls 3415F, 3415R. The bridge 3416 is located apart from the fitting portion 3411 in the first movement direction MD1. Further, the side lock cover 3400 has a snap ridge 3417 on an inner surface of each lateral wall 3415F, 3415R below the bridge 3416. When the side lock cover 3400 is positioned in the adaptor 3200 with the fitting portion 3411 of the side lock cover fitted to the rotator seat 3232 of the adaptor, the lateral walls 3415F, 3415R of the side lock cover contact the outer lateral walls 3212F, 3212R of the insertion portion 3210 of the adaptor respectively or faces to the outer lateral walls with a slight gap. That is, the inner surfaces of the lateral walls 3415F, 3415R of the side lock cover 3400 are positioned outside the outer surfaces of the insertion portion 3210. Further, the snap ridges 3417 of the lateral walls 3415F, 3415R snap-engage the snap ridges 3218 of the outer lateral walls 3212F, 3212R of the insertion portion 3210. Thus, the fixation in the horizontal direction HD is achieved between the side lock cover 3400 and the insertion portion 3210 of the adaptor through contact between the lateral walls 3415F, 3415R of the side lock cover and the outer lateral walls 3212F, 3212R of the insertion portion 3210 of the adaptor.

The side lock cover 3400 includes a bearing hole 3421 for receiving the side pin 611, 711 of the fifth coupling unit 610 and the sixth coupling unit 710. The bearing hole 3421 extends through the fitting portion 3411 and the lateral walls 3415F, 3415R in the direction orthogonal to the first and second movement directions MD1, MD2. The bearing hole 3421 has a diameter sufficient to allow the side pin 611, 711 to rotate in the bearing hole in the state where the side pin 611, 711 is inserted to the bearing hole 3421. An outer surface of each lateral wall 3415F, 3415R is formed with a ring-shaped contact surface 3422. The contact surface 3422 surrounds the bearing hole 3421 and protrudes laterally outwardly from each lateral wall 3415F, 3415R. Only a portion of the fifth coupling unit 610 or the sixth coupling unit 710, which is located around a base end of the side pin 611, 711, comes into contact with the side lock cover 3400 due to the contact surface 3422 which protrudes in a ring shape.

When the connector assembly 3000 and the fifth coupling unit 610 are connected, the side pin 611 is inserted to the bearing hole 3421 and the clip 613 of the clipping latch 612 contacts or snap-engages one of the lateral walls 3415F, 3415R of the side lock cover. When the connector assembly 3000 and the sixth coupling unit 710 are connected, the side pin 711 is inserted to the bearing hole 3421 and the clip 713 of the clipping latch 712 is inserted or fitted to one of the insertion slots 3213F, 3213R formed in the insertion portion 3210 of the adaptor.

Figure 40:
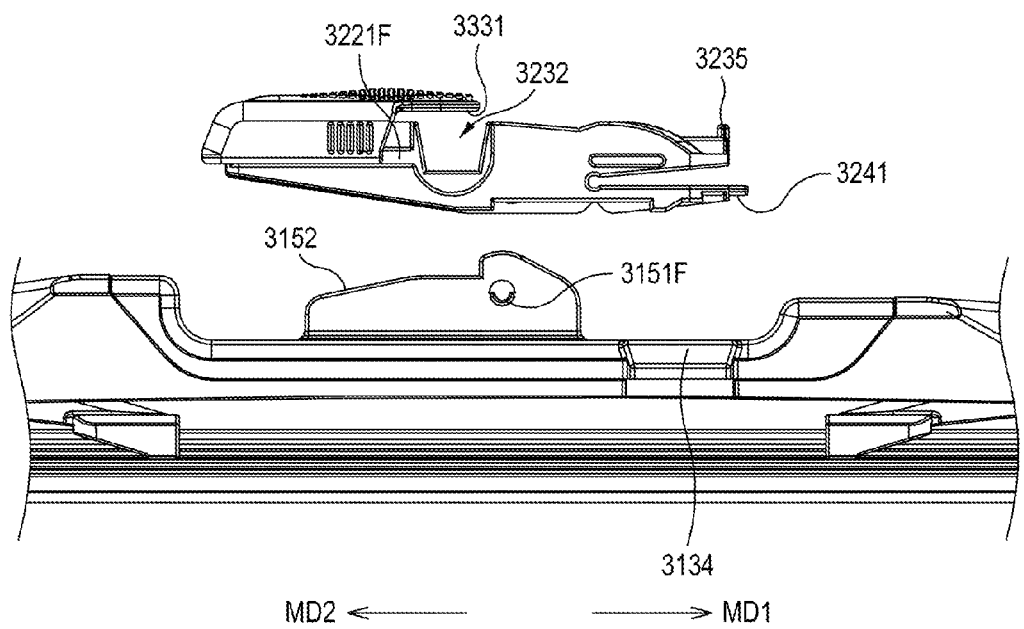
FIG. 40 shows an exemplary assembly between the bracket and the adaptor with the slide cover mounted thereto, showing that the slide cover is maintained to the adaptor in a fixation position.
Figure 41:
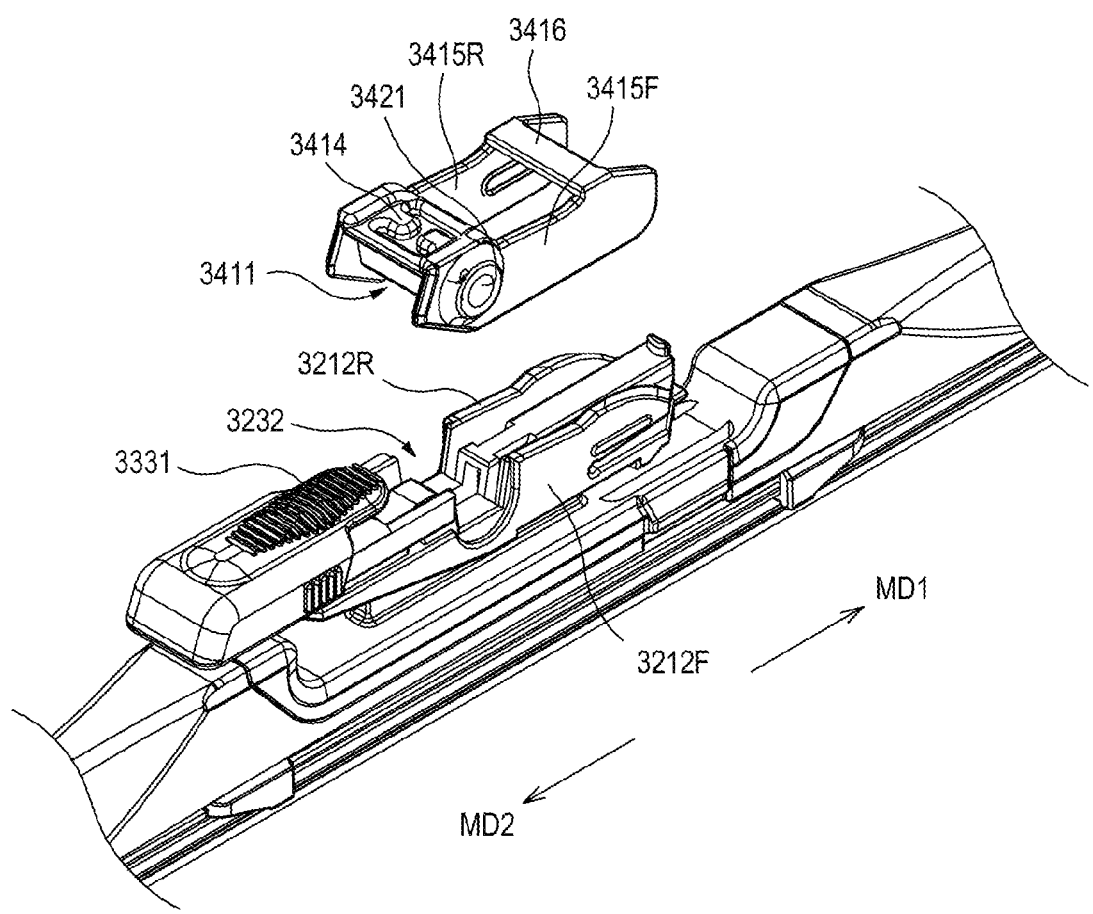
FIG. 41 shows an exemplary assembly between the adaptor and the side lock cover, showing that the slide cover is maintained to the adaptor in a release position.
Figure 42:
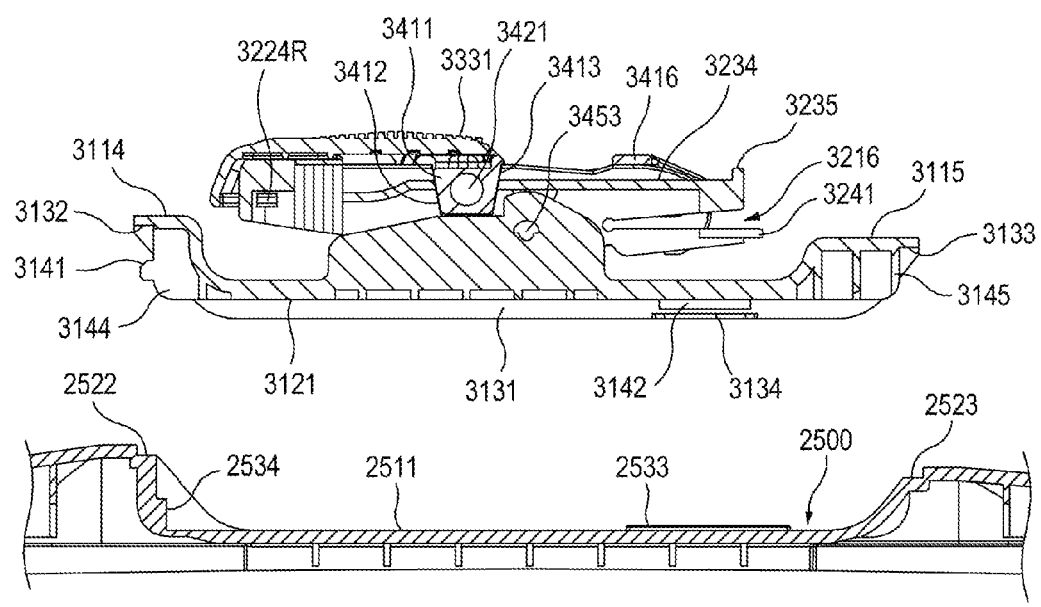
FIG. 42 shows a longitudinal cross section of the assembled connector assembly.

The slide cover 3300 is joined to the adaptor 3200 in such a way that the slide claws 3321F, 3321R are inserted to the guide grooves 3221F, 3221R of the adaptor 3200 in the first movement direction MD1. As shown in FIG. 40, the adaptor 3200 with the slide cover 3300 joined thereto are joined to the bracket 3100 in such a way that the inner lateral walls 3211F, 3211R of the adaptor is put on the shaft protrusions 3151F, 3151R of the bracket 3100 and then the insertion portion 3210 of the adaptor is pressed towards the bracket 3100. As shown in FIG. 41, joining the side lock cover 3400 to the insertion portion 3210 of the adaptor is carried out in the state where the slide cover 3300 is moved in the second movement direction MD2 and is maintained in the release position. The outer lateral walls 3212F, 3212R of the insertion portion 3210 are inserted into between the lateral walls 3415F, 3415R of the side lock cover 3400 while the fitting portion 3411 of the side lock cover 3400 is fitted to the rotator seat 3232 of the insertion portion 3210 of the adaptor. Thereafter, the slide cover 3300 is moved to the adaptor 3200 in the first movement direction MD1 and thus the hood 3331 covers the top contact surface 3414 of the fitting portion 3411 of the side lock cover. Then, as shown in FIG. 42, the side lock cover 3400 is mounted on the insertion portion 3210 of the adaptor by the slide cover 3300 which is maintained in the fixation position.

Figure 44:
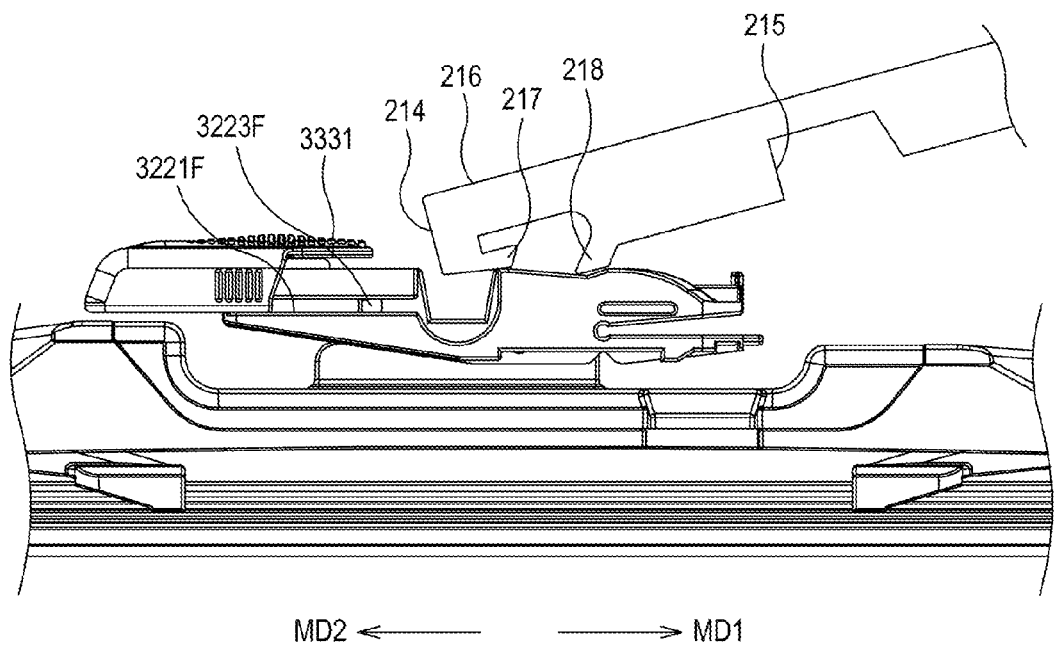
FIGS. 44 to 46 show a connection example between the wiper blade according to an embodiment and the first wiper arm.
Figure 45:
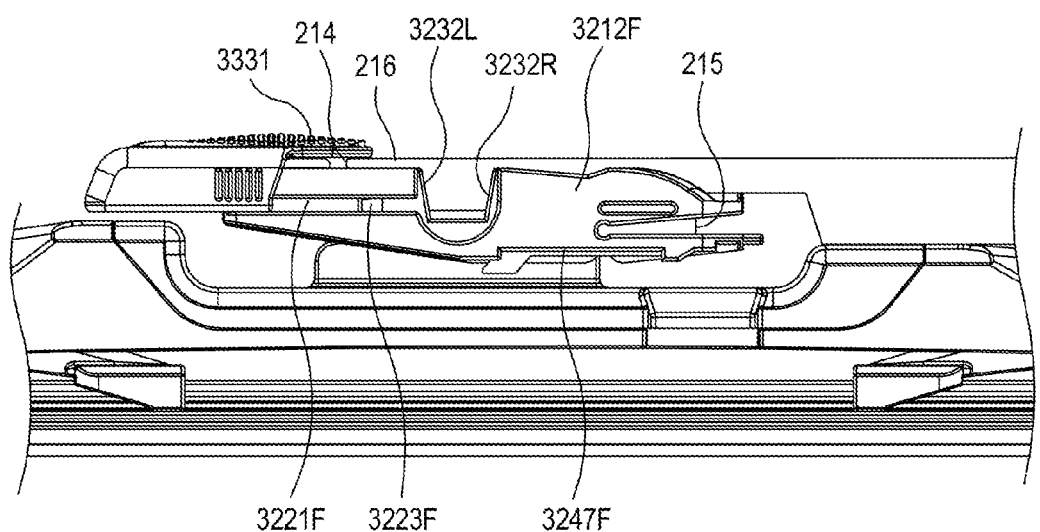
Figure 46:
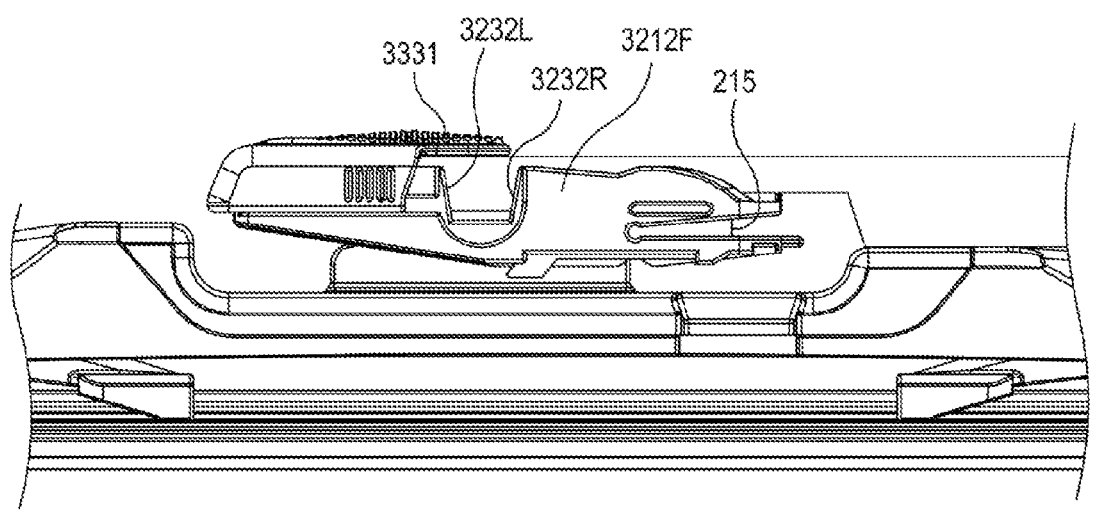

FIGS. 44 to 46 show a connection example between the wiper blade 100 according to an embodiment and the first wiper arm 200.

As shown in FIG. 44, the slide cover 3300 is moved from the adaptor 3200 in the second movement direction MD2 and is maintained in the release position. If a force in the second movement direction MD2 is applied to the slide cover 3300 which is maintained in the fixation position, the slide claws 3321F, 3321R, which have snap-engaged the first snap holes 3223F, 3223R, come out of the first snap holes 3223F, 3223R and therefore the slide cover 3300 is movable in the second movement direction MD2. If the slide claws 3321F, 3321R snap-engage the second snap holes 3224F, 3224R, the slide cover 3300 is maintained in the adaptor 3200 in the release position. The insertion portion 3210 of the adaptor 3200 is inserted to the receiving portion 211 of the first coupling unit 210 in the state where the slide cover 3300 is maintained in the release position. At this time, the lateral plates 213F, 213R of the first coupling unit are inserted to the insertion slots 3213F, 3213R respectively and the third spacers 3214MF, 3214MR of the insertion portion 3210 are inserted to the space defined between the front hook 217 and the rear hook 218 of the first coupling unit. If the insertion portion 3210 is fully inserted to the receiving portion 211, a top surface of the rear hook 218 is positioned below the third spacer 3214MF, 3214MR and the insertion protrusion 3235 of the top wall 3211T comes into contact with an under surface of the top plate 212. Further, the front contact surface 214 of the first coupling unit contacts or faces to the first front support surfaces 3231LF, 3231LR located in the second movement direction MD2 with a slight gap therebetween, and the rear contact surface 215 of the first coupling unit contacts or faces to the first rear support surfaces 3231RF, 3231RR located in the first movement direction MD1 with a slight gap therebetween. Further, the top contact surface 216 of the first coupling unit is positioned between the first front support surfaces 3231LF, 3231LR and the rear surface 3232R of the rotator seat 3232. Subsequently, to fix the adaptor 3200 and the first coupling unit 210 to each other, the slide cover 3300 is slid to the adaptor 3200 in the first movement direction MD1 and then is locked to the fixation position. If the slide claws 3321F, 3321R snap-engage the first snap holes 3223F, 3223R along with the movement of the slide cover 3300 in the first movement direction MD1, the slide cover 3300 is locked in the fixation position with respect to the adaptor 3200 and the hood 3331 of the slide cover and the top wall 3312 of the slide cover adjacent to the hood 3331 are positioned above the top contact surface 216 of the first coupling unit. Accordingly, the first coupling unit 210 and the adaptor 3200 are connected to each other through the fixation in the front and rear directions FRD, the vertical direction VD and the horizontal direction HD. In this case, the fixation in the front and rear directions FRD is the state where the front contact surface 214 of the first coupling unit contacts the first front support surfaces 3231LF, 3231LR located in the second movement direction MD2 or the rear contact surface 215 of the first coupling unit contacts the first rear support surfaces 3231RF, 3231RR located in the first movement direction MD1. The fixation in the vertical direction VD is the state where the slide cover 3300 covers the top contact surface 216 of the first coupling unit. The fixation in the horizontal direction HD is the state where the lateral plates 213F, 213R of the first coupling unit are inserted to the insertion slots 3213F, 3213R of the adaptor. When separating the first coupling unit 210 and the adaptor 3200 connected to each other, the slide cover 3300 is moved in the second movement direction MD2 and then maintained in the release position. Thereafter, the insertion portion 3210 of the adaptor 3200 is separated from the receiving portion 211 of the first coupling unit.

Figure 48:
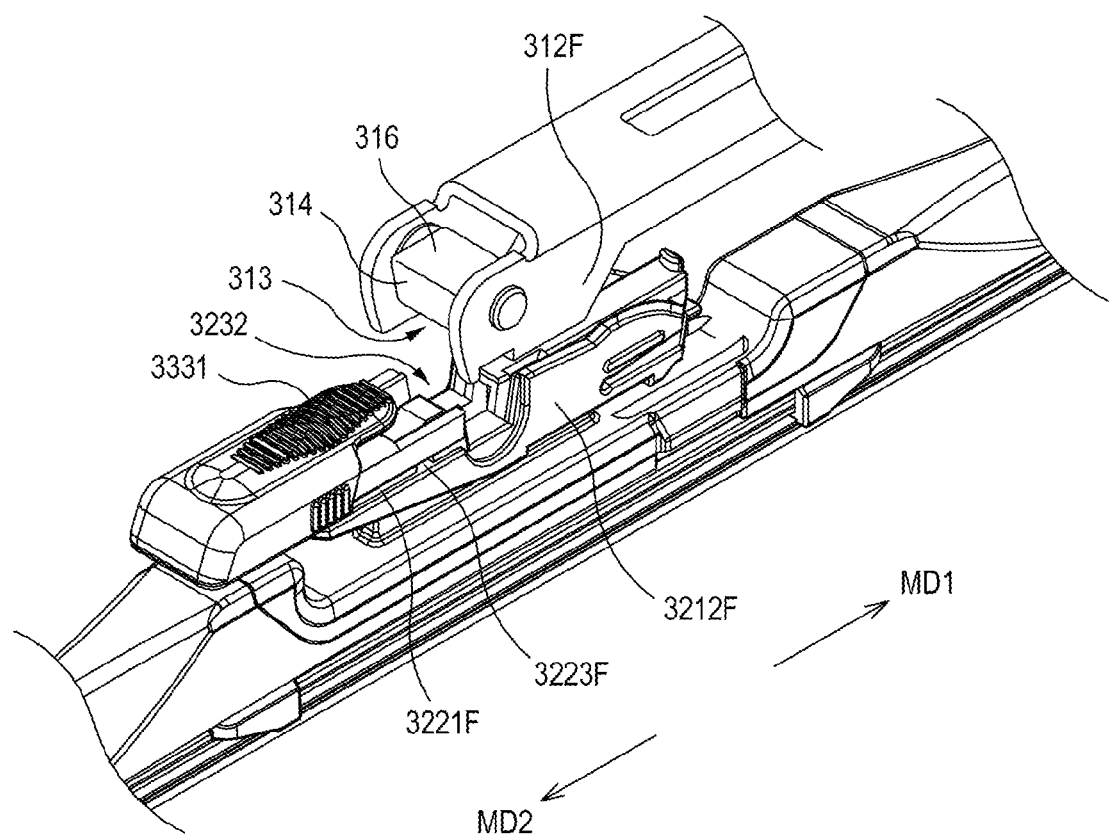
FIGS. 48 to 50 show a connection example between the wiper blade according to an embodiment and the second wiper arm.
Figure 49:
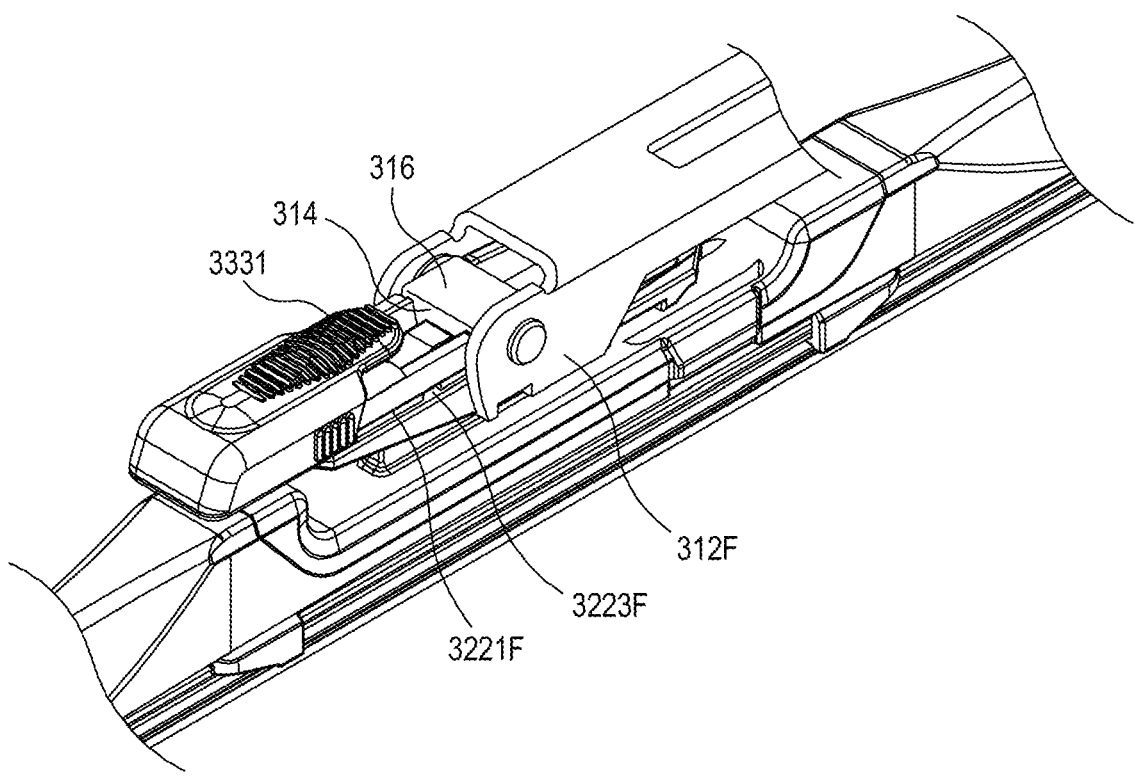
Figure 50:
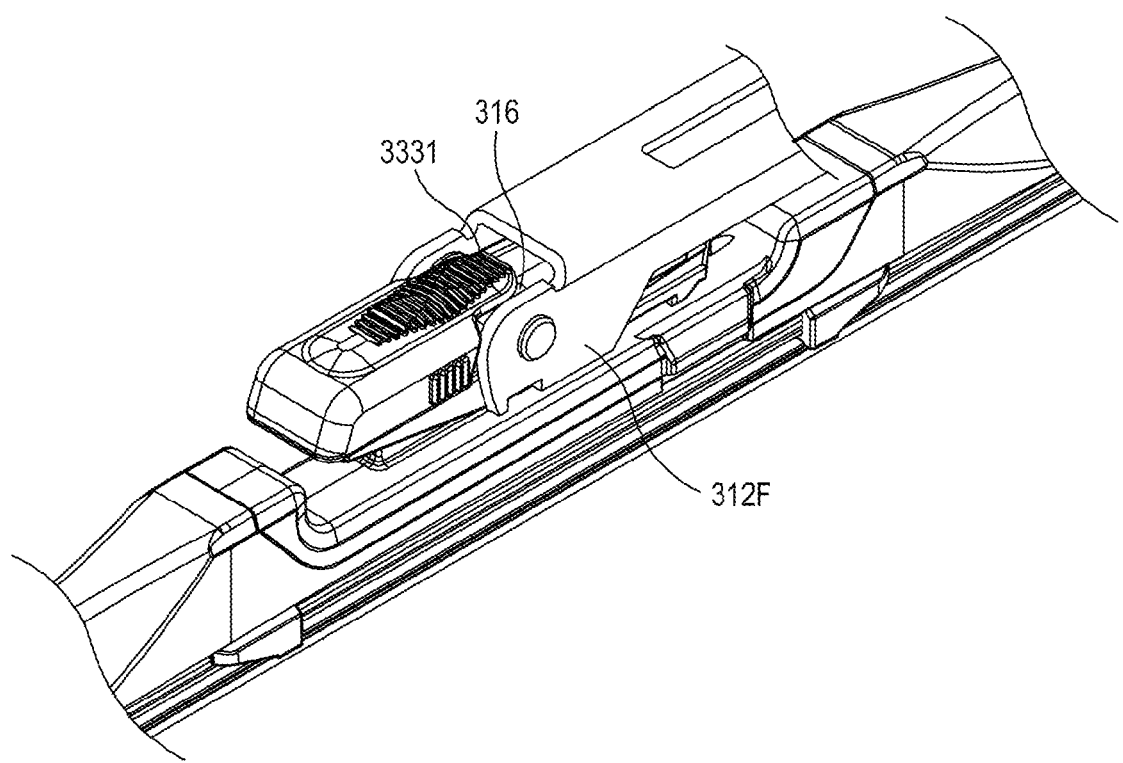

FIGS. 48 to 50 show a connection example between the wiper blade 100 according to an embodiment and the second wiper arm 300.

As shown in FIG. 48, in the state where the slide cover 3300 is maintained in the release position, the rotator 313 of the second coupling unit is fitted to the rotator seat 3232 of the insertion portion 3210 while the insertion portion 3210 of the adaptor 3200 is inserted to the receiving portion 311 of the second coupling unit 310. At this time, the outer lateral walls 3212F, 3212R of the insertion portion 3210 is inserted to the receiving portion 311 of the second coupling unit. If the insertion portion 3210 is inserted to the receiving portion 311 and the rotator 313 is fully fitted to the rotator seat 3232, the front contact surface 314 of the second coupling unit directly contacts the front surface 3232L of the rotator seat, and the rear contact surface 315 of the second coupling unit directly contacts the rear surface 3232R of the rotator seat. Thus, the rotator 313 is fixed to the rotator seat 3232 in the first and second movement directions MD1, MD2 and the top contact surface 316 of the rotator 313 is exposed upwardly. Subsequently, to fix the adaptor 3200 and the second coupling unit 310 to each other, the slide cover 3300 is slid to the adaptor 3200 in the first movement direction MD1 and then is locked to the fixation position. If the slide cover 3300 is locked to the fixation position, the hood 3331 of the slide cover is positioned above the top contact surface 316 of the rotator 313 of the second coupling unit. Accordingly, the second coupling unit 310 and the adaptor 3200 are connected to each other through the fixation in the front and rear directions FRD, the vertical direction VD and the horizontal direction HD. In this case, the fixation in the front and rear directions FRD is the state where the front contact surface 314 and the rear contact surface 315 of the rotator 313 directly contact the front surface 3232L and the rear surface 3232R of the rotator seat 3232 respectively. The fixation in the vertical direction VD is the state where the hood 3331 of the slide cover covers the top contact surface 316 of the rotator 313. The fixation in the horizontal direction HD is the state where the inner surfaces of the lateral plates 312F, 312R of the second coupling unit are in contact with the outer surfaces of the outer lateral walls 3212F, 3212R of the insertion portion 3210. When separating the second coupling unit 310 and the adaptor 3200 connected to each other, the slide cover 3300 is moved in the second movement direction MD2 and then maintained in the release position. Thereafter, the insertion portion 3210 of the adaptor 3200 is separated from the rotator 313 of the second coupling unit.

Figure 52:
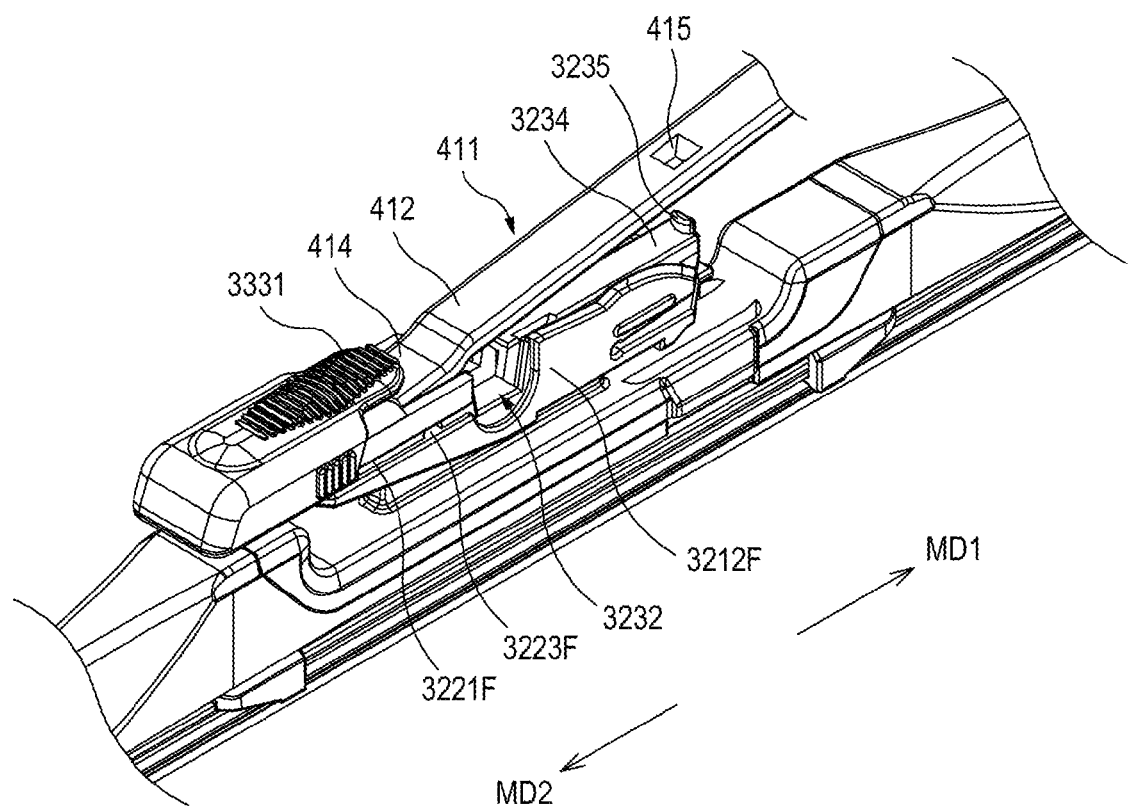
FIGS. 52 to 54 show a connection example between the wiper blade according to an embodiment and the third wiper arm.
Figure 53:
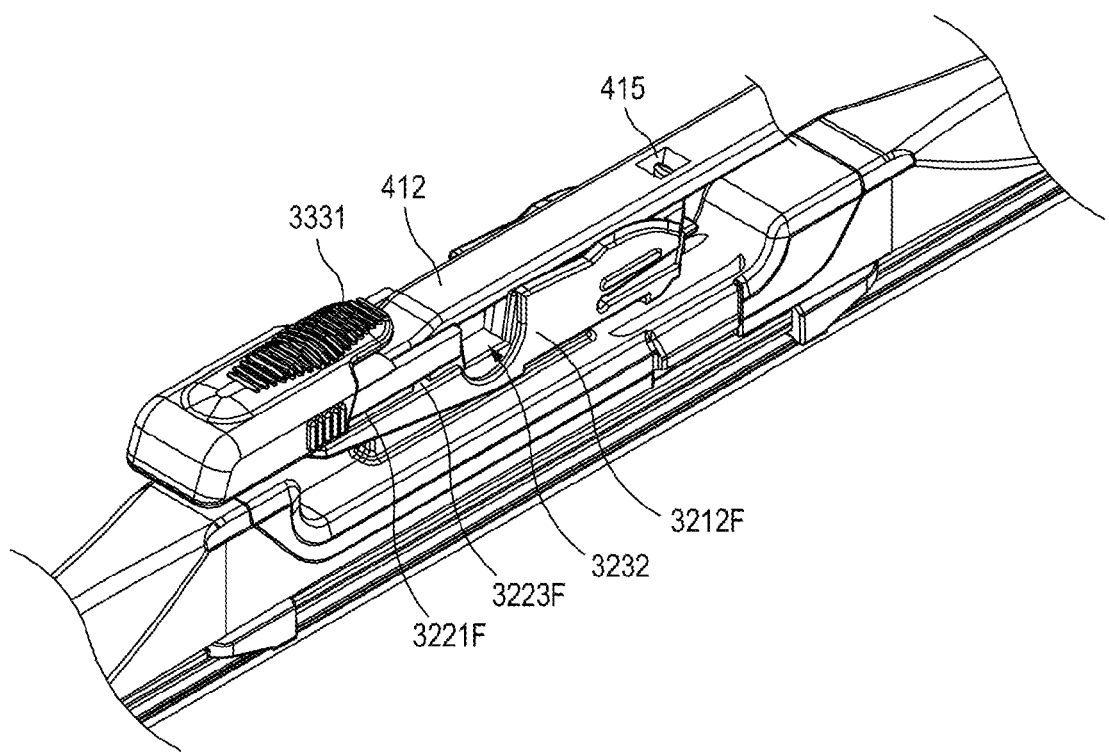
Figure 54:
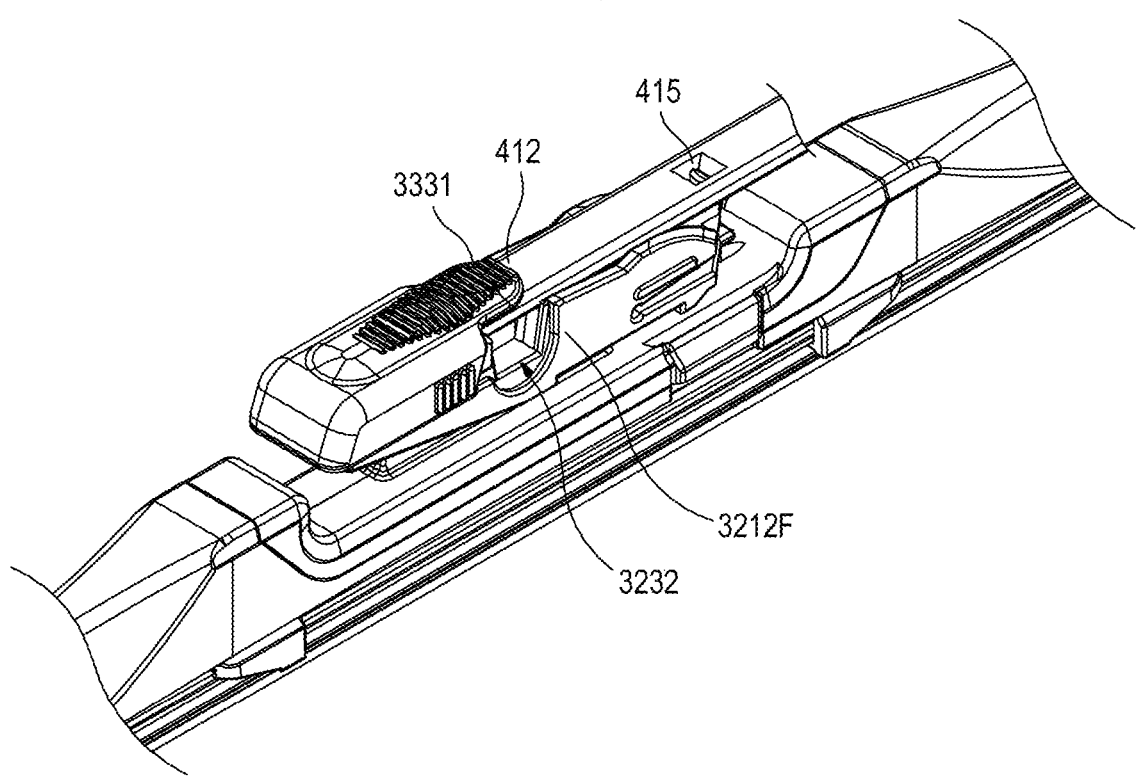

FIGS. 52 to 54 show a connection example between the wiper blade 100 according to an embodiment and the third wiper arm 400.

As shown in FIG. 52, in the state where the slide cover 3300 is maintained in the release position, the second support surface 3234 formed on the top wall 3211T of the insertion portion 3210 is brought into contact with the bottom contact surface 413 of the bar 411 of the third coupling unit while the bar 411 is put between the outer lateral walls 3212F, 3212R of the insertion portion 3210 of the adaptor. Further, the tongue 414 of the third coupling unit is seated on the curved surface 3236 of the second support surface 3234 and the insertion protrusion 3235 of the second support surface 3234 is inserted to the opening 415 of the third coupling unit. If the bar 411 is seated on the top wall 3211T between the outer lateral walls 3212F, 3212R, the bottom contact surface 413 of the third coupling unit directly contacts the second support surface 3234 between the outer lateral walls 3212F, 3212R and the insertion protrusion 3235 of the insertion portion 3210 is fitted to the opening 415 of the third coupling unit. Further, the top contact surface 412 of the third coupling unit is positioned above the rotator seat 3232 of the insertion portion 3210. Subsequently, to fix the adaptor 3200 and the third coupling unit 410 to each other, the slide cover 3300 is slid to the adaptor 3200 in the first movement direction MD1 and is locked to the fixation position. If the slide cover 3300 is locked to the fixation position, the hood 3331 of the slide cover is positioned above the top contact surface 412 of the third coupling unit. Accordingly, the third coupling unit 410 and the adaptor 3200 are connected to each other through the fixation in the front and rear directions FRD, the vertical direction VD and the horizontal direction HD. In this case, the fixation in the front and rear directions FRD is the state where the insertion protrusion 3235 of the insertion portion 3210 is inserted to the opening 415 of the third coupling unit. The fixation in the vertical direction VD is the state where the hood 3331 of the slide cover covers the top contact surface 412 of the third coupling unit. The fixation in the horizontal direction HD is the state where lateral surfaces of the tongue 414 of the bar 411 of the third coupling unit are in contact with the inner surfaces of the outer lateral walls 3212F, 3212R of the insertion portion 3210 and the insertion protrusion 3235 of the insertion portion 3210 is in contact with the lateral surfaces of the opening 415 of the third coupling unit. When separating the third coupling unit 410 and the adaptor 3200 connected to each other, the slide cover 3300 is moved in the second movement direction MD2 and then maintained in the release position. Thereafter, the insertion portion 3210 of the adaptor 3200 is separated from the bar 411 of the third coupling unit.

Figure 56:
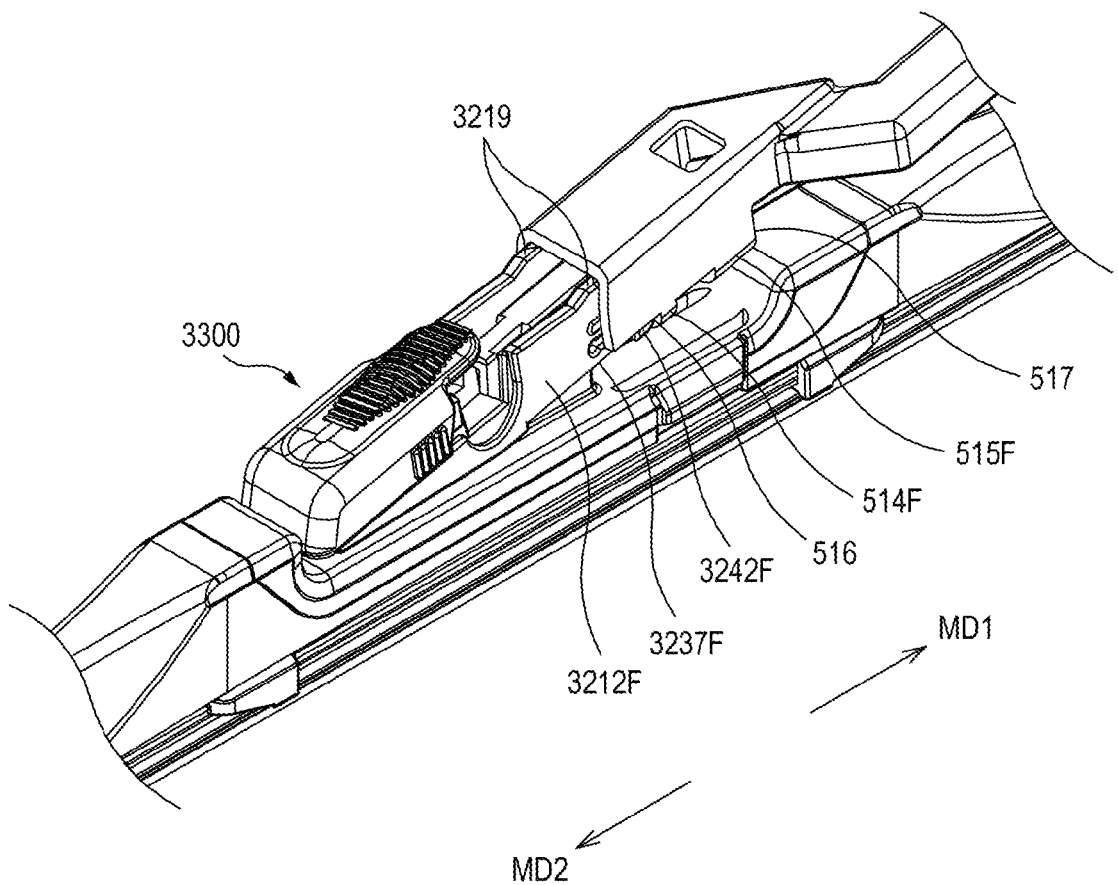
FIGS. 56 and 57 show a connection example between the wiper blade according to an embodiment and the fourth wiper arm.
Figure 57:
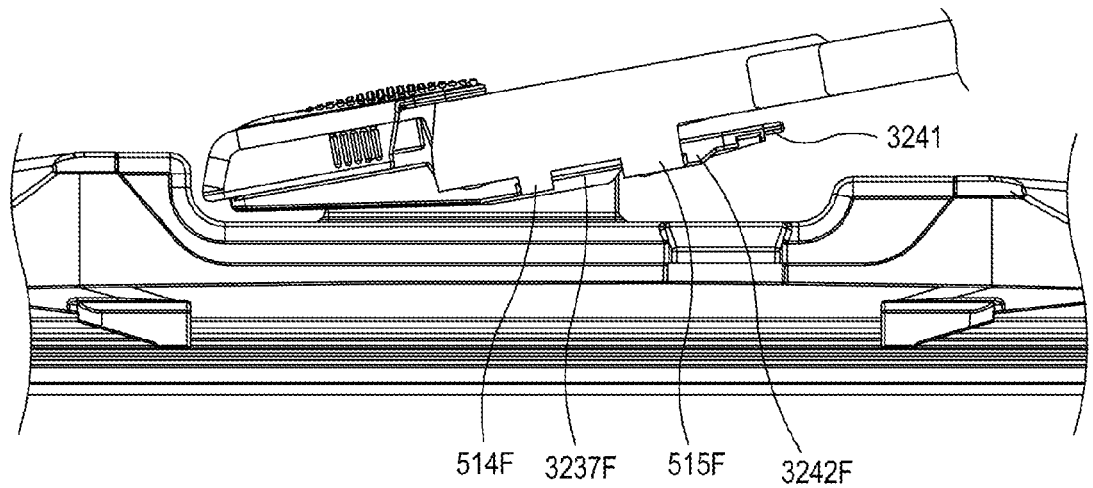

FIGS. 56 and 57 show a connection example between the wiper blade 100 according to an embodiment and the fourth wiper arm 500.

As shown in FIG. 56, the insertion portion 3210 of the adaptor is inserted to the receiving portion 511 of the fourth coupling unit in the first movement direction MD1 in the state where the slide cover 3300 is maintained in the fixation position. As the insertion portion 3210 of the adaptor is inserted to the receiving portion 511, the under surface of the top plate 512 of the receiving portion 511 comes into contact with the curved portion 3219 located at the end of the insertion portion 3210 in the first movement direction MD1 and the front claws 514F, 514R of the fourth coupling unit come into contact with the surfaces 3244 of the wedge protrusions 3242F, 3242R. As the insertion portion 3210 is further inserted to the receiving portion 511, the latch 3241 curves upwardly due to the action of the wedge protrusions 3242F, 3242R and the front claws 514F, 514R and the front claws 514F, 514R pass the wedge protrusions 3242F, 3242R. Further, the rear claws 515F, 515R pass the wedge protrusions 3242F, 3242R while curving the latch 3241 upwardly due to the action of the wedge protrusions 3242F, 3242R and the rear claws 515F, 515R. If the insertion of the insertion portion 3210 of the adaptor to the receiving portion 511 of the fourth coupling unit is completed, as shown in FIG. 57, both the front claws 514F, 514R and the rear claws 515F, 515R are fitted to the claw grooves 3237F, 3237R and the latch 3241 locks the rear surfaces of the rear claws 515F, 515R. That is, the front contact surface 516 of the fourth coupling unit is in contact with the surfaces of the claw grooves 3237F, 3237R in the second movement direction MD2 and the rear contact surface 517 of the fourth coupling unit is in contact with the surfaces 3243 of the wedge protrusions 3242F, 3242R in the second movement direction MD2. Further, the top contact surface 518 of the fourth coupling unit is in contact with the top surfaces of the claw grooves 3237F, 3237R and the top surface of the top plate 512 of the fourth coupling unit is positioned below the hood 3331 of the slide cover 3300 maintained in the fixation position. Accordingly, the fourth coupling unit 510 and the adaptor 3200 are connected to each other through the fixation in the front and rear directions FRD, the vertical direction VD and the horizontal direction HD by inserting the insertion portion 3210 to the receiving portion 511 in the first movement direction MD1 and then bringing the front claws 514F, 514R and the rear claws 515F, 515R into snap engagement with the claw grooves 3237F, 3237R of the insertion portion 3210. In this case, the fixation in the front and rear directions FRD is the state where the front contact surface 516 of the fourth coupling unit is in contact with the surfaces of the claw grooves 3237F, 3237R in the second movement direction MD2 and the rear contact surface 517 is in contact with the surfaces of the claw grooves 3237F, 3237R in the first movement direction MD1 (the surfaces 3243 of the wedge protrusions). The fixation in the vertical direction VD is the state where the top contact surface 518 of the fourth coupling unit is in contact with the top surfaces of the claw grooves 3237F, 3237R and the top surface of the top plate 512 of the fourth coupling unit is positioned below the hood 3331 of the slide cover. The fixation in the horizontal direction HD is the state where the inner surfaces of the lateral plates 513F, 513R of the fourth coupling unit are in contact with the outer surfaces of the outer lateral walls 3212F, 3212R of the insertion portion 3210. When separating the fourth coupling unit 510 and the adaptor 3200 connected to each other, the surfaces 3243 of the wedge protrusions 3242F, 3242R in the second movement direction MD2 are separated from the rear claws 515F, 515R by pushing upward the latch 3241. Thereafter, the insertion portion 3210 of the adaptor 3200 is pulled out in the second movement direction MD2.

Figure 59:
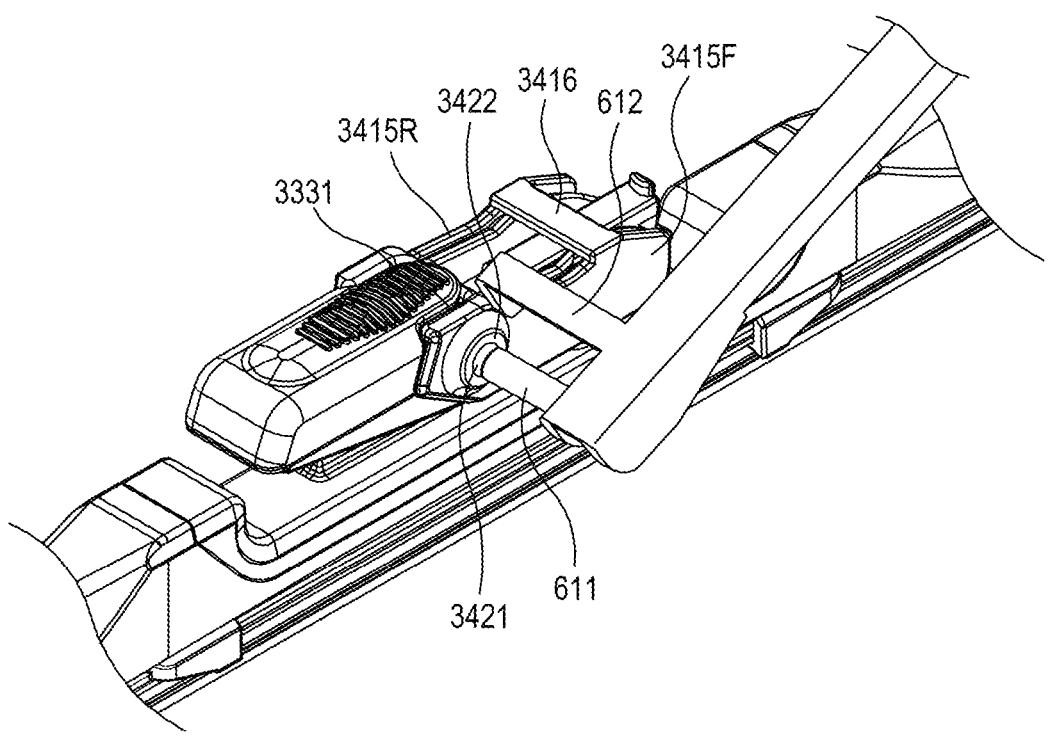
FIGS. 59 and 60 show a connection example between the wiper blade according to an embodiment and the fifth wiper arm.
Figure 60:
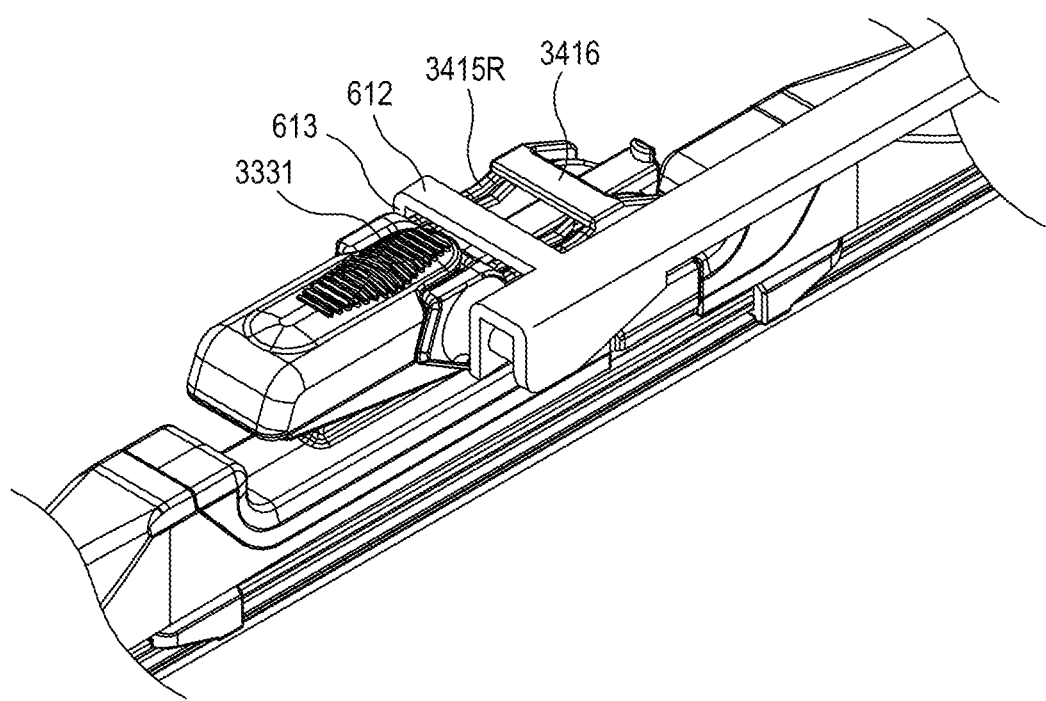

FIGS. 59 and 60 show a connection example between the wiper blade 100 according to an embodiment and the fifth wiper arm 600.

The side lock cover 3400 is mounted on the adaptor 3200 for connection between the fifth wiper arm 600 and the adaptor 3200. The side lock cover 3400 is fixed to the adaptor 3200 in the front and rear directions FRD, the vertical direction VD and the horizontal direction HD in the state where the slide cover 3300 is maintained in the fixation position. As shown in FIG. 59, the side pin 611 of the fifth coupling unit is inserted to the bearing hole 3421 of the side lock cover 3400 mounted on the adaptor 3200. The insertion is completed when the surface of the fifth coupling unit located around the base end of the side pin 611 comes into contact with the ring-shaped contact surface 3422. The connector assembly 3000 including the adaptor 3200 is rotatable about the side pin 611 of the fifth coupling unit in the state where the side pin 611 is inserted to the bearing hole 3421. After the insertion is completed, the connector assembly 3000 is rotated towards the fifth wiper arm. Then, the clipping latch 612 is brought into contact with the top edge of the lateral wall 3415F, 3415R of the side lock cover and the clip 613 of the clipping latch 612 is brought into contact or snap engagement with the later wall 3415R of the side lock cover. Accordingly, the fifth coupling unit 610 and the adaptor 3200 with the side lock cover 3400 mounted thereon are connected to each other through the fixation in the front and rear directions FRD, the vertical direction VD and the horizontal direction HD by inserting the side pin 611 to the bearing hole 3421 and then bringing the clipping latch 612 into contact with the lateral wall 3415R of the side lock cover 3400. In this case, the fixation in the front and rear directions FRD and the vertical direction VD is the state where the side pin 611 of the fifth coupling unit is inserted to the bearing hole 3421. The fixation in the horizontal direction HD is the state where the clip 613 of the clipping latch 612 of the fifth coupling unit is in contact with the outer surface of the lateral wall 3415R of the side lock cover 3400. When separating the fifth coupling unit 610 and the side lock cover 3400 connected to each other, the clip 613 of the clipping latch 612 is separated from the lateral wall 3415R of the side lock cover 3400 by rotating the connector assembly 3000. Thereafter, the connector assembly 3000 is pulled out from the side pin 611.

Figure 62:
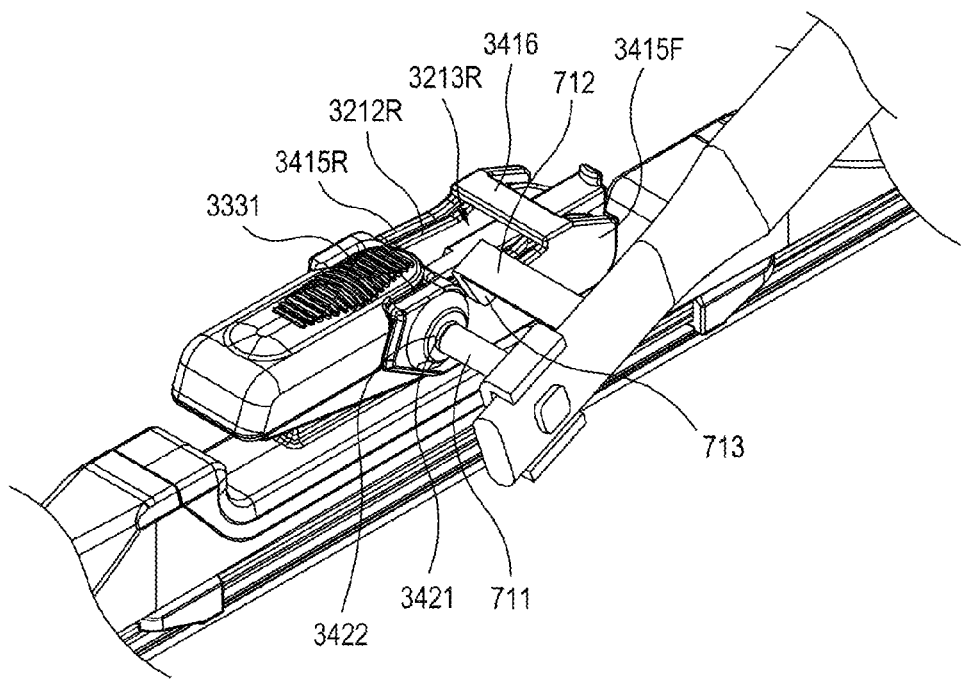
FIGS. 62 and 63 show a connection example between the wiper blade according to an embodiment and the sixth wiper arm.
Figure 63:
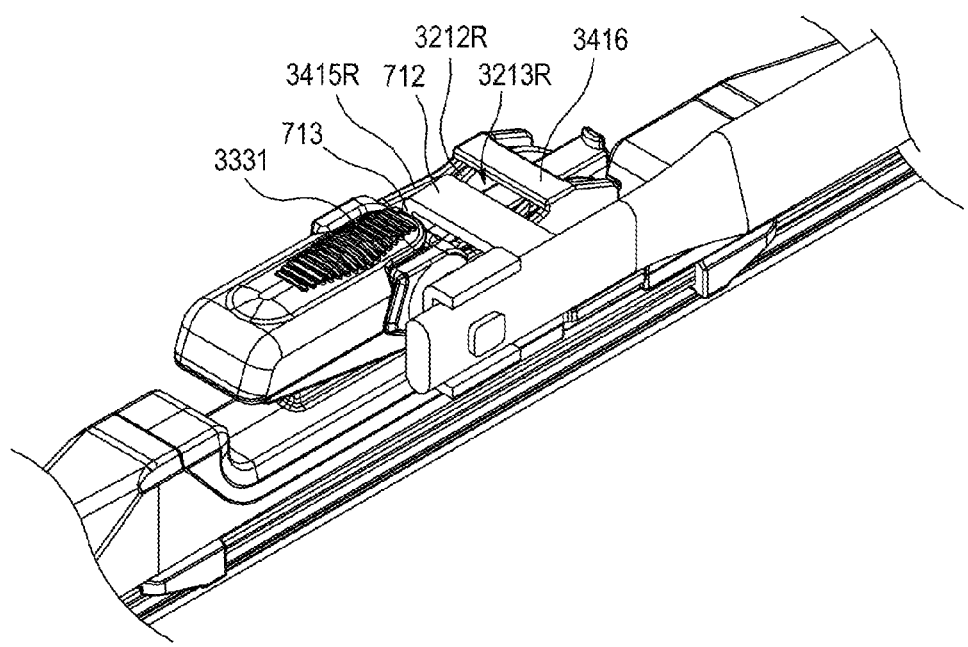

FIGS. 62 and 63 show a connection example between the wiper blade 100 according to an embodiment and the sixth wiper arm 700.

As shown in FIG. 62, the side pin 711 of the sixth coupling unit is inserted to the bearing hole 3421 of the side lock cover 3400 mounted on the adaptor 3200. The insertion is completed when the surface of the sixth coupling unit located around the base end of the side pin 711 comes into contact with the ring-shaped contact surface 3422. The connector assembly 3000 is rotated about the side pin 711 of the sixth coupling unit in the state where the side pin 711 is fully inserted to the bearing hole 3421. Then, the clip 713 of the clipping latch 712 of the sixth coupling unit is inserted to the insertion slot 3213R of the insertion portion 3210 of the adaptor. Accordingly, the sixth coupling unit 710 and the adaptor 3200 with the side lock cover 3400 mounted thereon are connected to each other through the fixation in the front and rear directions FRD, the vertical direction VD and the horizontal direction HD by inserting the side pin 711 to the bearing hole 3421 and then bringing the clipping latch 712 into engagement with the insertion portion 3210 of the adaptor. In this case, the fixation in the front and rear directions FRD and the vertical direction VD is the state where the side pin 711 of the sixth coupling unit is inserted to the bearing hole 3421. The fixation in the horizontal direction HD is the state where the clip 713 of the clipping latch 712 of the sixth coupling unit is inserted between the outer lateral wall 3212R and the inner lateral wall 3211R of the insertion portion 3210 of the adaptor. When separating the sixth coupling unit 710 and the side lock cover 3400 connected to each other, the clip 713 of the clipping latch 712 is separated from the insertion portion 3210 of the adaptor by rotating the connector assembly 3000. Thereafter, the connector assembly 3000 is pulled out from the side pin 711.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wiper blade, comprising:
 a wiper rubber;
 a lever assembly holding the wiper rubber, the lever assembly comprising a plurality of levers, adjacent levers of which are rotatably connected; and
 a connector assembly detachably connected to a wiper arm, the wiper arm including one of first to fourth coupling units at a distal end,
 wherein the first coupling unit includes a receiving portion formed with a front contact surface, a rear contact surface and a top contact surface; the second coupling unit includes a receiving portion having a rotator that is rotatable and is formed with a front contact surface, a rear contact surface and a top contact surface; the third coupling unit includes a bar formed with a top contact surface and a bottom contact surface and an opening perforated in the bar; and the fourth coupling unit includes a receiving portion having a pair of claws formed with a front contact surface, a rear contact surface and a top contact surface, wherein the connector assembly includes:
a bracket detachably joined to the lever assembly;
an adaptor rotatably mounted to the bracket; and
a slide cover slidably joined to the adaptor, the slide cover being slidable in a first movement direction parallel to a longitudinal direction of the lever assembly and in a second movement direction opposite to the first movement direction in the longitudinal direction of the lever assembly, wherein the adaptor includes:
an insertion portion rotatably joined to the bracket, the insertion portion being inserted to the receiving portion of one of the first, second and fourth coupling units;
a first support surface formed in the insertion portion and supporting the front contact surface or the rear contact surface of the first coupling unit when the first coupling unit is connected to the adaptor;
a rotator seat formed in the insertion portion in a direction orthogonal to the first and second movement directions, the rotator of the second coupling unit being fitted to the rotator seat by surface-to-surface contact when the second coupling unit is connected to the adaptor;
a second support surface formed in the insertion portion and extending in the first and second movement directions, the second support surface supporting the bottom contact surface of the third coupling unit when the third coupling unit is connected to the adaptor;
an insertion protrusion formed on the second support surface, the insertion protrusion being inserted to the opening of the third coupling unit when the third coupling unit is connected to the adaptor; and
a pair of claw grooves formed in bottom edges of the insertion portion and extending in the first and second movement directions, each of the claw grooves contacting the front or rear contact surface and the top contact surface of each claw of the fourth coupling unit when the fourth coupling unit is connected to the adaptor, and wherein the slide cover is slidable between a fixation position where the slide cover is moved to the adaptor in the first movement direction to cover at least a portion of the top contact surface of one of the first to third coupling units when the one of the first to third coupling units is connected to the adaptor, and a release position where the slide cover is moved from the adaptor in the second movement direction not to cover the top contact surface of the one of the first to third coupling units.

2. The wiper blade of claim 1, wherein the adaptor includes a pair of guide grooves extending in the first and second movement directions and first and second snap holes located apart from each other in the first and second movement directions in each of the guide grooves, wherein the slide cover includes a pair of slide claws that are inserted to the pair of guide grooves respectively and are slidable, and
wherein the slide claws snap-engage the first snap holes, locking the slide cover to the fixation position.

3. The wiper blade of claim 2, wherein the slide cover includes a hood extending in the first movement direction, and wherein, the hood is positioned at the fixation position of the slide cover above the top contact surface of the one of the first to third coupling units when the one of the first to third coupling units is connected to the adaptor.

4. The wiper blade of claim 1, wherein the adaptor includes a latch at a bottom edge of the insertion portion, the latch being curvable upward and locking the rear contact surface of the fourth coupling unit.

5. The wiper blade of claim 4, wherein the adaptor includes a slit formed from an end of the insertion portion in the first movement direction towards the second movement direction, and wherein the latch extends from an end of the slit in the second movement direction towards the first movement direction.

6. The wiper blade of claim 5, wherein the latch includes a pair of wedge protrusions protruding downwardly, wherein the claw grooves extend in the second movement direction from surfaces of the wedge protrusions in the second movement direction, and
wherein the surfaces of the wedge protrusions in the second movement direction lock the rear contact surface of the fourth coupling unit when the fourth coupling unit is connected to the adaptor.

7. The wiper blade of claim 1, wherein the insertion portion includes: a pair of inner lateral walls; a top wall extending between top edges of the pair of inner lateral walls; a pair of outer lateral walls spaced apart from the pair of inner lateral walls respectively; and a pair of insertion slots extending between the pair of inner lateral walls and the pair of the outer lateral walls, wherein the insertion portion is inserted to the receiving portion of the first coupling unit at the pair of inner lateral walls when the first coupling unit is connected to the adaptor,
wherein the insertion portion is inserted to the receiving portion of the second coupling unit at the pair of outer lateral walls when the second coupling unit is connected to the adaptor,
wherein the insertion portion is inserted to the receiving portion of the fourth coupling unit at the pair of outer lateral walls when the fourth coupling unit is connected to the adaptor,
wherein the first support surface comprises an end surface of each of the insertion slots in the first movement direction or an end surface of each of the insertion slots in the second movement direction,
wherein the rotator seat extends across the pair of inner lateral walls, the top wall and the pair of outer lateral walls, and
wherein the second support surface comprises a top surface of the top wall.

8. The wiper blade of claim 7, wherein ends of the pair of inner lateral walls in the first movement direction and ends of the pair of outer lateral walls in the first movement direction form an end of the adaptor in the first movement direction, wherein ends of the pair of outer lateral walls in the second movement direction form an end of the adaptor in the second movement direction, and
wherein the slide cover is slidable from the end of the adaptor in the second movement direction towards the first movement direction.

9. The wiper blade of claim 7, wherein the rotator seat includes a front surface located in the second movement direction and a rear surface located in the first movement direction, and wherein the front surface of the rotator seat directly contacts the front contact surface of the rotator and the rear surface of the rotator seat directly contacts the rear contact surface of the rotator.

10. The wiper blade of claim 7, wherein the bracket includes a pair of shaft protrusions protruding in the direction orthogonal to the first and second movement directions,
wherein the shaft protrusions have a shape of a semicircular arc when viewing the bracket from front, and
wherein the pair of inner lateral walls include bearing holes to which the shaft protrusions are fitted respectively.

11. The wiper blade of claim 7, wherein the third coupling unit includes a curved tongue extending from a front end of the bar, and
wherein the second support surface includes a curved surface, on which the tongue is seated, at an end in the second movement direction.

12. The wiper blade of claim 1, wherein the connector assembly is detachably connected to a wiper arm including a fifth coupling unit at a distal end, the fifth coupling unit including: a side pin; and a clipping latch extending parallel to the side pin and having a clip at a free end,
wherein the connector assembly further includes a side lock cover, the side lock cover including: a fitting portion formed with a front contact surface, a rear contact surface and a top contact surface and being fitted to the rotator seat by surface-to-surface contact; and a bearing hole extending through the fitting portion in the direction orthogonal to the first and second movement directions, the side pin of the fifth coupling unit being inserted to the bearing hole, and
wherein the slide cover covers at least a portion of the top contact surface of the fitting portion in the fixation position.

13. The wiper blade of claim 12, wherein the side lock cover includes a pair of lateral walls extending from the fitting portion, inner surfaces of the pair of lateral walls of the side lock cover being positioned outside outer surfaces of the insertion portion, and
wherein the clip of the clipping latch of the fifth coupling unit contacts an outer surface of one of the pair of lateral walls of the side lock cover.

14. The wiper blade of claim 12, wherein the connector assembly is detachably connected to a wiper arm including a sixth coupling unit at a distal end, the sixth coupling unit including: a side pin; and a clipping latch having a clip at a free end and having a length shorter than a length of the clipping latch of the fifth coupling unit,
wherein the insertion portion of the adaptor includes a pair of insertion slots extending in the first and second movement directions, and
wherein the side pin of the sixth coupling unit is inserted to the bearing hole and the clip of the clipping latch of the sixth coupling unit is inserted to one of the pair of insertion slots of the insertion portion of the adaptor.

15. The wiper blade of claim 1, wherein the lever assembly includes: a first lever located centrally in the lever assembly and having two first inclined surfaces that extend longitudinally and are spaced apart from each other; and a connector seat provided in the first lever between said two first inclined surfaces,
wherein the connector seat includes:
a seat surface on which the bracket is seated;
a stepped surface extending along a periphery of the seat surface and separating the seat surface from the first lever;
an insertion slot provided at a longitudinal end of the seat surface; and
a pair of snap protrusions located adjacent to the seat surface apart from the insertion slot and protruding in a direction orthogonal to a longitudinal direction of the seat surface, and
wherein the bracket includes:
a contact surface contacting the seat surface;
a flange extending along a periphery of the contact surface contacting the seat surface, the flange fitting on the stepped surface;
an insertion protrusion inserted to the insertion slot of the connector seat; and
a pair of snap slots which the pair of snap protrusions of the connector seat snap-engage respectively, the pair of snap slots being located above a bottom edge of the flange.

16. The wiper blade of claim 15, wherein the flange includes an ear portion formed by a portion of an edge of the flange which is opposite each of the snap slots and protrudes outwardly,
wherein the connector seat includes an auxiliary stepped surface between the stepped surface and a bottom edge of the first lever, the auxiliary stepped surface being continued from the stepped surface, and
wherein the auxiliary stepped surface is located below the snap protrusion.

17. The wiper blade of claim 15, wherein the lever assembly further includes:
a pair of second levers rotatably connected to longitudinal outer ends of the first lever respectively and having a second inclined surface extending longitudinally; and
a pair of third levers rotatably connected to longitudinal inner ends or longitudinal outer ends of the second levers respectively and having a third inclined surface extending longitudinally,
wherein the first lever and the second lever are rotatably connected to each other by fitting between a pair of fitting protrusions provided in one of the first and second levers and a pair of fitting holes provided in the other of the first and second levers, and
wherein the second lever and the third lever are rotatably connected to each other by fitting between a pair of fitting protrusions provided in one of the second and third levers and a pair of fitting holes provided in the other of the second and third levers.

18. The wiper blade of claim 17, wherein the first lever has an end surface, which is inclined towards a longitudinal outer end of the third lever, at the longitudinal outer end thereof,
wherein the second lever has a stepped surface, which is contactable to the end surface of the first lever and is inclined towards the longitudinal outer end of the third lever, and an end surface, which is inclined towards the longitudinal outer end of the third lever, at the longitudinal outer end thereof,
wherein the third lever has a stepped surface which is contactable to the end surface of the second lever and is inclined towards the longitudinal outer end of the third lever, and
wherein the stepped surface of the third lever is inclined towards the longitudinal outer end of the third lever at an angle less than the stepped surface of the second lever.

* * * * *